(12) United States Patent
Kamata et al.

(10) Patent No.: US 8,894,107 B2
(45) Date of Patent: Nov. 25, 2014

(54) LOCK APPARATUS

(75) Inventors: Kiyohiko Kamata, Yokohama (JP); Naoya Seto, Yokohama (JP)

(73) Assignee: Mitsui Kinzoku Act Corporation, Kanagawa (JP)

(*) Notice: Subject to any disclaimer, the term of this patent is extended or adjusted under 35 U.S.C. 154(b) by 0 days.

(21) Appl. No.: 14/237,712

(22) PCT Filed: Apr. 4, 2012

(86) PCT No.: PCT/JP2012/059231
§ 371 (c)(1),
(2), (4) Date: Feb. 7, 2014

(87) PCT Pub. No.: WO2013/021679
PCT Pub. Date: Feb. 14, 2013

(65) Prior Publication Data
US 2014/0169873 A1    Jun. 19, 2014

(30) Foreign Application Priority Data

Aug. 8, 2011  (JP) .................................. 2011-173385
Sep. 21, 2011  (JP) .................................. 2011-205887

(51) Int. Cl.
*E05C 3/06*      (2006.01)
*B60N 2/015*     (2006.01)
*E05C 3/16*      (2006.01)

(52) U.S. Cl.
CPC ........ *B60N 2/01508* (2013.01); *B60N 2/01583* (2013.01)
USPC ........................... 292/216; 292/194; 296/65.01

(58) Field of Classification Search
USPC .......... 292/201, 216, DIG. 23, 194; 296/65.01
See application file for complete search history.

(56) References Cited

U.S. PATENT DOCUMENTS

| | | | | |
|---|---|---|---|---|
| 2,924,473 | A | * | 2/1960 | Krause ............................ 292/11 |
| 4,869,536 | A | * | 9/1989 | Kleefeldt ....................... 292/210 |
| 5,150,933 | A | * | 9/1992 | Myslicki et al. ............... 292/216 |
| 5,738,393 | A | * | 4/1998 | Chao .............................. 292/216 |
| 6,581,987 | B1 | * | 6/2003 | Gentile et al. ................. 292/216 |

(Continued)

FOREIGN PATENT DOCUMENTS

| | | |
|---|---|---|
| JP | 10-324182 | 12/1998 |
| JP | 3908506 B2 | 4/2007 |
| JP | 4638936 B2 | 2/2011 |

OTHER PUBLICATIONS

International Search Report dated Jul. 24, 2012 issued in connection with International Application No. PCT/JP2012/059231.

*Primary Examiner* — Carlos Lugo
(74) *Attorney, Agent, or Firm* — Foley & Lardner LLP

(57) ABSTRACT

A hook lever engages with a striker which enters as far as a deep side in an entering direction of the striker to hold the striker by moving from an opening position to an engagement position while being guided by a hook shaft provided on the deep side in the entering direction of the striker, and a guide lever is guided by the hook shaft and is biased from the deep side to an entrance side in the entering direction of the striker to restrict the movement of the hook lever towards the engagement position, while the guide lever is pressed against by the striker when the striker enters in the entering direction so as to move the hook lever to the engagement position, in such a state that the guide lever is partially overlapped on the hook lever.

17 Claims, 32 Drawing Sheets

(56) References Cited

U.S. PATENT DOCUMENTS

| | | | |
|---|---|---|---|
| 6,733,078 B1 * | 5/2004 | Zelmanov | 297/378.1 |
| 7,338,128 B2 * | 3/2008 | Inoue et al. | 297/378.13 |
| 7,959,205 B2 * | 6/2011 | Paing et al. | 296/65.03 |
| 8,376,418 B2 * | 2/2013 | Osvatic et al. | 292/216 |
| 8,544,931 B2 * | 10/2013 | Park et al. | 296/65.03 |

* cited by examiner

FRONT OF VEHICLE ←    REAR OF VEHICLE →

FRONT OF VEHICLE ←    REAR OF VEHICLE →

LOCK APPARATUS

CROSS REFERENCE TO RELATED APPLICATIONS

The present application is a U.S. National Stage of International Application No. PCT/JP2012/059231 filed on Apr. 4, 2012, which claims the benefit of Japanese Patent Application No. 2011-173385 filed on Aug. 8, 2011 and Japanese Patent Application No. 2011-205887 filed on Sep. 21, 2011. The entire disclosures of which are incorporated herein by reference.

TECHNICAL FIELD

The present invention relates to a lock apparatus for use in fixing a detachable seat or a movable seat.

BACKGROUND ART

One box cars and the like are designed not only to accommodate occupants but also to load cargo, so that an average number of seats and a cargo space are provided. Additionally, in many cases, seats other than a driver's seat and a front passenger's seat are made up of detachable seats or movable seats. Then, when there is much cargo to be loaded in the vehicle, the detachable seat or seats are detached or the movable seat or seats are moved to ensure a loading space for the cargo.

A lock apparatus used to fix the detachable seat or the movable seat is mounted on either of a vehicle main body or the seat and fixes the seat or the like by being brought into engagement with a striker which is mounted on the other of the vehicle main body and the seat. In this way, the lock apparatus used to fix the detachable seat or the movable seat is mounted on either of the vehicle main body and the seat and includes a hook lever which is brought into engagement with the striker which is mounted on the other of the vehicle main body and the seat. The hook lever is intended to be brought into engagement with the striker which enters the lock apparatus relative thereto to hold it. There are hook levers, one of which moves from an engagement position (a waiting position) to an opening position as a result of the striker entering the lock apparatus and thereafter moves from the opening position to the engagement position to thereby be brought into engagement with the striker that has entered the lock apparatus to hold it, and the other of which moves from an opening position to an engagement position after the striker has entered the lock apparatus to thereby be brought into engagement with the striker to hold it.

The hook lever which moves from the engagement position (the waiting position) to the opening position as a result of the striker entering the lock apparatus and thereafter moves from the opening position to the engagement position to thereby be brought into engagement with the striker to hold it needs to be provided with a sliding contact surface (a sliding contact surface which is inclined with respect to the entering direction of the striker) which is brought into sliding contact with the striker which enters the lock apparatus relative thereto to thereby move the hook lever from the engagement position (the waiting position) to the opening position, and therefore, the hook lever inevitably becomes large in size, and the lock apparatus becomes large in size in the moving direction of the hook lever (for example, refer to PTL 1).

On the other hand, the hook lever which moves from the opening position to the engagement position after the striker has entered the lock apparatus to thereby be brought into engagement with the striker to hold it cannot move from the opening position to the engagement position by itself, and therefore, the hook lever needs a guide lever which moves the hook lever from the opening position to the engagement position (for example, refer to PTL 2).

For example, in the case of PTL 2, a lock apparatus is proposed which includes, in addition to a hook lever, a guide lever which moves the hook lever from an opening position to an engagement position by rotating as a result of an end portion thereof moving from an entrance side towards a deep side in an entering direction of a striker. The guide lever described in PTL 2 is designed to rotate about a guide shaft provided at the entrance side in the entering direction of the striker. Thus, in order for the end portion to move from the entrance side to the deep side in the entering direction of the striker, a long length needs to be taken from an end portion of the guide shaft (a rotation center of the guide lever) to the end portion, and this enlarges the lock apparatus in the moving direction of the guide lever. The guide lever moves in the same direction as a direction in which the hook lever moves, as a result of which the lock apparatus is enlarged in the moving direction of the hook lever.

In addition, as a fixing construction of a detachable seat or a movable seat which employs the lock apparatus, for example, a hinge hole is provided at an end of a rail which supports the seat, while the hook lever is mounted at the other end of the rail. Then, one end portion of the rail is mounted so that the hinge hole supports rotatably a hinge shaft provided on a floor surface, whereby the detachable seat or the movable seat is allowed to rotationally move about the hinge shaft. In addition, the hook lever mounted at the other end of the rail is brought into engagement with a striker provided on the floor surface in such a state that the detachable seat or the movable seat is allowed to rotationally move about the hinge shaft, whereby the detachable seat or the movable seat is fixed to the floor surface.

Here, when the distance between the hinge shaft and the striker is shorter or longer than a reference distance due to a mounting error of the hinge shaft or the striker or the like, the hook lever is not allowed to engage with the striker, and therefore, the detachable seat or the movable seat cannot be fixed to the floor surface.

To eliminate these situations, a lock apparatus is proposed in which a case is extended to an area above a rotational area of a hook lever to configure a mounting portion, and a round hole (a mounting hole) is provided in the center of the mounting portion, while arc-shaped elongated holes (mounting holes) which are centered at the round hole are provided on both sides of the round hole. According to this lock apparatus, even when the distance between a hinge shaft and a striker is shorter or longer due to a mounting error of the hinge shaft or the striker, the hook lever is allowed to engage with the striker by the lock apparatus rotationally moving around the round hole, whereby the detachable seat or the movable seat can be fixed to the floor surface (for example, refer to PTL 3). However, since the case is extended to the area above the rotational area of the hook lever to configure the mounting portion, the lock apparatus is enlarged as a whole. Additionally, since the round hole and the elongated holes are provided in positions spaced away from the striker which is in an engagement state, in the event that a large force is applied to the hook lever via the striker, there is a possibility that the case is turned up.

CITATION LIST

Patent Literature

PTL 1: Japanese Patent No. 4638936
PTL 2: Japanese Patent No. 3908506
PTL 3: JP-A-10-324182

SUMMARY OF THE INVENTION

Technical Problem

In a lock apparatus used to fix a detachable seat or a movable seat, a certain degree of freedom is required for a mounting position, and therefore, a lock apparatus is desired which can realize a reduction in size thereof.

The invention has been made in view of the above desire, and an object thereof is to provide a lock apparatus which can realize a reduction in size thereof.

Solution to Problem

In order to solve the above-described problems and to achieve the above objects, one aspect of the invention provides a lock apparatus comprising: a hook lever configured to be brought into engagement with a striker which enters as far as a deep side in an entering direction of the striker to hold the striker by moving from an opening position to an engagement position while being guided by a hook shaft that is provided on the deep side in the entering direction of the striker; and a guide lever configured to be guided by a guide shaft, which is provided on the deep side in the entering direction of the striker, in a state where the guide lever is partially overlapped on the hook lever, and to be biased from the deep side to an entrance side in the entering direction of the striker so as to restrict the movement of the hook lever from the opening position to the engagement position, wherein the guide lever is configured to, upon being pressed against by the striker when the striker enters as far as the deep side in the entering direction thereof, move the hook lever from the opening position to the engagement position.

Advantageous Effects of Invention

According to the lock apparatus of the invention, the hook lever is brought into engagement with the striker which enters as far as the deep side in the entering direction of the striker to hold it by moving from the opening position to the engagement position while being guided by the hook shaft which is provided on the deep side in the entering direction of the striker, and the guide lever is not only guided by the guide shaft provided on the deep side in the entering direction of the striker but also biased from the deep side to the entrance side in the entering direction of the striker so as to restrict the movement of the hook lever from the opening position towards the engagement position, while the guide lever is pressed against by the striker when the striker enters as far as the deep side in the entering direction thereof so as to move the hook lever from the opening position to the engagement position, in such a state that the guide lever is partially overlapped on the hook lever, and therefore, the hook lever and the guide lever can be made small in size, whereby a lock apparatus is allowed to be made small in size.

BRIEF DESCRIPTION OF DRAWINGS

FIG. 3-1 is a conceptual drawing which shows the operation of the hook lever, the drawing showing a state in which the hook lever moves to an initial position.

FIG. 3-2 is a conceptual drawing which shows the operation of the hook lever, the drawing showing a state resulting immediately before the hook lever receives a striker therein.

FIG. 3-3 is a conceptual drawing which shows the operation of the hook lever, the drawing showing a state in which the hook lever moves to an engagement position.

FIG. 3-4 is a conceptual drawing which shows the operation of the hook lever, the drawing showing a state in which the hook lever moves to an opening position.

FIG. 4-1 is a drawing which shows a state in which the hook lever moves to the initial position with the striker lying further forwards than a reference position.

FIG. 4-2 is a drawing which shows a state resulting immediately before the hook lever receives the striker therein with the striker lying further forwards than the reference position.

FIG. 4-3 is a drawing which shows a state in which the hook lever moves to the engagement position with the striker lying further forwards than the reference position.

FIG. 4-4 is a drawing which shows a state in which the hook lever moves to the opening position with the striker lying further forwards than the reference position.

FIG. 5-1 is a drawing which shows a state in which the hook lever moves to the initial position with the striker lying further rearwards than the reference position.

FIG. 5-2 is a drawing which shows a state resulting immediately before the hook lever receives the striker therein with the striker lying further rearwards than the reference position.

FIG. 5-3 is a drawing which shows a state in which the hook lever moves to the engagement position with the striker lying further rearwards than the reference position.

FIG. 5-4 is a drawing which shows a state in which the hook lever moves to the opening position with the striker lying further rearwards than the reference position.

FIG. 13-1 is a conceptual drawing which shows the operation of the hook lever, the drawing showing a state in which the hook lever moves to an initial position.

FIG. 13-2 is a conceptual drawing which shows the operation of the hook lever, the drawing showing a state resulting immediately before the hook lever receives a striker therein.

FIG. 13-3 is a conceptual drawing which shows the operation of the hook lever, the drawing showing a state in which the hook lever moves to an engagement position.

FIG. 13-4 is a conceptual drawing which shows the operation of the hook lever, the drawing showing a state in which the hook lever moves to an opening position.

FIG. 14-1 is a drawing which shows a state in which the hook lever moves to the initial position with the striker lying further forwards than a reference position.

FIG. 14-2 is a drawing which shows a state resulting immediately before the hook lever receives the striker therein with the striker lying further forwards than the reference position.

FIG. 14-3 is a drawing which shows a state in which the hook lever moves to the engagement position with the striker lying further forwards than the reference position.

FIG. 14-4 is a drawing which shows a state in which the hook lever moves to the opening position with the striker lying further forwards than the reference position.

FIG. 15-1 is a drawing which shows a state in which the hook lever moves to the initial position with the striker lying further rearwards than the reference position.

FIG. 15-2 is a drawing which shows a state resulting immediately before the hook lever receives the striker therein with the striker lying further rearwards than the reference position.

FIG. 15-3 is a drawing which shows a state in which the hook lever moves to the engagement position with the striker lying further rearwards than the reference position.

FIG. 15-4 is a drawing which shows a state in which the hook lever moves to the opening position with the striker lying further rearwards than the reference position.

FIG. 17-1 is a conceptual drawing which shows the operation of the hook lever, the drawing showing a state in which a hook lever moves to an opening position.

FIG. 17-2 is a conceptual drawing which shows the operation of the hook lever, the drawing showing a state in which the hook lever moves to an engagement position.

FIG. 17-3 is a conceptual drawing which shows the operation of the hook lever, the drawing showing a state in which the hook lever is operated to open entrance grooves.

FIG. 21-1 is a drawing which shows a relationship between a hook lever and a guide lever, the drawing showing a state in which a striker is positioned at an entrance side in an entering direction thereof.

FIG. 21-2 is a drawing which shows the relationship between the hook lever and the guide lever, the drawing showing a state in which the striker enters slightly from the entrance side towards a deep side in the entering direction thereof.

FIG. 21-3 is a drawing which shows the relationship between the hook lever and the guide lever, the drawing showing a state in which the striker enters further from the entrance side towards the deep side in the entering direction thereof.

FIG. 21-4 is a drawing which shows the relationship between the hook lever and the guide lever, the drawing showing a state in which the striker is positioned at the deep side in the entering direction thereof.

FIG. 21-5 is a drawing which shows the relationship between the hook lever and the guide lever, the drawing showing a state in which the hook lever is brought into engagement with the striker which has moved to the deep side in the entering direction thereof.

FIG. 22-1 is a drawing which shows a relationship among the hook lever, the guide lever and an opening lever, the drawing showing a state in which the hook lever is brought into engagement with the striker which has moved to the deep side in the entering direction thereof.

FIG. 22-2 is a drawing which shows a relationship among the hook lever, the guide lever and an opening lever, the drawing showing a state in which the opening lever is slightly rotated from the state shown in FIG. 22-1.

FIG. 22-3 is a drawing which shows a relationship among the hook lever, the guide lever and an opening lever, the drawing showing a state in which the opening lever is rotated further from the state shown in FIG. 22-2.

FIG. 22-4 is a drawing which shows a relationship among the hook lever, the guide lever and an opening lever, the drawing showing a state in which the striker is allowed to be disengaged from the hook lever.

FIG. 22-5 is a drawing which shows a relationship among the hook lever, the guide lever and an opening lever, the drawing showing a state in which the striker is pushed out slightly from the state shown in FIG. 22-4.

FIG. 22-6 is a drawing which shows a relationship among the hook lever, the guide lever and an opening lever, the drawing showing a state in which the striker is disengaged from the state shown in FIG. 22-5.

FIG. 22-7 is a drawing which shows a relationship among the hook lever, the guide lever and an opening lever, the drawing showing a state in which the opening lever is rotated reversely from the state shown in FIG. 22-6.

FIG. 23-1 is a drawing which shows a state resulting immediately before the striker enters towards the deep side in the entering direction thereof with the striker lying in a reference position.

FIG. 23-2 is a drawing which shows a state in which the striker enters towards the deep side in the entering direction thereof with the striker lying in the reference position.

FIG. 24-1 is a drawing which shows a state resulting immediately before the striker enters towards the deep side in the entering direction thereof with the striker lying further forwards than the reference position.

FIG. 24-2 is a drawing which shows a state in which the striker enters towards the deep side in the entering direction thereof with the striker lying further forwards than the reference position.

FIG. 25-1 is a drawing which shows a state resulting immediately before the striker enters towards the deep side in the entering direction thereof with the striker lying further rearwards than the reference position.

FIG. 25-2 is a drawing which shows a state in which the striker enters towards the deep side in the entering direction thereof with the striker lying further forwards than the reference position.

FIG. 26-1 is a drawing which shows a lock apparatus in which a guide shaft is provided at a side thereof which faces a front of the vehicle, the drawing showing a state resulting immediately before a striker enters towards a deep side in an entering direction thereof.

FIG. 26-2 is a drawing which shows the lock apparatus in which the guide shaft is provided at the side thereof which faces the front of the vehicle, the drawing showing a state in which the striker enters towards the deep side in the entering direction thereof.

DESCRIPTION OF EMBODIMENTS

Hereinafter, embodiments of the invention will be described in detail based on the drawings. It is noted that herein, while the invention is described as being applied to a lock apparatus which is used to fix a seat, the invention is not limited by the embodiments.

Embodiment 1

Figure 1:
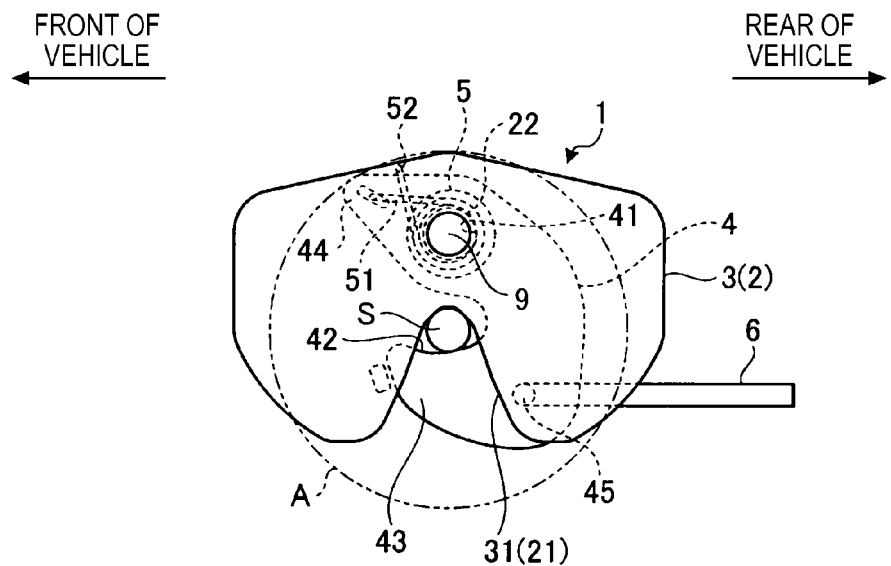
FIG. 1 is a conceptual drawing which shows the configuration of a lock apparatus which configures Embodiment 1 of the invention.
Figure 2:
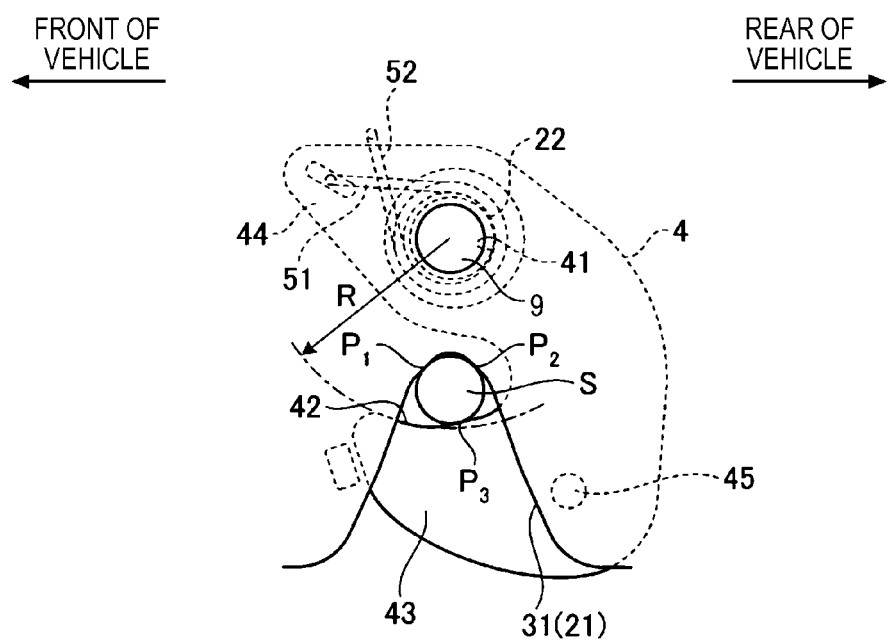
FIG. 2 is an enlarged view which shows a relationship between a hook lever and entrance grooves which are shown in FIG. 1.

FIG. 1 is a conceptual drawing which shows the configuration of a lock apparatus which configures Embodiment 1 of the invention. FIG. 2 is an enlarged view which shows a relationship between a hook lever and entrance grooves which are shown in FIG. 1.

A lock apparatus 1 described here as an example is used to fix a detachable seat or a movable seat and includes a case made up of a base plate 2 and a body plate 3 which is attached to the base plate 2 in such a manner as to be superposed thereon and which is attached to the seat. Additionally, a hook accommodating portion is defined between the base plate 2 and the body plate 3, and a hook lever 4 is accommodated in an interior thereof. The hook lever 4 is designed to be brought into engagement with a striker S which is provided on a vehicle main body.

Additionally, entrance grooves 21, 31 are formed in the base plate 2 and the body plate 3, respectively, in substantially longitudinal central positions thereof as seen in a front-to-rear or longitudinal direction of the vehicle. The entrance grooves 21, 31 are formed so as to extend in a direction in which the striker S is allowed to enter the interior of the lock apparatus 1. For example, when the lock apparatus 1 of Embodiment 1 engages with the striker S which is provided on a floor surface of a vehicle main body, an entering direction of the striker S is substantially vertical, and the entrance grooves 21, 31 are formed so as to extend substantially vertically from the floor surface towards a ceiling of the vehicle main body. The entrance grooves 21, 31 are formed to have a width which enables the accommodation of the striker S therein, and deepest portions thereof are formed to have a gradually decreasing width towards a deepest point so that the deepest portions contact the striker S which enters at two points $P_1$, $P_2$ as shown in FIG. 2. A cylindrical hook shaft 22 is provided in a position lying above the entrance grooves 21, 31 so as to extend substantially horizontally along a widthwise direction of the vehicle main body. The hook lever 4 is fitted on the hook shaft 22 so as to rotationally move therearound.

A shaft hole 41 is formed in the hook lever 4 in the center thereof for the hook shaft 22 to fit therein, and an engagement groove 42, a hook portion 43, a spring attaching portion 44 and a rod attaching portion 45 are formed along an outer circumference of the shaft hole 41.

Figures 1, 3:
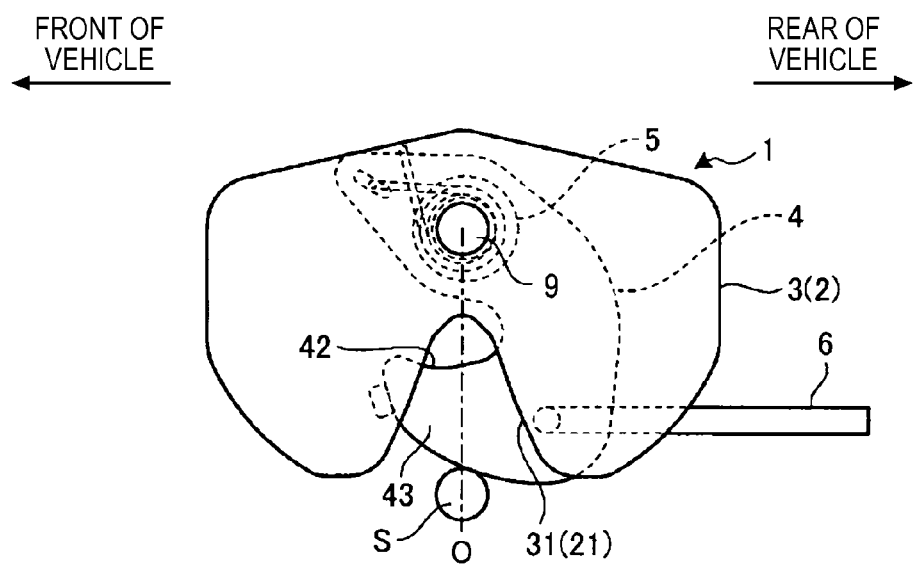
Figures 2, 3:
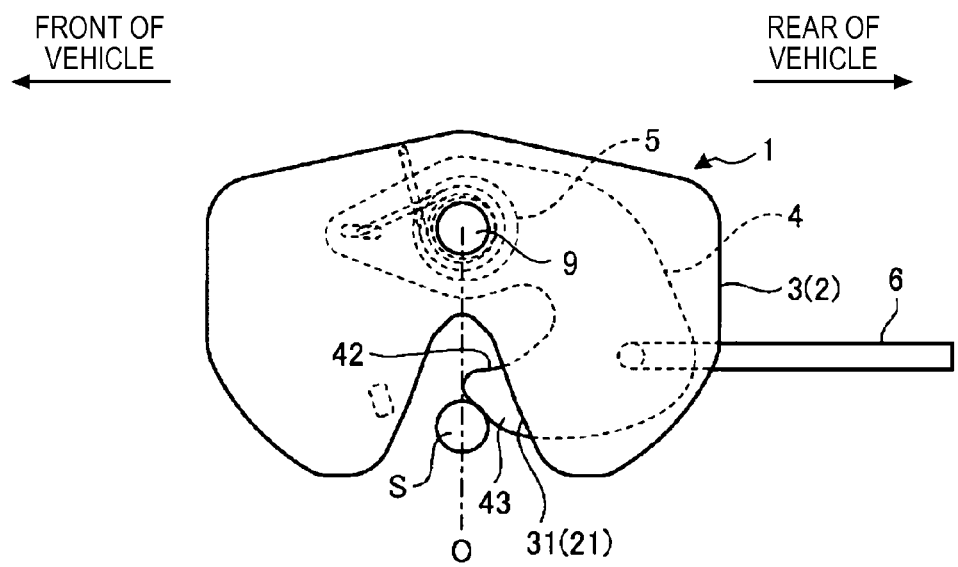
Figure 3:
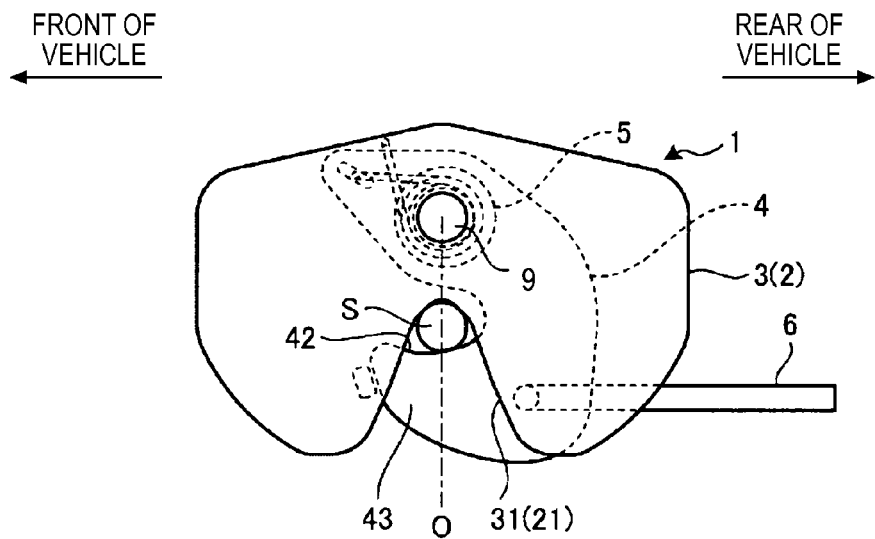

The engagement groove 42 is formed into an arc-like shape which extends inwards from an outer circumferential surface of the hook lever 4 centering at the shaft hole 41. The engagement groove 42 is given a width which enables the accommodation of the striker S therein. An open end portion (a distal end portion) of the engagement groove 42 is formed into an arc-like shape with a radius R centering at the shaft hole 41. By adopting this configuration, even though a force is applied to the striker S which is in engagement with the engagement groove 42 in a direction in which the striker S is disengaged, the rotational movement of the hook lever 4 can be restrained, thereby making it possible to prevent the striker S from being disengaged from the hook lever 4. Further, a portion of the engagement groove 42 extending from a middle portion to a deep portion thereof is formed into a tapered shape so that a width of the engagement groove 42 gradually narrows. By adopting this configuration, as shown in FIG. 3-3, the hook lever 4 which is in engagement with the striker S rotationally moves clockwise by means of an elastic restoring force of a hook spring 5 so that the striker S is supported at the deepest portions of the entrance grooves 21, 31 and a point $P_3$ on an inner wall of the engagement groove 42, whereby the seat is fixed in an ensured fashion without generating a rattling looseness between the lock apparatus 1 and the striker S.

Figures 3, 4:
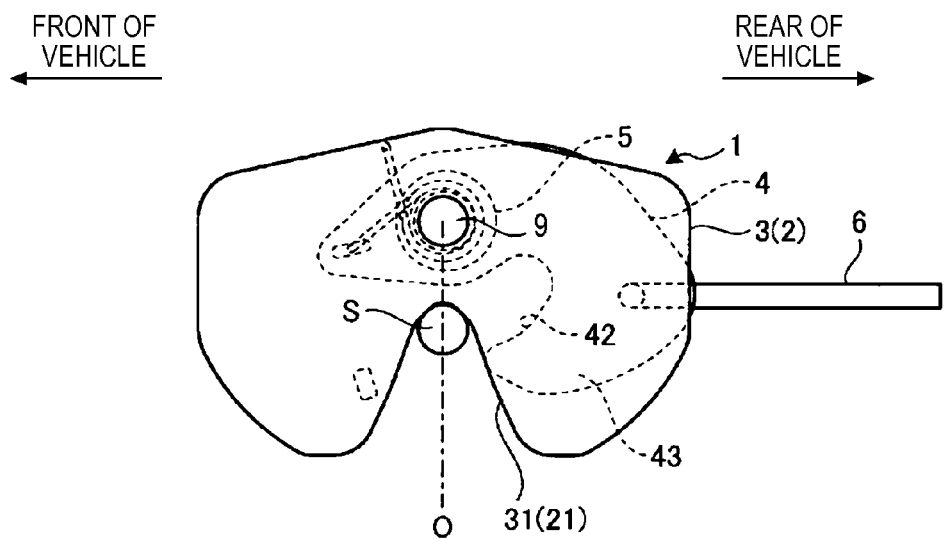
Figures 1, 4:
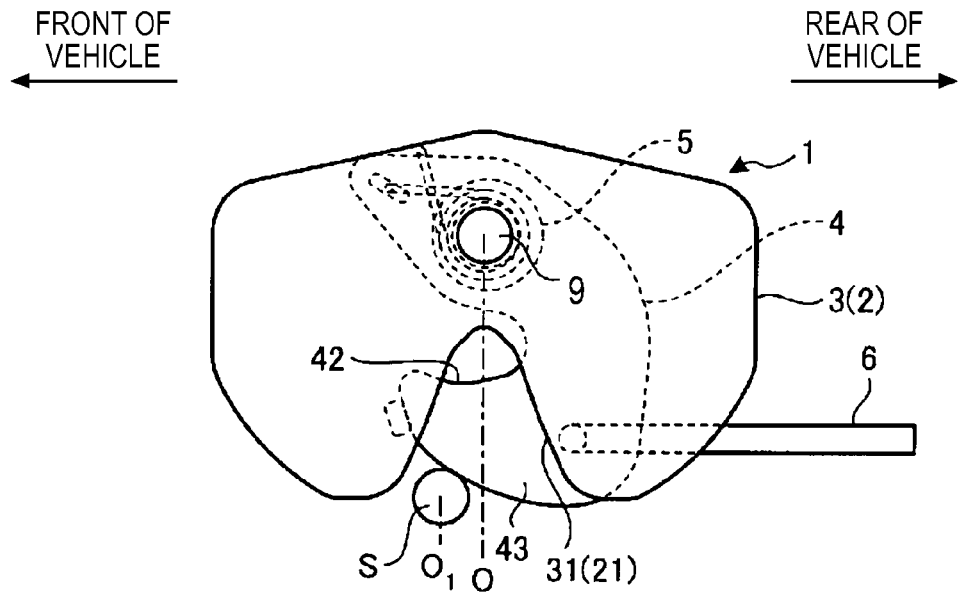
Figures 2, 4:
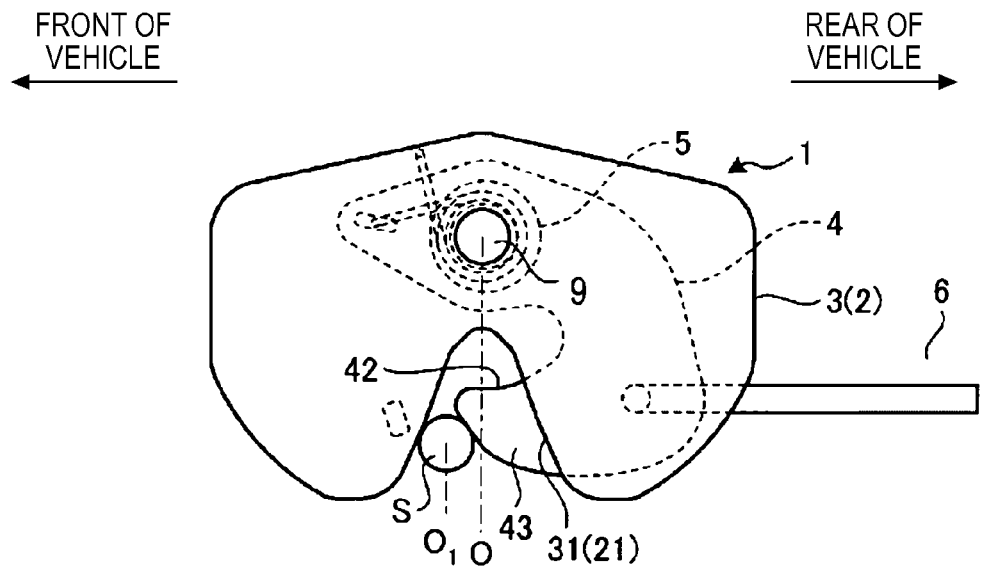
Figures 3, 4:
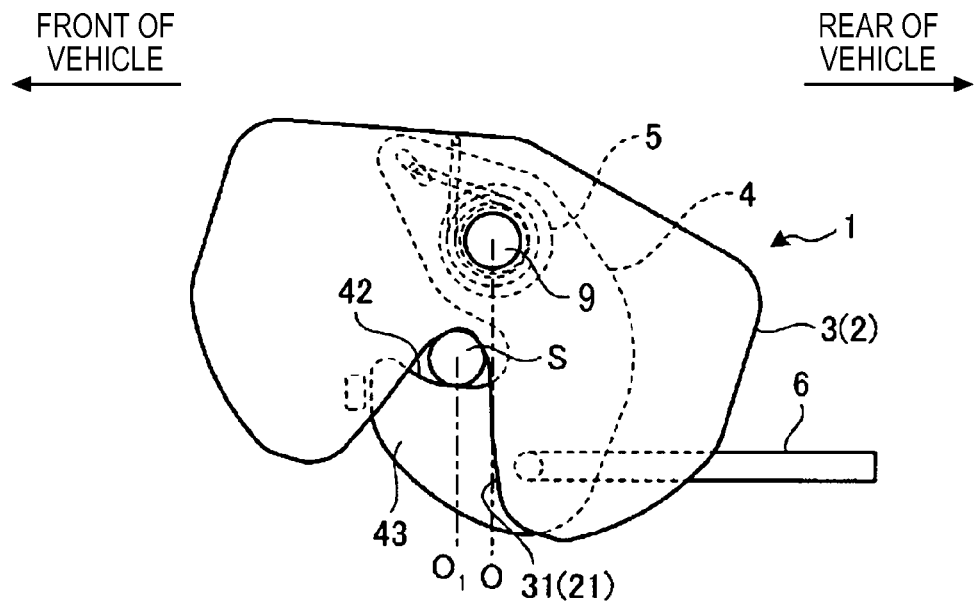
Figure 4:
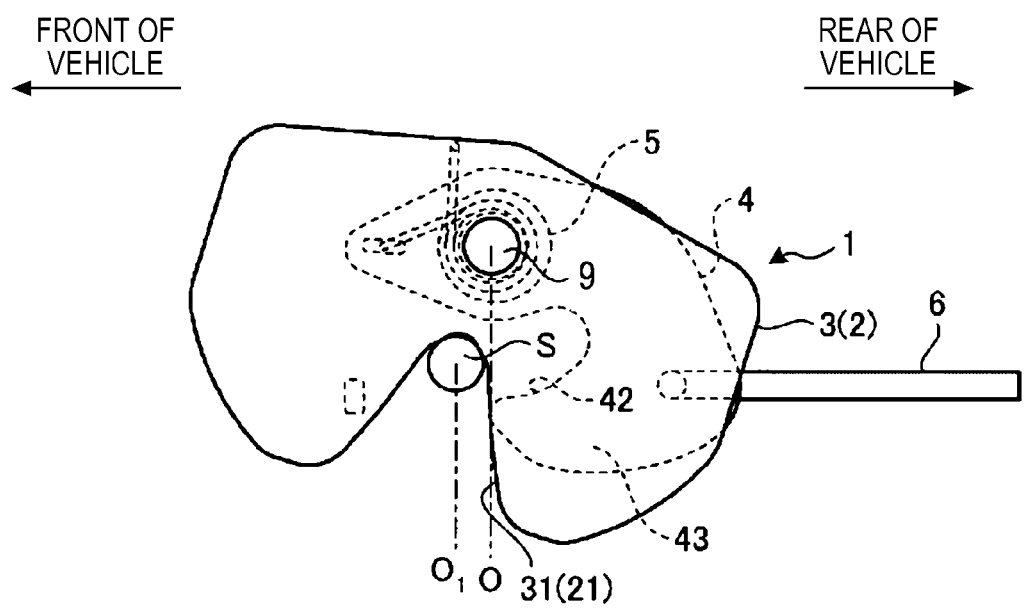

With the engagement groove 42 opened towards a side which faces a front of the vehicle, the hook portion 43 is a portion which is positioned below the engagement groove 42. This hook portion 43 is formed so that when the hook lever 4 is rotationally moved clockwise in FIG. 3, the hook portion 43 stops in a position where the hook portion 43 crosses the entrance grooves 21, 31 (an initial position, an engagement position) as shown in FIGS. 3-1 and 3-3, while when the hook lever 4 is rotationally moved counterclockwise in FIG. 3, the hook portion 43 stops in a position where the hook portion 43 opens the entrance grooves (an opening position) as shown in FIG. 3-4.

The spring attaching portion 44 is a portion which extends in an arbitrary direction (outwards) along a diametrical direction of the shaft hole 41. One end 51 of the hook spring (a torsional coil spring) 5 which is wound around the hook shaft 22 is attached to the spring attaching portion 44, and the other end 52 is attached to the base plate 2. By adopting this configuration, a clockwise elastic restoring force is applied to the hook lever 4 at all times as seen in FIG. 3, and this makes the hook lever 4 stop in the initial position and the engagement position (refer to FIGS. 3-1, 3-3).

The rod attaching portion 45 is a portion which is provided between the shaft hole 41 and the hook portion 43, and a rod (a pull rod) 6 is attached to the rod attaching portion 45. Then, when the rod 6 is pulled against the elastic restoring force of the hook spring 5, the hook lever 4 rotationally moves counterclockwise as seen in FIG. 3 (refer to FIG. 3-4).

In the lock apparatus 1 configured as described above, in such a state that the seat (not shown) has not yet been fixed to a floor (not shown), the hook lever 4 is disposed in the initial position as shown in FIG. 3-1. When the seat is inclined from that state, the striker S which is provided on the floor is brought into abutment with an outer circumference of the hook portion 43 to press against the outer circumference of the hook portion 43. This rotationally moves the hook lever 4 counterclockwise as seen in FIG. 3 against the elastic restoring force of the hook spring 5. Then, the hook lever 4 rotationally moves to a position which enables the striker S to enter the entrance grooves 21, 31.

When the seat is inclined further from the state described above, the striker S enters the entrance grooves 21, 31, while the elastic restoring force of the hook spring 5 is applied to the hook lever 4, whereby the hook lever 4 rotationally moves clockwise as seen in FIG. 3. Then, the striker S reaches the deepest portions of the entrance grooves 21, 31. In this state, the striker S is brought into abutment with the inner wall of the engagement groove 42, and therefore, the clockwise rotational movement of the hook lever 4 is prevented against the elastic restoring force of the hook spring 5. This enables the striker S to be supported at the two points $P_1$, $P_2$ of the deepest portions of the entrance grooves 21, 31 which gradually narrow towards the deepest point and the point $P_3$ on the inner wall of the engagement groove 42, as shown in FIG. 2. Moreover, as shown in FIG. 3-3, since the hook portion 43 of the hook lever 4 is disposed so as to cross the entrance grooves 21, 31, a situation in which the striker S moves in a direction in which the striker S is disengaged from the entrance grooves 21, 31, that is, an erecting operation of the seat relative to the floor is prevented by the hook portion 43 (an engagement state).

Further, when the rod 6 is pulled from the engagement state described above against the elastic restoring force of the hook spring 5, the hook lever 4 rotationally moves counterclockwise as seen in FIG. 3. As a result of this, as shown in FIG. 3-4, the entrance grooves 21, 31 are opened, which enables the striker S to move in a direction in which the striker S is disengaged from the entrance grooves 21, 31, whereby the seat can be operated to be erected relative to the floor.

The lock apparatus 1 described above includes a fastening member 9 which fastens the base plate 2 to the seat so as to move relative to the striker S within a range defined by projecting an area A onto the base plate 2, as shown in FIG. 1. The area A has a radius centering at the striker S which is in engagement with the hook lever 4, and the radius is equal to a length to an outermost position of the hook lever 4 being in engagement with the striker S.

The fastening member 9 is a stepped screw having a shank portion and penetrates axially the cylindrical hook shaft 22 to thereby pass through a rotation center of the hook lever 4 so as to fasten the base plate 2 and the body plate 3 together so as to move relative to the striker S. By adopting this configuration, compared with a construction in which the fastening member 9 does not penetrate the hook shaft 22, the lock apparatus 1 can be made smaller in size.

In the lock apparatus 1 which is fastened by the fastening member 9 described above, as shown in FIG. 4, even with the striker S mounted in a front position $O_1$ which lies further forwards than a reference position O, by rotationally moving the base plate 2 and the body plate 3 clockwise as seen in FIG. 4, the striker S is allowed not only to enter the entrance grooves 21, 31 to the deepest portions thereof but also to be brought into abutment with the inner wall of the engagement groove 42.

To describe this specifically, when the seat (not shown) is not yet fastened to the floor (not shown), as shown in FIG. 4-1, the hook lever 4 is disposed in the initial position. When the seat is inclined from that state, the striker S which is provided on the floor is brought into abutment with the outer circumference of the hook portion 43 to press against the outer circumference of the hook portion 43. This rotationally moves the hook lever 4 counterclockwise as seen in FIG. 4 against the elastic restoring force of the hook spring 5. Then, the hook lever 4 rotationally moves to a position which enables the striker S to enter the entrance grooves 21, 31.

When the seat is inclined further from the state described above, the striker S enters the entrance grooves 21, 31, while the elastic restoring force of the hook spring 5 is applied to the hook lever 4, whereby the hook lever 4 rotationally moves clockwise as seen in FIG. 4. Then, the striker S rotationally moves the base plate 2 and the body plate 3 clockwise along the entrance grooves 21, 31 and reaches the deepest portions of the entrance grooves 21, 31. In this state, the base plate 2 and the body plate 3 are inclined so that their front ends which face the front of the vehicle are raised and the striker S is brought into abutment with the inner wall of the engagement groove 42. This prevents the clockwise rotational movement of the hook lever 4 against the elastic restoring force of the hook spring 5, whereby the striker S is allowed to be supported at the two points of the deepest portions of the entrance grooves 21, 31 which gradually narrow towards the deepest point and the point on the inner wall of the engagement groove 42. Moreover, as shown in FIG. 4-3, since the hook portion 43 of the hook lever 4 is disposed so as to cross the entrance grooves 21, 31, a situation in which the striker S moves in a direction in which the striker S is disengaged from the entrance grooves 21, 31, that is, an erecting operation of the seat relative to the floor is prevented by the hook portion 43 (an engagement state).

Further, when the rod 6 is pulled from the engagement state described above against the elastic restoring force of the hook spring 5, the hook lever 4 rotationally moves counterclockwise as seen in FIG. 4. As a result of this, as shown in FIG. 4-4, the entrance grooves 21, 31 are opened, which enables the striker S to move in a direction in which the striker S is disengaged from the entrance grooves 21, 31, whereby the seat can be operated to be erected relative to the floor.

Figures 1, 5:
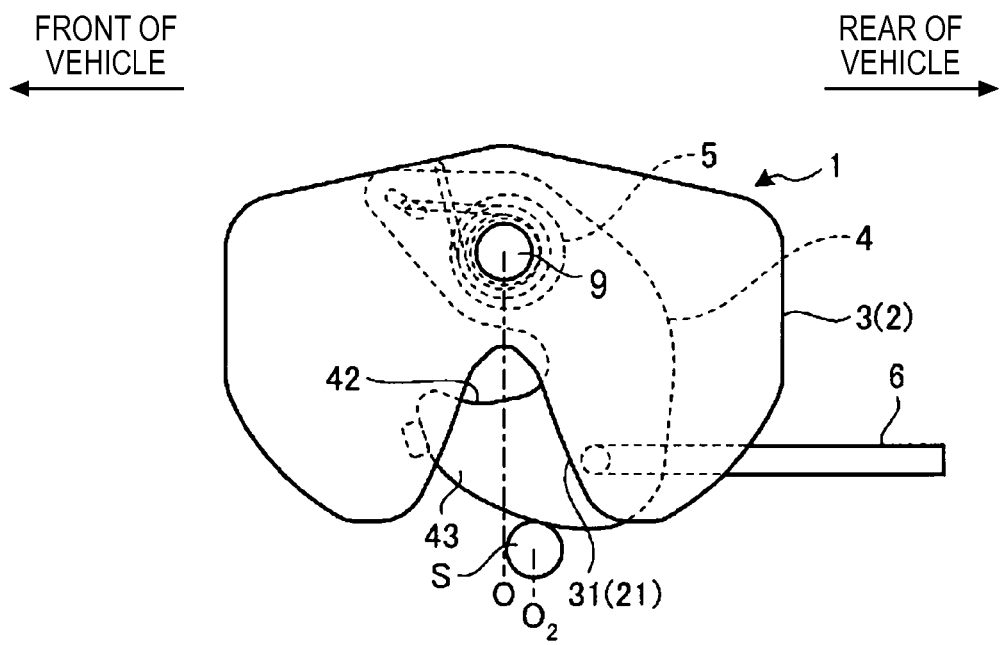
Figures 2, 5:
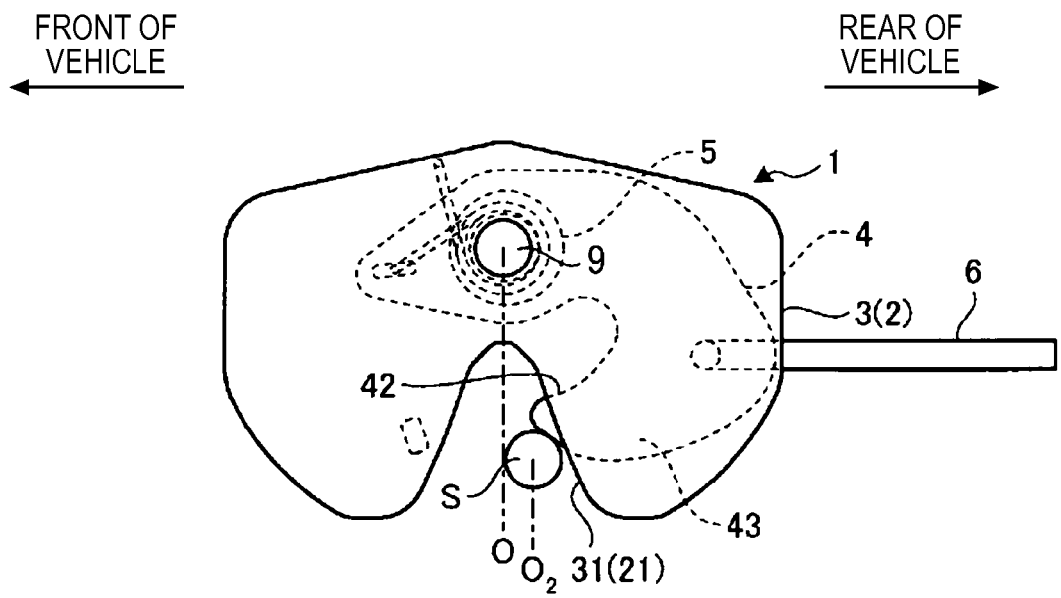
Figures 3, 5:
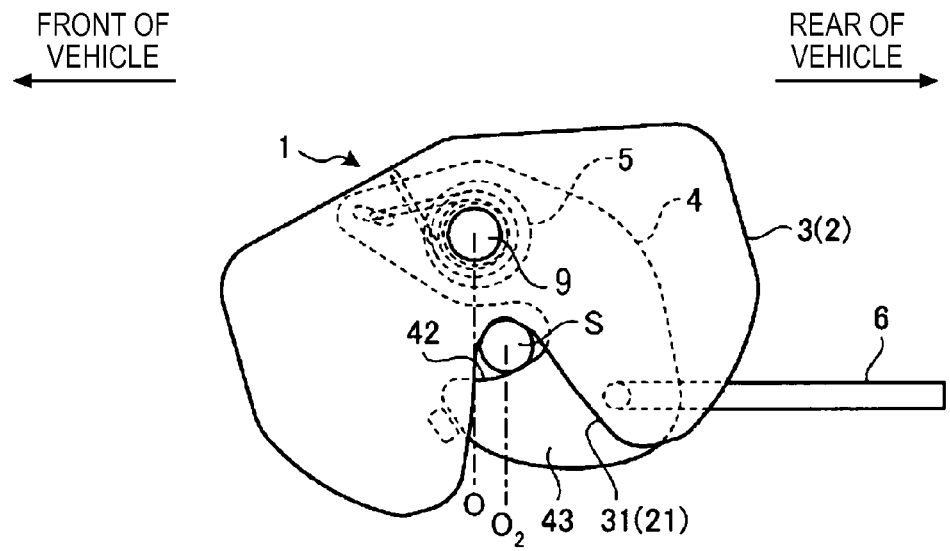
Figures 4, 5:
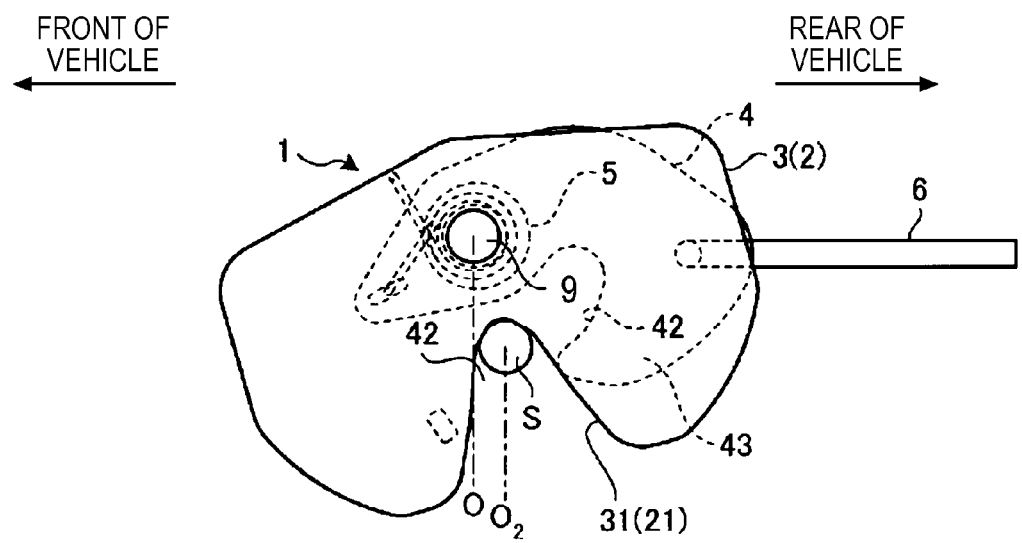

On the other hand, as shown in FIG. 5, even with the striker S mounted in a rear position $O_2$ which lies further rearwards than the reference position O, by rotationally moving the base plate 2 and the body plate 3 counterclockwise as seen in FIG. 5, the striker S is allowed not only to enter the entrance grooves 21, 31 to the deepest portions thereof but also to be brought into abutment with the inner wall of the engagement groove 42.

To describe this specifically, when the seat (not shown) is not yet fastened to the floor (not shown), as shown in FIG. 5-1, the hook lever 4 is disposed in the initial position. When the seat is inclined from that state, the striker S which is provided on the floor is brought into abutment with the outer circumference of the hook portion 43 to press against the outer circumference of the hook portion 43. This rotationally moves the hook lever 4 counterclockwise as seen in FIG. 5 against the elastic restoring force of the hook spring 5. Then, the hook lever 4 rotationally moves to a position which enables the striker S to enter the entrance grooves 21, 31.

When the seat is inclined further from the state described above, the striker S enters the entrance grooves 21, 31, while the elastic restoring force of the hook spring is applied to the hook lever 4, whereby the hook lever 4 rotationally moves clockwise as seen in FIG. 5. Then, the striker S rotationally moves the base plate 2 and the body plate 3 counterclockwise along the entrance grooves 21, 31 and reaches the deepest portions of the entrance grooves 21, 31. In this state, the base plate 2 and the body plate 3 are inclined so that their rear ends which face the rear of the vehicle are raised and the striker S is brought into abutment with the inner wall of the engagement groove 42. This prevents the clockwise rotational movement of the hook lever 4 against the elastic restoring force of the hook spring 5, whereby the striker S is allowed to be supported at the two points of the deepest portions of the entrance grooves 21, 31 which gradually narrow towards the deepest point and the point on the inner wall of the engagement groove 42. Moreover, as shown in FIG. 5-3, since the hook portion 43 of the hook lever 4 is disposed so as to cross the entrance grooves 21, 31, a situation in which the striker S moves in a direction in which the striker S is disengaged from the entrance grooves 21, 31, that is, an erecting operation of the seat relative to the floor is prevented by the hook portion 43 (an engagement state).

Further, when the rod 6 is pulled from the engagement state described above against the elastic restoring force of the hook spring 5, the hook lever 4 rotationally moves counterclockwise as seen in FIG. 5. As a result of this, as shown in FIG. 5-4, the entrance grooves 21, 31 are opened, which enables the striker S to move in a direction in which the striker S is disengaged from the entrance grooves 21, 31, whereby the seat can be operated to be erected relative to the floor.

The lock apparatus 1 described above, which configures Embodiment 1 of the invention, includes the fastening member 9 which fastens the base plate 2 so as to move relative to the striker S within the range defined by projecting the area A onto the base plate 2. The area A has a radius centering at the striker S which is in engagement with the hook lever 4, and the radius is equal to the length to the outermost position of the hook lever 4 which is in engagement with the striker S. Therefore, the lock apparatus 1 becomes small in size as a whole, and even though a large force is applied to the hook lever 4, there occurs no such situation that the base plate 2 and the body plate 3 are turned up.

Additionally, in the lock apparatus 1, with the striker S having reached the deepest portions of the entrance grooves 21, 31, the striker S is brought into abutment with the inner wall of the engagement groove 42. As this occurs, as shown in FIG. 2, the striker S is supported at the two points $P_1$, $P_2$ of the deepest portions of the entrance grooves 21, 31 which gradually narrow towards the deepest point and the point $P_3$ on the engagement groove 42, and therefore, the striker S is supported by the three points near a widthwise center of the entrance grooves 21, 31 to thereby be restrained. This eliminates the occurrence of a rattling looseness between the lock apparatus 1 and the striker S, whereby the seat is fixed in an ensured fashion. In addition, as this occurs, the hook lever 4 applies no force in the widthwise direction of the vehicle main body (a near side direction or a far side direction of the sheet of paper on which FIG. 2 is drawn), and therefore, there occurs no such situation that the base plate 2 and the body plate 3 are turned up.

Additionally, even with the striker S mounted in the front position $O_1$ which lies further forwards than the reference position O, in such a state that the striker S has reached the deepest portions of the entrance grooves 21, 31, the striker is brought into abutment with the inner wall of the engagement groove 42. As this occurs, too, as with the case where the striker S is mounted in the reference position O, as shown in FIG. 4-3, the striker S is supported at the two points of the deepest portions of the entrance grooves 21, 31 which gradually narrow towards the deepest point and the point on the engagement groove 42, and therefore, the striker S is supported by the three points near the widthwise center of the entrance grooves 21, 31 to thereby be restrained. This eliminates the occurrence of a rattling looseness between the lock apparatus 1 and the striker S, even with the striker S mounted in the front position $O_1$ which lies further forwards than the reference position O, whereby the seat is fixed in an ensured fashion. In addition, as this occurs, the hook lever 4 applies no force in the widthwise direction of the vehicle main body (a near side direction or a far side direction of each of sheets of paper on which FIG. 4 is drawn), and therefore, there occurs no such situation that the base plate 2 and the body plate 3 are turned up. Additionally, since the fastening member 9 passes through the rotation center of the hook lever 4 to be fastened, a gap between the striker S which is in engagement with the hook lever 4 and itself can be made small.

In addition, even with the striker S mounted in the rear position $O_2$ which lies further rearwards than the reference position O, in such a state that the striker S has reached the deepest portions of the entrance grooves 21, 31, the striker is brought into abutment with the inner wall of the engagement groove 42. As this occurs, too, as with the case where the striker S is mounted in the reference position O, as shown in FIG. 5-3, the striker S is supported at the two points of the deepest portions of the entrance grooves 21, 31 which gradually narrow towards the deepest point and the point on the engagement groove 42, and therefore, the striker S is supported by the three points near the widthwise center of the entrance grooves 21, 31 to thereby be restrained. This eliminates the occurrence of a rattling looseness between the lock apparatus 1 and the striker S, even with the striker mounted in the rear position $O_2$ which lies further rearwards than the reference position O, whereby the seat is fixed in an ensured fashion. In addition, as this occurs, the hook lever 4 applies no force in the widthwise direction of the vehicle main body (a near side direction or a far side direction of each of sheets of paper on which FIG. 5 is drawn), and therefore, there occurs no such situation that the base plate 2 and the body plate 3 are turned up.

Embodiment 2

Figure 6:
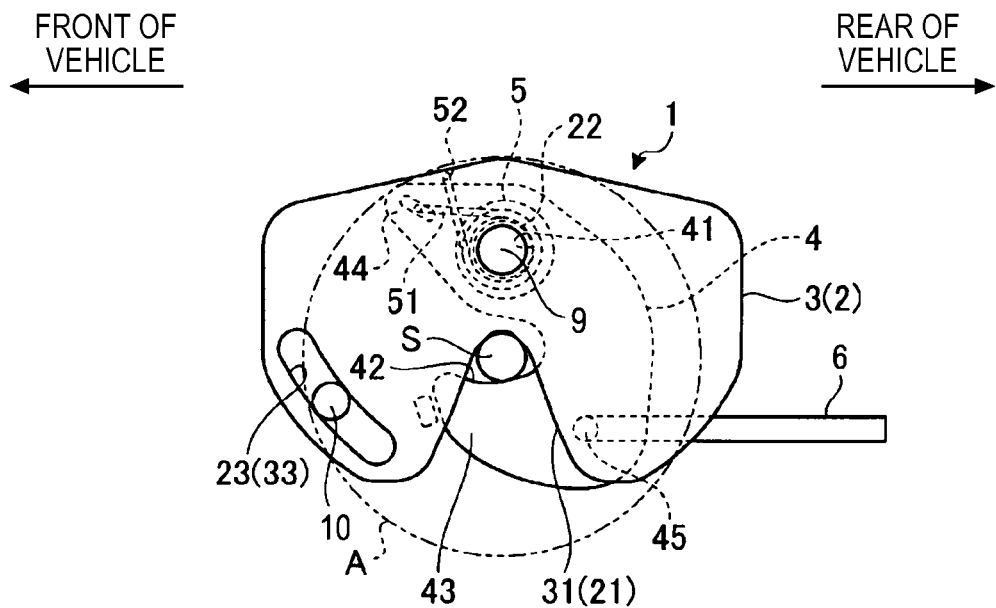
FIG. 6 is a conceptual drawing which shows the configuration of a lock apparatus which configures Embodiment 2 of the invention.

FIG. 6 is a conceptual drawing which shows the configuration of a lock apparatus which configures Embodiment 2 of the invention. Additionally, FIG. 7 is a drawing which shows in detail a cylindrical hook shaft shown in FIG. 6, and FIG. 8 is a drawing which shows in detail an elongated hole shown in FIG. 6.

The lock apparatus which configures Embodiment 2 of the invention is such that a second fastening member 10 is added further to the lock apparatus 1 which configures Embodiment 1 which has been described above, and like reference numerals will be given to configurations like to those of the lock apparatus of Embodiment 1 described above, and the description thereof will be omitted here.

As shown in FIG. 6, the second fastening member 10 fastens a base plate 2 and a body plate 3 so as to move relative to a striker S together with a fastening member 9 and is inserted through arc-shaped elongated holes 23, 33 which are provided in front sides of entrance grooves 21, 31 of the base plate 2 and the body plate 3 which face a front of the vehicle. The arc-shaped elongated holes 23, 33 are formed so as to be centered at a rotation center of a hook lever 4, or specifically, a center axis of a cylindrical hook shaft 22, and hence, there is no such situation that the second fastening member 10 interrupts the rotational movement of the base plate 2 and the body plate 3. Additionally, the arc-shaped elongated holes 23, 33 limit rotationally movable ranges of the base plate 2 and the body plate 3, respectively.

Figure 7:
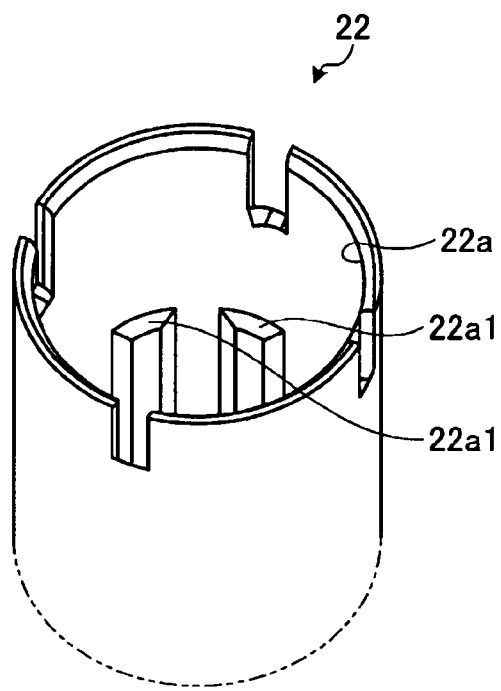
FIG. 7 is a drawing which shows in detail a cylindrical hook shaft shown in FIG. 6.
Figure 8:
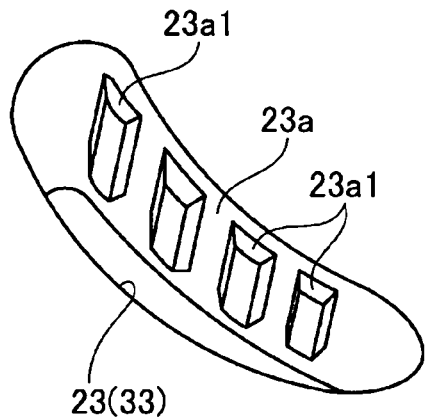
FIG. 8 is a drawing which shows in detail an elongated hole shown in FIG. 6.

Additionally, as shown in FIG. 7, a plurality of ribs 22a1 (an example of a posture maintaining portion, a sliding portion) which generate sliding resistance with a shank portion of the fastening member 9 are provided on an inner wall surface (an inner circumference of a hole) 22a of the cylindrical hook shaft 22 through which the fastening member 9 is inserted. The ribs 22a1 protrude radially inwards from the inner wall surface 22a of the cylindrical hook shaft 22 and can maintain the postures of the base plate 2 and the body plate 3. By adopting this configuration, the posture of the lock apparatus 1 which is inclined by the engagement of the lock apparatus 1 with a striker S is maintained.

In addition, as shown in FIG. 8, a plurality of ribs 23a1 which generate sliding resistance with a shank portion of the second fastening member 10 are provided on an inner circumference of the elongated hole (the elongated hole formed in the base plate 2) 23 through which the second fastening member 10 is inserted. The ribs 23a1 protrude radially inwards from the inner circumference 23a of the elongated hole 23 and can maintain the postures of the base plate 2 and the body plate 3. By adopting this configuration, the posture of the lock apparatus 1 which is inclined by the engagement of the lock apparatus 1 with a striker S is maintained.

In the lock apparatus 1 which configures Embodiment 2 of the invention, since the second fastening member 10 fastens the base plate 2 and the body plate 3 so as to move relative to the striker S together with the fastening member 9, a fastening strength is increased, and a possibility that the base plate 2 and the body plate 3 are damaged is decreased. Additionally, the second fastening member 10 is inserted through the arc-shaped elongated holes 23, 33 which are provided in the front sides of the entrance grooves 21, 31 which face the front of the vehicle and which are situated near locations on the base plate 2 and the body plate 3 where a distal end portion of a hook portion 43 of the hook lever 4 is projected. Therefore, a fastening strength in a widthwise direction of the vehicle (a near side direction or a far side direction of a sheet of paper on which FIG. 6 is drawn) is ensured. Thus, even though a large force is applied to the hook lever 4, there occurs no such situation that the base plate 2 and the body plate 3 are turned up. Additionally, since the rotationally movable ranges of the base plate 2 and the body plate 3 are limited by the second fastening member 10 and the elongated holes 23, 33, there occurs no such situation that the lock apparatus 1 rotates over a range where the striker S is allowed to enter the entrance grooves 21, 31.

Further, the ribs 22a1 which generate the sliding resistance with the fastening member 9 are provided on the inner wall surface 22a of the cylindrical hook shaft 22 through which the fastening member 9 is inserted and the ribs 23a1 which generate the sliding resistance with the second fastening member 10 are provided on the inner circumference 23 of the elongated hole 23 through which the second fastening member 10 is inserted. Therefore, the posture of the lock apparatus 1 can be maintained. By adopting this configuration, the posture of the lock apparatus 1 which is in engagement with the striker S is maintained, whereby a situation is avoided in which the lock apparatus 1 rotationally moves every time the seat is fixed.

It is noted that the ribs 22a1, 23a1 do not have to be provided on both the inner wall surface 22a of the cylindrical hook shaft 22 and the inner circumference 23a of the elongated hole 23, and hence, according to the sliding resistance which is required to maintain the posture of the lock apparatus, the ribs 22a1, 23a1 can be provided on either or both of the cylindrical hook shaft 22 and the elongated hole 23.

Figure 9:
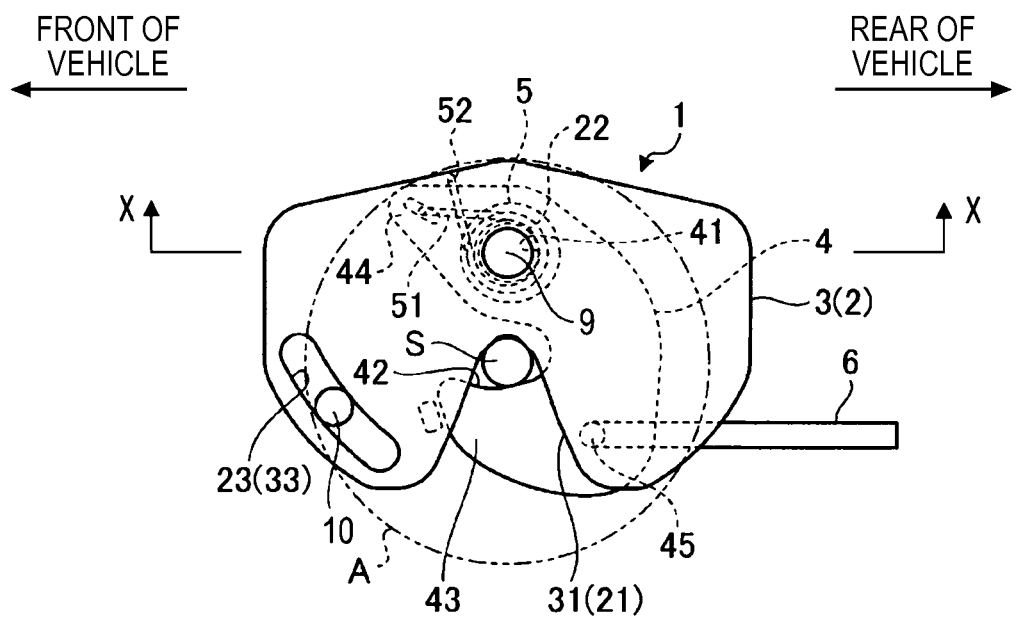
FIG. 9 is a conceptual drawing which shows the configuration of a modified example made to the lock apparatus shown in FIG. 6.
Figure 10:
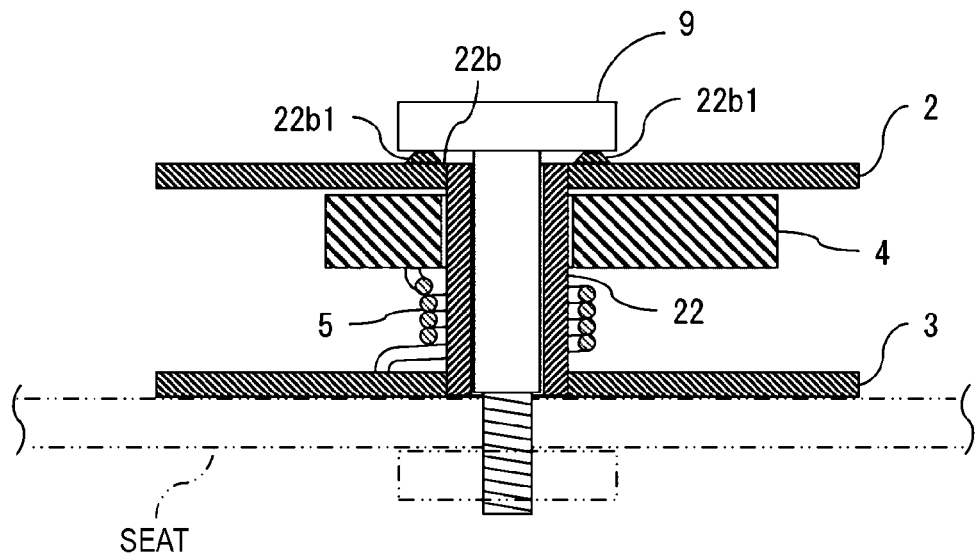
FIG. 10 is a drawing showing a sectional view of the lock apparatus shown in FIG. 9 which is taken along the line X-X shown therein.

FIG. 9 is a conceptual drawing which shows the configuration of a modified example made to the lock apparatus shown in FIG. 6, and FIG. 10 is a drawing which shows a sectional view of the lock apparatus shown in FIG. 9 taken along the line X-X therein.

The lock apparatus described here differs from the lock apparatus shown in FIG. 6 in the configuration to generate the sliding resistance between the fastening member 9 and the second fastening member 10 when maintaining the postures of the base plate 2 and the body plate 3. The other configurations are the same as those of the lock apparatus shown in FIG. 6, and hence, like reference numerals will be given to like configurations to those of the lock apparatus shown in FIG. 6, and the description thereof will be omitted here.

As shown in FIG. 10, a plurality of ribs 22b1 (an example of a posture maintaining portion, a sliding portion) which generate sliding resistance with a dish-shaped head portion of the fastening member 9 which is inserted through an opening in the hook shaft 22 are provided on an edge portion 22b of the opening on an external surface of the base plate 2 so as to be aligned along the opening. The ribs 22b1 protrude from the external surface of the base plate 2, so that the ribs 22b1 can maintain the postures of the base plate 2 and the body plate 3. By adopting this configuration, the posture of the lock apparatus 1 which is inclined by the engagement of the lock apparatus 1 with the striker S is maintained.

It is noted that in addition to the ribs 22b1, the ribs 22a1 on the inner wall surface 22a of the hook shaft 22 and the ribs 23a1 on the inner circumference 23a of the elongated hole 23 of the lock apparatus shown in FIG. 6 can also be provided according to the sliding resistance required to maintain the posture of the lock apparatus.

Embodiment 3

Figure 11:
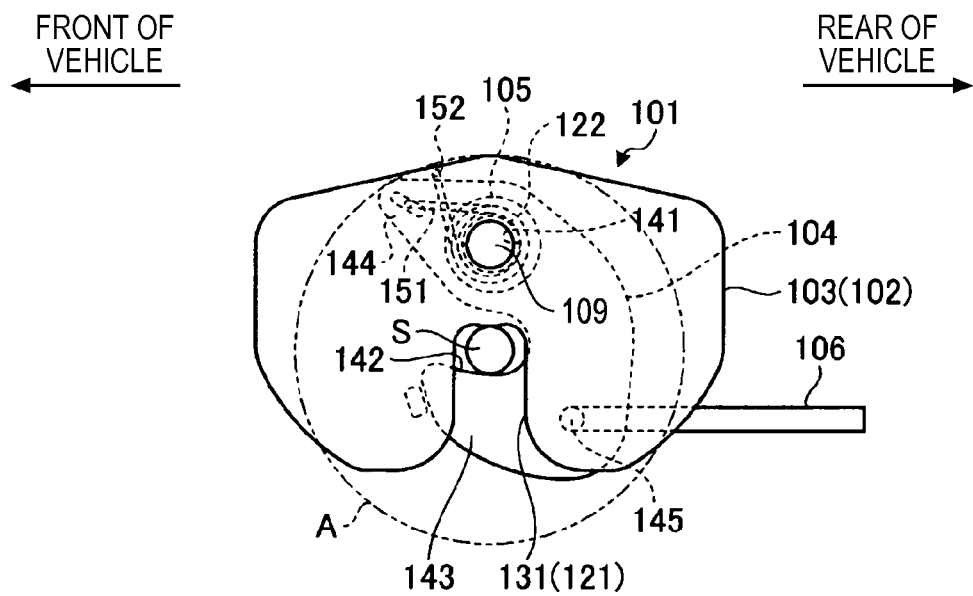
FIG. 11 is a conceptual drawing which shows the configuration of a lock apparatus which configures Embodiment 3 of the invention.
Figure 12:
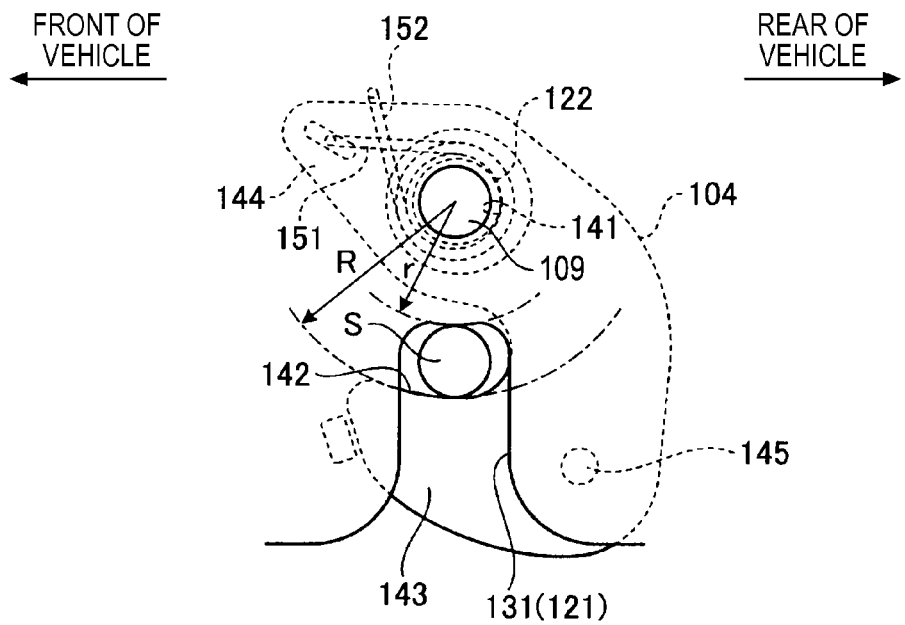
FIG. 12 is an enlarged view which shows a relationship between a hook lever and entrance grooves which are shown in FIG. 11.

FIG. 11 is a conceptual drawing which shows the configuration of a lock apparatus which configures an embodiment of the invention. FIG. 12 is an enlarged view which shows a relationship between a hook lever and entrance grooves which are shown in FIG. 1.

As with the lock apparatus 1 described in Embodiment 1 above, a lock apparatus 101 described here as an example is used to fix a detachable seat or a movable seat and includes a base plate 102 and a body plate 103 which is attached to the base plate 102 in such a manner as to be superposed thereon. Additionally, a hook accommodating portion is defined between the base plate 102 and the body plate 103, and a hook lever 104 is accommodated in an interior thereof. As with the one described above, the hook lever 104 is designed to be brought into engagement with a striker S which is provided on a floor surface.

Additionally, entrance grooves 121, 131 are formed in the base plate 102 and the body plate 103, respectively, in substantially longitudinal central positions thereof as seen in a front-to-rear or longitudinal direction of the vehicle so as to extend substantially vertically from a floor side towards a ceiling side. The entrance grooves 121, 131 are formed to have a width which enables the accommodation of the striker S therein, and deepest portions thereof are formed into an arc-like shape which is centered at a hook shaft 122, which will be described later, and which has a radius "r" as shown in FIG. 12. The hook shaft 122 having a cylindrical shape is provided in a position lying above the entrance grooves 121, 131 so as to extend substantially horizontally along a widthwise direction of the vehicle main body. The hook lever 104 is fitted on the hook shaft 122 so as to rotationally move therearound.

A shaft hole 141 is formed in the hook lever 104 in the center thereof for the hook shaft 122 to fit therein, and an engagement groove 142, a hook portion 143, a spring attaching portion 144 and a rod attaching portion 145 are formed along an outer circumference of the shaft hole 141.

The engagement groove 142 is formed into an arc-like shape which extends inwards from an outer circumferential surface of the hook lever 104 so as to be centered at the shaft hole 141 (the hook shaft 122) and which has a radius R. The engagement groove 142 is given a width which enables the accommodation of the striker S therein. In addition, the engagement groove 142 is formed to extend with substantially the same width from an entrance of an opening to a deep portion thereof.

With the engagement groove 142 opened towards a side which faces a front of the vehicle, the hook portion 143 is a portion which is positioned below the engagement groove 142. This hook portion 143 is formed so that when the hook lever 104 is rotationally moved clockwise as seen in FIG. 13, the hook portion 143 stops in a position where the hook portion 143 crosses the entrance grooves 121, 131 (an initial position, an engagement position) as shown in FIGS. 13-1 and 13-3, while when the hook lever 104 is rotationally moved counterclockwise as seen in FIG. 13, the hook portion 143 stops in a position where the hook portion 143 opens the entrance grooves 121, 131 (an opening position) as shown in FIG. 13-4.

The spring attaching portion 144 is a portion which extends in an arbitrary direction (outwards) along a diametrical direction of the shaft hole 141. One end 151 of the hook spring (a torsional coil spring) 105 which is wound around the hook shaft 122 is attached to the spring attaching portion 144, and the other end 152 is attached to the base plate 102. By adopting this configuration, a clockwise elastic restoring force is applied to the hook lever 104 at all times as seen in FIG. 13, and this makes the hook lever 104 stop in the initial position and the engagement position (refer to FIGS. 13-1, 13-3).

The rod attaching portion 145 is a portion which is provided between the shaft hole 141 and the hook portion 143, and a rod (a pull rod) 106 is attached to the rod attaching portion 145. Then, when the rod 106 is pulled against the elastic restoring force of the hook spring 105, the hook lever 104 rotationally moves counterclockwise as seen in FIG. 13 (refer to FIG. 13-4).

Figures 1, 13:
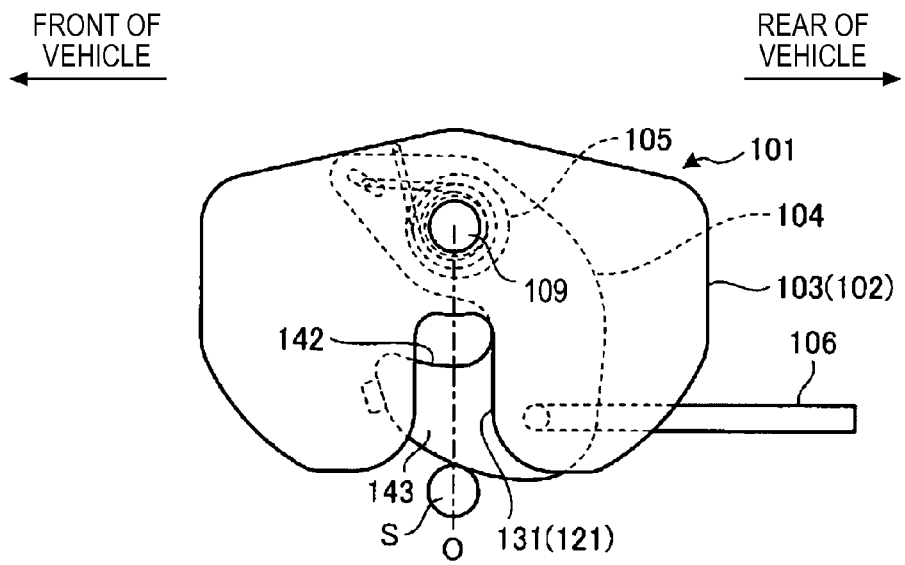
Figures 2, 13:
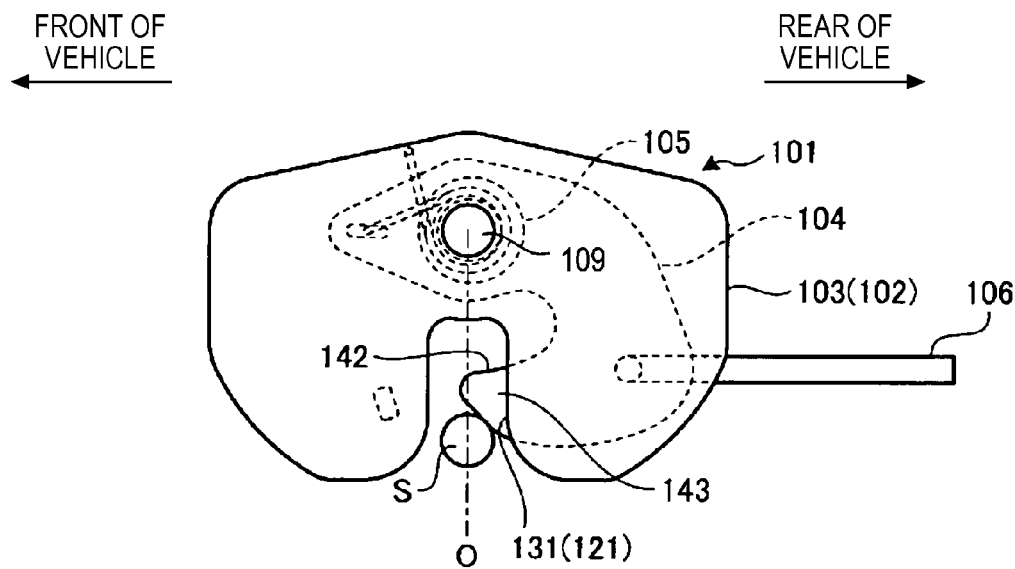
Figures 3, 13:
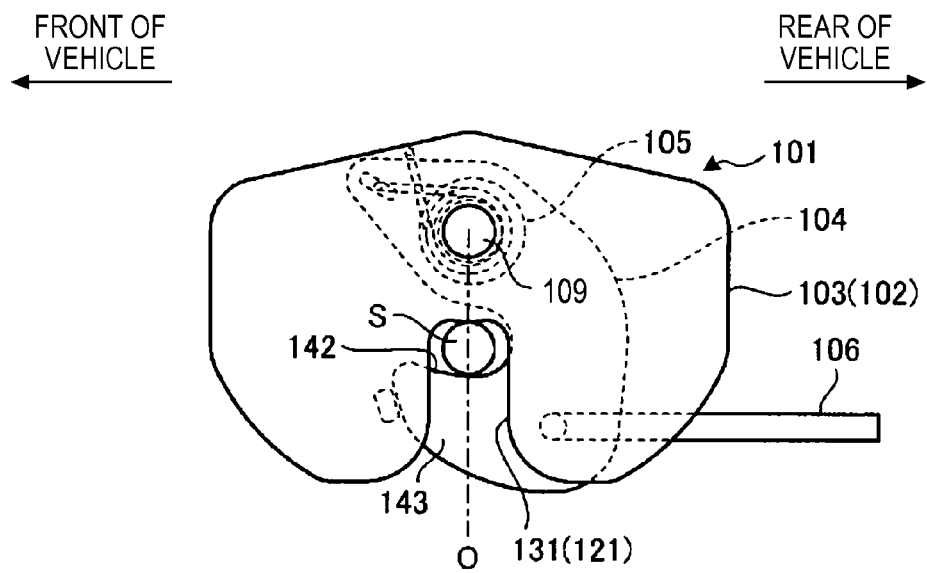
Figures 4, 13:
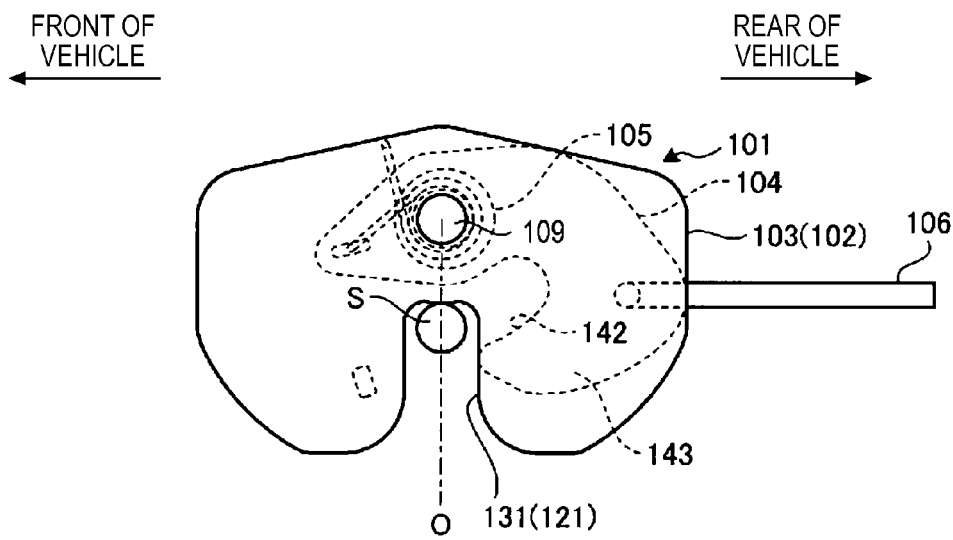

In the lock apparatus 101 configured as described above, in such a state that the seat (not shown) has not yet been fixed to a floor (not shown), the hook lever 104 is disposed in the initial position as shown in FIG. 13-1. When the seat is inclined from that state, the striker S which is provided on the floor is brought into abutment with an outer circumference of the hook portion 143 to press against the outer circumference of the hook portion 143. This rotationally moves the hook lever 104 counterclockwise as seen in FIG. 13 against the elastic restoring force of the hook spring 105. Then, the hook lever 104 rotationally moves to a position which enables the striker S to enter the entrance grooves 121, 131.

When the seat is inclined further from the state described above, the striker S enters the entrance grooves 121, 131, while the elastic restoring force of the hook spring 105 is applied to the hook lever 104, whereby the hook lever 104 rotationally moves clockwise as seen in FIG. 13. Then, the striker S reaches the deepest portions of the entrance grooves 121, 131. In this state, the striker S is brought into abutment with an inner wall of the engagement groove 42, and therefore, the clockwise rotational movement of the hook lever 104 is prevented against the elastic restoring force of the hook spring 105. Moreover, as shown in FIG. 13-3, since the hook portion 143 of the hook lever 104 is disposed so as to cross the entrance grooves 121, 131, a situation in which the striker S moves in a direction in which the striker S is disengaged from the entrance grooves 121, 131, that is, an erecting operation of the seat relative to the floor is prevented by the hook portion 143 (an engagement state).

The lock apparatus 101 described above includes a fastening member 109 which fastens the base plate 102 so as to move relative to the striker S within a range defined by projecting an area A onto the base plate 102, as shown in FIG. 11. The area A has a radius centering at the striker S which is in engagement with the hook lever 104, and the radius is equal to a length to an outermost position of the hook lever 104 which is in engagement with the striker S.

The fastening member 109 is a stepped screw having a shank portion and penetrates axially the cylindrical hook shaft 122 to thereby pass through a rotation center of the hook lever 104 so as to fasten the base plate 102 and the body plate 103 together so as to move relative to the striker S. By adopting this configuration, compared with a construction in which the fastening member 109 does not penetrate the hook shaft 122, the lock apparatus 101 can be made smaller in size.

In the lock apparatus 101 which is fastened by the fastening member 109 described above, as shown in FIG. 14, even with the striker S mounted in a front position $O_3$ which lies further forwards than a reference position O, by rotating the base plate 102 and the body plate 103 clockwise as seen in FIG. 14, the striker S is allowed not only to enter the entrance grooves 121, 131 to the deepest portions thereof but also to be brought into abutment with the inner wall of the engagement groove 142.

Figures 1, 14:
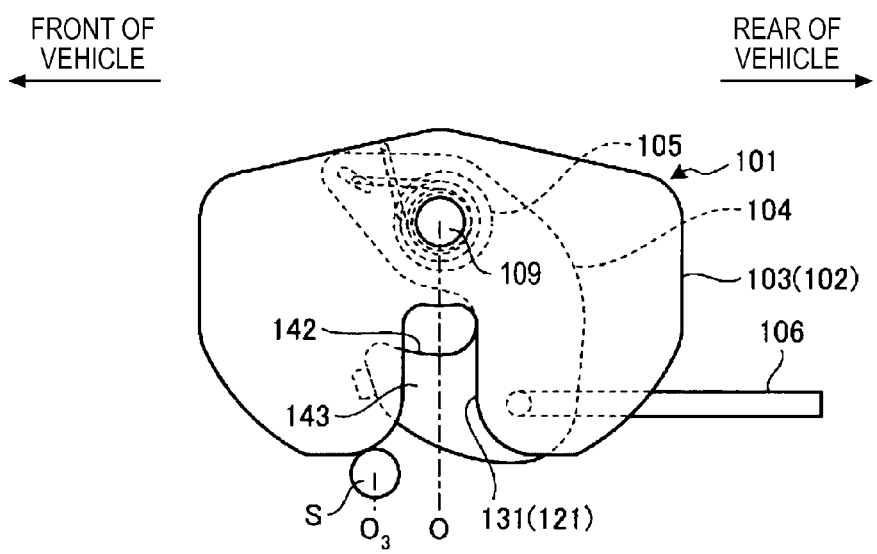
Figures 2, 14:
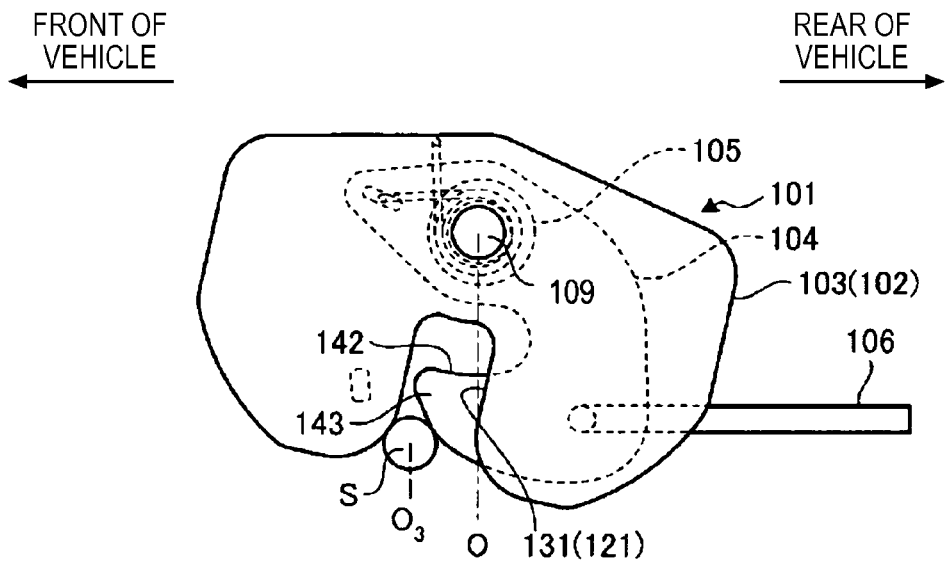
Figures 3, 14:
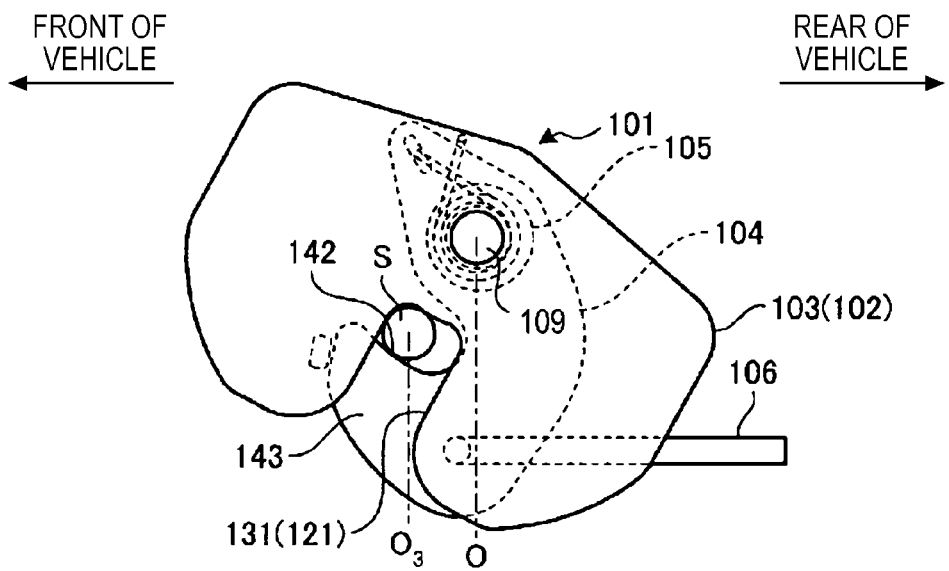
Figures 4, 14:
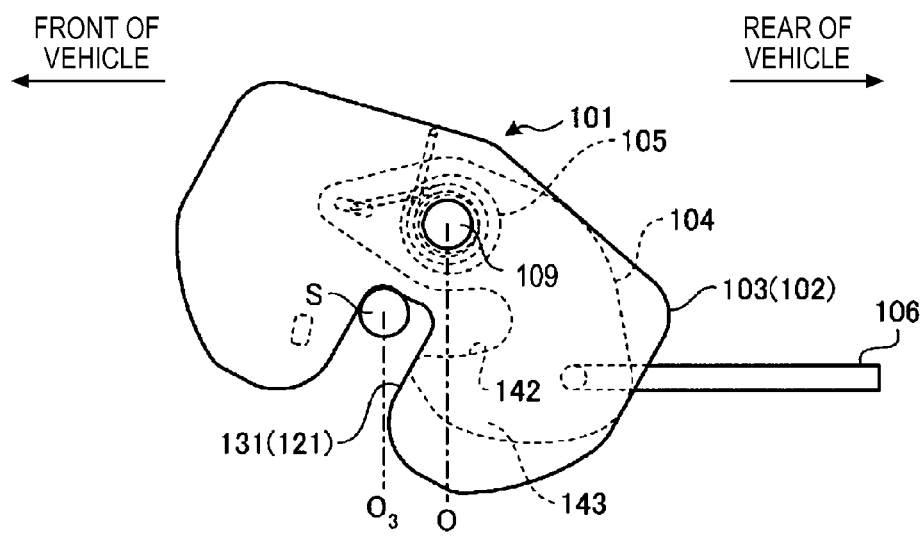

To describe this specifically, when the seat (not shown) is not yet fastened to the floor (not shown), as shown in FIG. 14-1, the hook lever 104 is disposed in the initial position. When the seat is inclined from that state, the striker S which is provided on the floor is brought into abutment with inner walls of the entrance grooves 121, 131 of the base plate 102 and the body plate 103 to press against the inner walls of the entrance grooves 121, 131. This rotationally moves the base plate 102 and the body plate 103 clockwise as seen in FIG. 14. Thereafter, the striker S is brought into abutment with an outer circumference of the hook portion 143 of the hook lever 104 to press against the outer circumference of the hook portion 143. Then, the hook lever 4 rotationally moves counterclockwise as seen in FIG. 14 against the elastic restoring force of the hook spring 105. Then, the striker S rotationally moves the hook lever 104 to a position where the striker S is allowed to enter the entrance grooves 121. 131.

When the seat is inclined further from the state described above, the striker S enters the entrance grooves 121, 131, while the elastic restoring force of the hook spring 105 is applied to the hook lever 104, whereby the hook lever 104 rotationally moves clockwise as seen in FIG. 14. Then, the striker S rotationally moves the base plate 102 and the body plate 103 clockwise along the entrance grooves 121, 131 and reaches the deepest portions of the entrance grooves 121, 131. In this state, the base plate 102 and the body plate 103 are inclined so that their front ends which face the front of the vehicle are raised and the striker S is brought into abutment with the inner wall of the engagement groove 142. Moreover, as shown in FIG. 14-3, since the hook portion 143 of the hook lever 104 is disposed so as to cross the entrance grooves 121, 131, a situation in which the striker S moves in a direction in which the striker S is disengaged from the entrance grooves 121, 131, that is, an erecting operation of the seat relative to the floor is prevented by the hook portion 143 (an engagement state).

Further, when the rod 106 is pulled from the engagement state described above against the elastic restoring force of the hook spring 105, the hook lever 104 rotationally moves counterclockwise as seen in FIG. 14. As a result of this, as shown in FIG. 14-4, the entrance grooves 121, 131 are opened, which enables the striker S to move in a direction in which the striker S is disengaged from the entrance grooves 121, 131, whereby the seat can be operated to be erected relative to the floor.

Figures 1, 15:
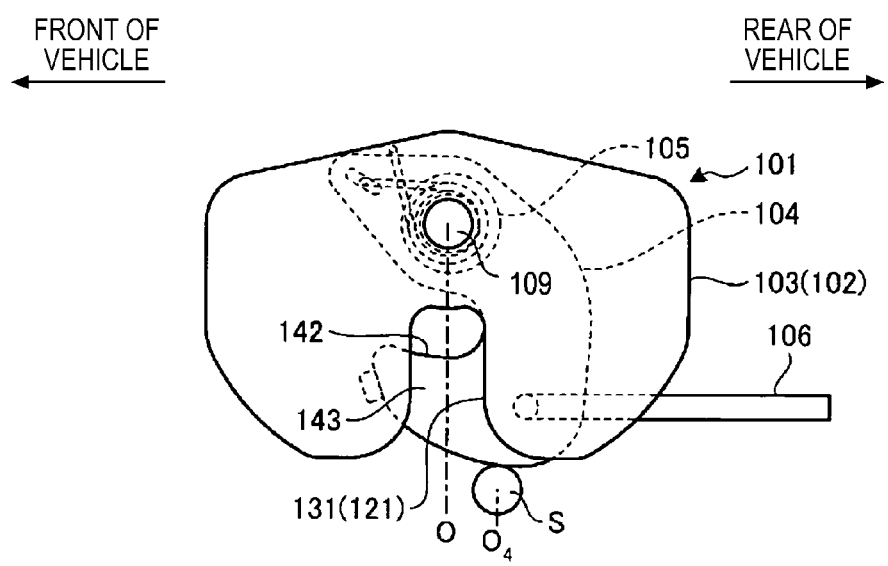
Figures 2, 15:
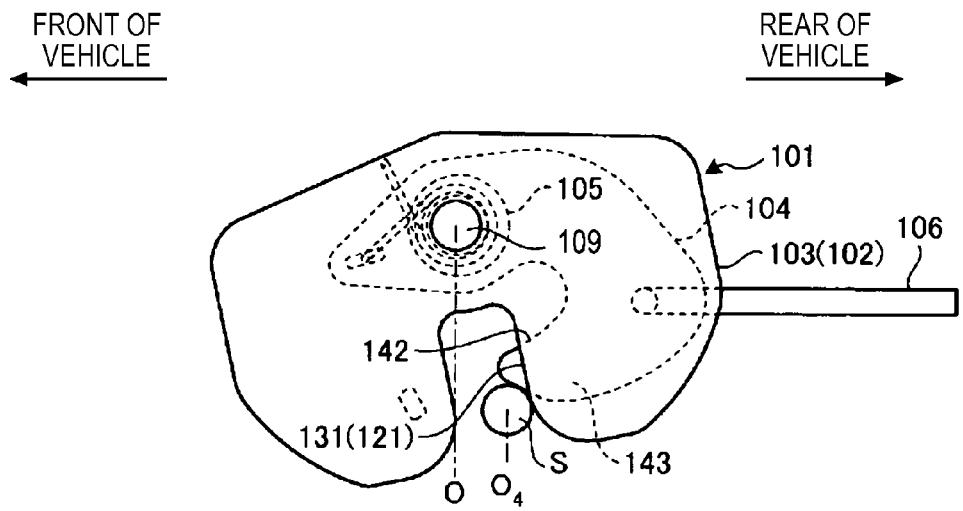
Figures 3, 15:
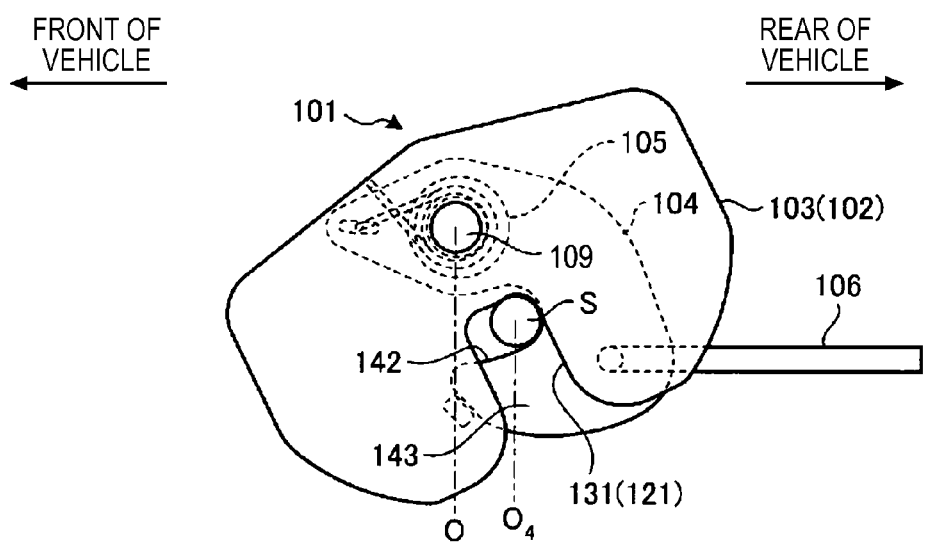
Figures 4, 15:
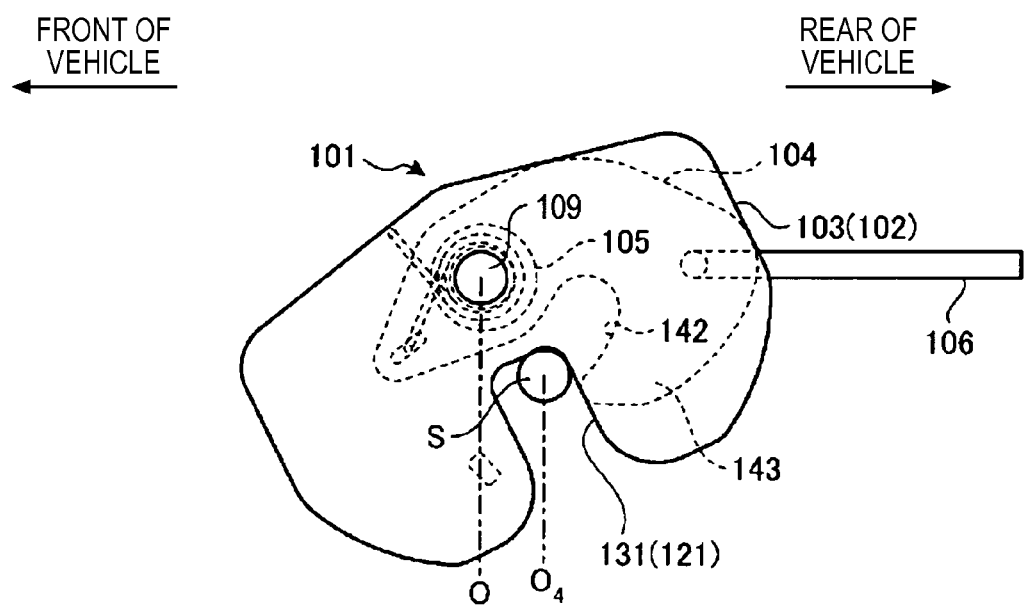

On the other hand, as shown in FIG. 15, even with the striker S mounted in a rear position $O_4$ which lies further rearwards than the reference position O, by rotationally moving the base plate 102 and the body plate 103 counterclockwise as seen in FIG. 14, the striker S is allowed not only to enter the entrance grooves 121, 131 to the deepest portions thereof but also to be brought into abutment with the inner wall of the engagement groove 142.

To describe this specifically, when the seat (not shown) is not yet fastened to the floor (not shown), as shown in FIG. 15-1, the hook lever 104 is disposed in the initial position. When the seat is inclined from that state, the striker S which is provided on the floor is brought into abutment with the outer circumference of the hook portion 143 to press against the outer circumference of the hook portion 143. This rotationally moves the hook lever 104 counterclockwise as seen in FIG. 15 against the elastic restoring force of the hook spring 105. Thereafter, the striker S presses against the inner walls of the entrance grooves 121, 131 of the base plate 102 and the body plate 103. Then, the base plate 102 and the body plate 103 rotationally move counterclockwise in FIG. 15. Then, the hook lever 104 rotationally moves to a position which enables the striker S to enter the entrance grooves 121, 131.

When the seat is inclined further from the state described above, the striker S enters the entrance grooves 121, 131, while the elastic restoring force of the hook spring 105 is applied to the hook lever 104, whereby the hook lever 104 rotationally moves clockwise as seen in FIG. 15. Then, the striker S rotationally moves the base plate 102 and the body plate 103 counterclockwise along the entrance grooves 121, 131 and reaches the deepest portions of the entrance grooves 121, 131. In this state, the base plate 102 and the body plate 103 are inclined so that their rear ends which face the rear of the vehicle are raised and the striker S is brought into abutment with the inner wall of the engagement groove 142. Moreover, as shown in FIG. 15-3, since the hook portion 143 of the hook lever 104 is disposed so as to cross the entrance grooves 121, 131, a situation in which the striker S moves in a direction in which the striker S is disengaged from the entrance grooves 121, 131, that is, an erecting operation of the seat relative to the floor is prevented by the hook portion 143 (an engagement state).

Further, when the rod 106 is pulled from the engagement state described above against the elastic restoring force of the hook spring 105, the hook lever 104 rotationally moves counterclockwise as seen in FIG. 15. As a result of this, as shown in FIG. 15-4, the entrance grooves 121, 131 are opened, which enables the striker S to move in a direction in which the striker S is disengaged from the entrance grooves 121, 131, whereby the seat can be operated to be erected relative to the floor.

In the lock apparatus 101 which configures Embodiment 3 of the invention described above, as shown in FIG. 12, the deepest portions of the entrance grooves 121, 131 are formed into the ark-like shape which is centered at the hook shaft 122 and which has the radius "r" and the engagement groove 142 is formed into the arc-like shape which extends inwards from the outer circumferential surface of the hook lever 104 so as to be centered at the shaft hole 141 and which has the radius R. Because of this, not only in the case of the lock apparatus 101 rotationally moving but also in the case of the hook lever 104 rotationally moving relative to the lock apparatus 101, since the deepest portions of the entrance grooves 121, 131 keep the arc-like shape having the radius "r" without any change and the engagement groove 142 keeps the arc-like shape having the radius R without any change, the striker S can enter the entrance grooves 121, 131 with the lock apparatus 101 inclined more than the lock apparatus 1 of Embodiment 1 so as to be brought into engagement with the hook lever 104. By adopting this configuration, in the lock apparatus 101 of this embodiment, the inclination of the lock apparatus 101 can be increased by extending the arcs of the radius "r" at the deepest portions of the entrance grooves 121, 131, and therefore, the lock apparatus 101 of this embodiment can be brought into engagement with the striker S which is situated further forwards or rearwards than that of the lock apparatus 1 of Embodiment 1.

In addition, the deepest portions of the entrance grooves 121, 131 are formed into the ark-like shape which is centered at the hook shaft 122 and which has the radius "r", and the engagement groove 142 is formed into the arc-like shape which is centered at the shaft hole 141 and which has the radius R. Therefore, the deepest portions of the entrance grooves 121, 131 and an inner circumferential surface of the engagement groove 142 form circles which are concentric with each other. By adopting this configuration, the striker S is brought into contact with the lock apparatus 101 at the two points of the deepest portions of the entrance grooves 121, 131 and the inner circumferential surface of the engagement groove 142.

In addition, as shown in FIG. 14, even with the striker S mounted in the front position $O_3$ which lies further forwards than the reference position O, by the base plate 102 and the body plate 103 being inclined, the hook lever 104 receives the striker S therein, whereby the hook lever 104 and the striker S are brought into engagement with each other. Additionally, as shown in FIG. 14-3, although the deepest portions of the entrance grooves 121, 131 and the engagement groove 142 form the concentric circles which are centered at the hook shaft 122, the lock apparatus 101 which is mounted on the seat rotates about a hinge of the seat which is provided in a position which differs from the hook shaft 122, and therefore, no force is exerted in a tangential direction of the concentric circles. Therefore, there occurs no such situation that the hook lever 104 and the striker S move in the longitudinal direction of the vehicle (a lateral direction in FIG. 14) in such a state that the hook lever 104 and the striker S are kept in engagement with each other. This prevents the rotational movement of the hook lever 104, and hence, no rattling looseness is generated between the lock apparatus 101 and the striker S. Further, since the hook shaft 122 is provided in the position lying above the entrance grooves 121, 131, when the base plate 102 and the body plate 103 are rotationally moved clockwise as seen in FIG. 14, the orientation of the entrance grooves 121, 131 can be changed so as to receive the striker S therein from an initial stage of their rotational movements. Therefore, with the widths of the entrance grooves 121, 131 set narrow, the engagement state can be realized, thereby making it possible to make the lock apparatus 1 small in size.

Similarly, as shown in FIG. 15, even with the striker S mounted in the rear position $O_4$ which lies further rearwards than the reference position, by the base plate 102 and the body plate 103 being inclined, the hook lever 104 receives the striker S therein, whereby the hook lever 104 and the striker S are brought into engagement with each other. Additionally, as shown in FIG. 15-3, although the deepest portions of the entrance grooves 121, 131 and the engagement groove 142 form the concentric circles which are centered at the hook shaft 122, the lock apparatus 101 which is mounted on the seat rotates about the hinge of the seat which is provided in the position which differs from the hook shaft 122, and therefore, no force is exerted in the tangential direction of the concentric circles. Therefore, there occurs no such situation that the hook lever 104 and the striker S move in the longitudinal direction of the vehicle (a lateral direction in FIG. 15) in such a state that the hook lever 104 and the striker S are kept in engagement with each other. This prevents the rotational movement of the hook lever 104, and hence, no rattling looseness is generated between the lock apparatus 101 and the striker S.

Embodiment 4

Figure 16:
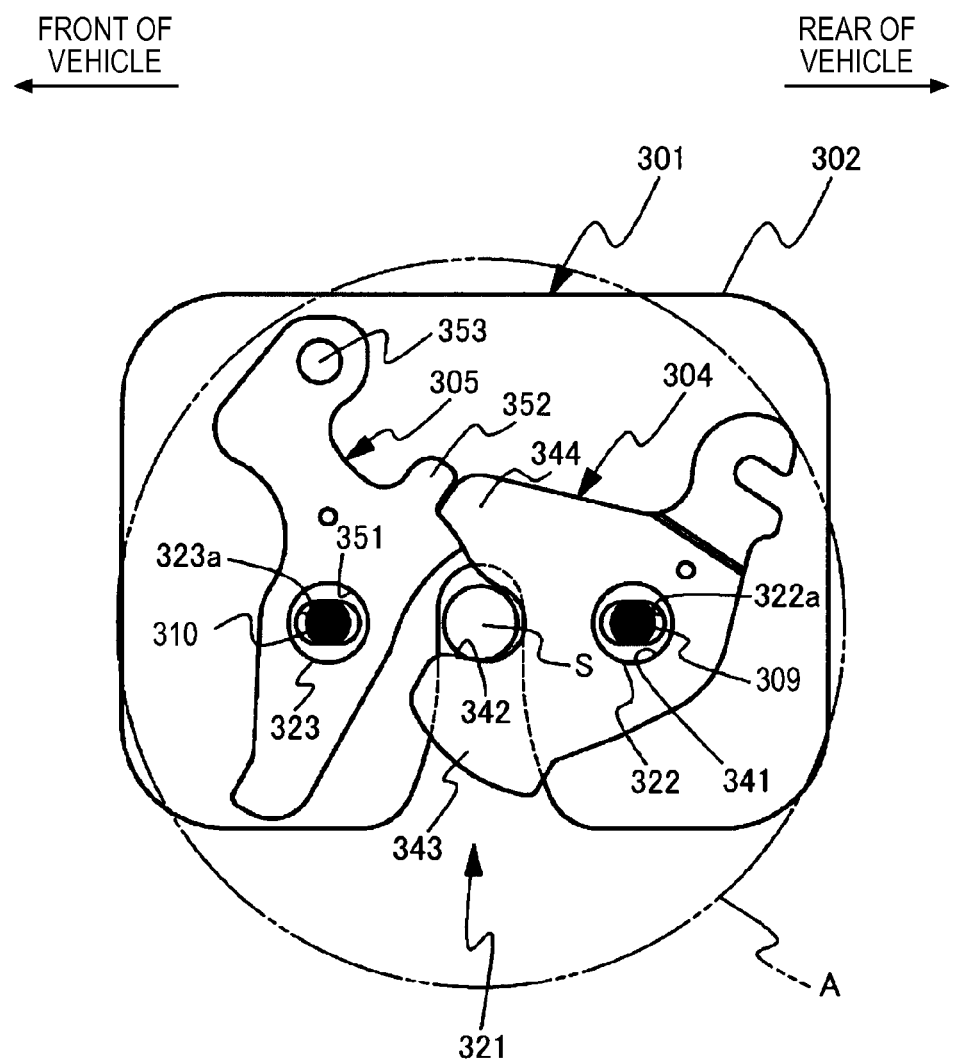
FIG. 16 is a conceptual drawing which shows the configuration of a lock apparatus which configures Embodiment 4 of the invention.

FIG. 16 is a conceptual drawing which shows the configuration of a lock apparatus which configures Embodiment 4 of the invention.

A lock apparatus 301 which is described as an example here can move in a longitudinal direction of a vehicle main body relative to a striker S and includes a base plate 302 and a body plate (not shown) which is mounted on the base plate 302 so as to be superposed thereon. Additionally, a mechanism accommodating portion is defined between the base plate 302 and the body plate, so that a hook lever 304 and a ratchet 305 which meshes with the hook lever 304 are accommodated in an interior thereof. As with those described in Embodiments 1 to 3, the hook lever 304 is designed to be brought into engagement with the striker S which is provided on a floor surface.

Additionally, an entrance groove 321 is formed in the base plate 302 and the body plate in a substantially longitudinal central position thereof as seen in a front-to-rear or longitudinal direction of the vehicle so as to extend substantially vertically from a floor side towards a ceiling side. The entrance groove 321 is formed to have a width which enables the accommodation of the striker S described above therein. In addition, a cylindrical hook shaft 322 is provided in a position lying at the rear of the entrance groove 321 so as to extend substantially horizontally along a widthwise direction of the vehicle. The hook lever 304 is fitted on the hook shaft 322 so as to rotationally move therearound.

A shaft hole 341 is formed in the hook lever 304 in the center thereof for the hook shaft 322 to fit therein, and an engagement groove 342, a hook portion 343, and a locking portion 344 are formed along an outer circumference of the shaft hole 341.

The engagement groove 342 is formed so as to extend from an outer circumferential surface of the hook lever 304 towards the shaft hole 341 and is given a width which enables the accommodation of the striker S therein.

Figures 1, 17:
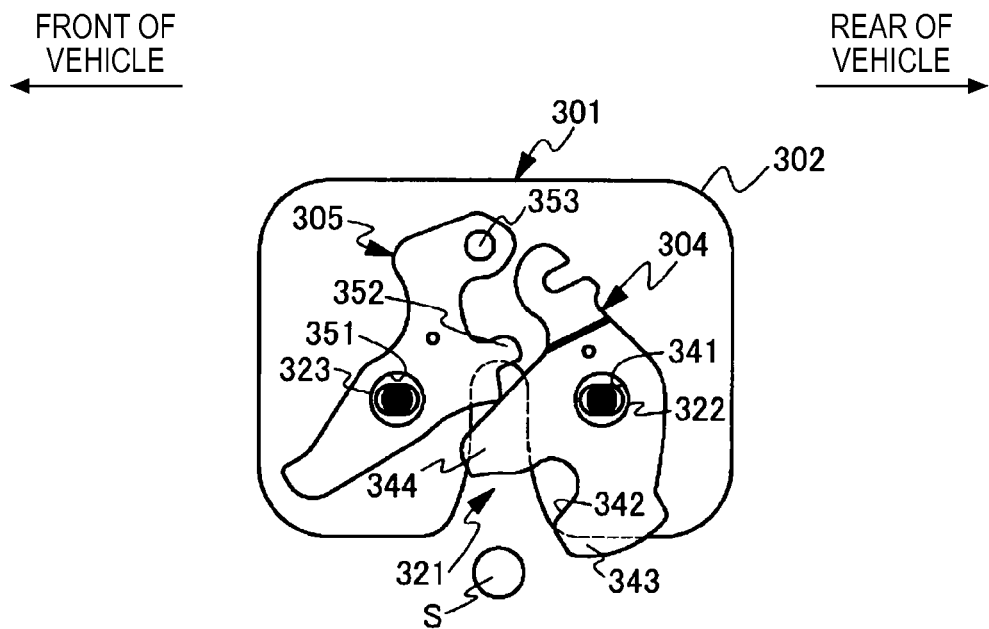
Figures 2, 17:
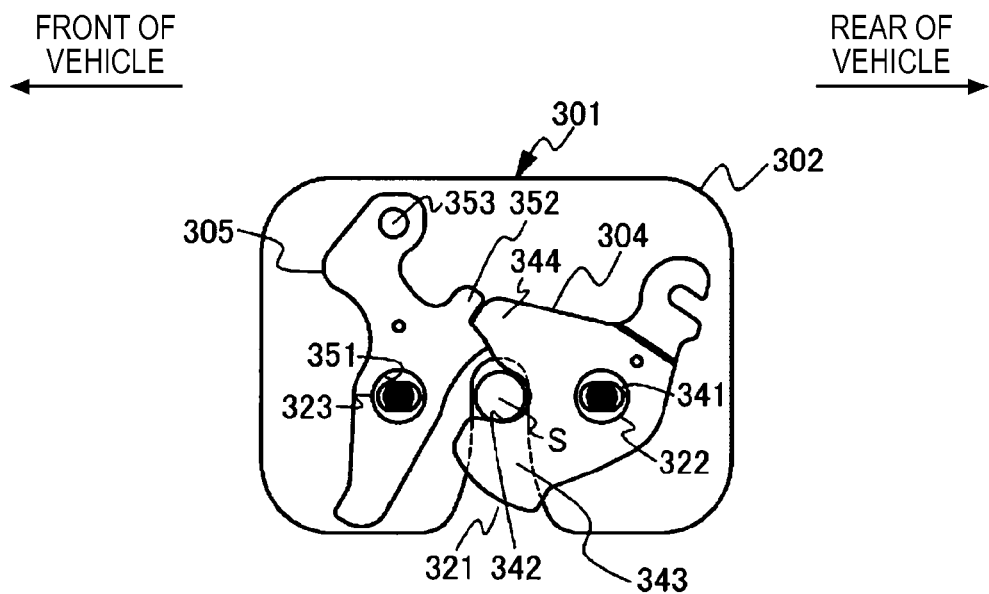
Figures 3, 17:
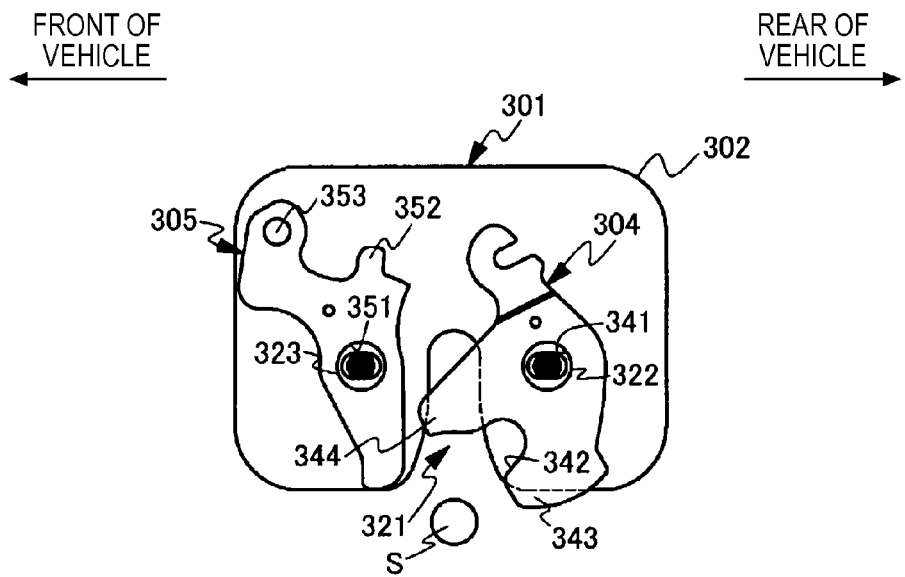

With the engagement groove 342 opened towards a side which faces a front of the vehicle, the hook portion 343 is a portion which is positioned below the engagement groove 342. This hook portion 343 is formed so that when the hook lever 304 is rotationally moved clockwise as seen in FIG. 17, the hook portion 343 stops in a position where the hook portion 343 crosses the entrance groove 321 (an engagement position) as shown in FIGS. 17-2, while when the hook lever 304 is rotationally moved counterclockwise as seen in FIG. 17, the hook portion 343 stops in a position where the hook portion 343 opens the entrance groove 321 (an opening position) as shown in FIGS. 17-1 and 17-3.

With the engagement groove 342 opened obliquely downwards, the locking portion 344 is a portion which is positioned closer to the ceiling side than the engagement groove 342. This locking portion is configured so that when the hook lever 304 is rotated clockwise as seen in FIG. 17, the locking portion stops in a position where the locking portion 344 crosses the entrance groove 321 as shown in FIG. 17-1. Although not shown in the figures, a hook spring which applies a counterclockwise elastic restoring force to the hook lever 304 at all times in FIG. 17 is provided between the hook lever 304 and the base plate 302.

Additionally, a cylindrical ratchet shaft 323 which extends substantially horizontally along a widthwise direction of the vehicle is provided in a position which lies in front of the entrance groove 321 and which is substantially at the same height as the hook shaft 322 described above. The ratchet 305 is fitted on the ratchet shaft 323 so as to move rotationally.

The ratchet 305 has a shaft hole 351 which is formed in the center thereof for the ratchet shaft 323 to fit therein. The ratchet 305 has a meshing portion 352 and a portion of application 353 on an outer circumference thereof. The meshing portion 352 is a portion which extends diametrically outwards from the shaft hole 351 towards the rear of the vehicle. When the ratchet 305 moves rotationally clockwise as seen in FIG. 17, the meshing portion 352 can mesh with the locking portion 344 of the hook lever 304 described above via a projecting end face thereof.

The portion of application 353 is a portion which extends diametrically outwards from the shaft hole 351 towards the ceiling side. Additionally, although not shown clearly in the figures, a ratchet spring which applies a clockwise elastic restoring force to the ratchet 305 at all times as seen in FIG. 17 is provided between the ratchet 305 and the base plate 302.

In the lock apparatus 301 which is configured as has been described above, when the seat (not shown) is not yet fixed to the floor (not shown), the hook lever 304 is disposed in an opening position as shown in FIG. 17-1. When the seat is inclined from this state, the striker S which is provided on the floor enters the entrance groove 321 and is then brought into abutment with the locking portion 344 of the hook lever 304. As a result of this, the hook lever 304 rotates clockwise as seen in FIG. 17 against the elastic restoring force of the hook spring. During the rotation of the hook lever 304, in the ratchet 305, the projecting end face of the meshing portion 352 is brought into sliding contact with an outer circumferential surface of the hook lever 304 by the elastic restoring force of the ratchet spring, whereby the ratchet 305 rotates about an axis of the hook shaft 322 as required according to an outer circumferential shape of the hook lever 304.

When the seat is inclined further from the state described above, since the entrance of the striker S into the entrance groove 321 increases gradually, the hook lever 304 rotates clockwise further, and as shown in FIG. 17-2, the meshing portion 352 of the ratchet 305 then reaches the engagement groove 342 of the hook lever 304. In this state, since the locking portion 344 of the hook lever 304 is brought into abutment with the meshing portion 352 of the ratchet 305, the counterclockwise rotation of the hook lever 304 is prevented against the elastic restoring force of the hook spring. Moreover, since the hook portion 342 of the hook lever 304 is disposed so as to cross the entrance groove 321, a movement of the striker S in a direction in which the striker S is disengaged from the entrance groove 321, that is, an erecting operation of the seat relative to the floor is prevented by the hook portion 343 (an engagement state).

When the portion of application 353 of the ratchet 305 is rotationally moved further counterclockwise from the engagement state described above against the elastic restoring force of the ratchet spring, the meshing engagement of the locking portion 344 of the hook lever 304 with the meshing portion 352 of the ratchet 305 is released, whereby the hook lever 304 rotationally moves counterclockwise as seen in FIG. 17 by means of the elastic restoring force of the hook spring. As a result of this, as shown in FIG. 17-3, the entrance groove 321 is opened, and this enables not only the striker S to move in a direction in which the striker S is disengaged from the entrance groove 321 but also the seat to be operated to be erected from the floor.

The lock apparatus 301 described above includes a fastening member 309 which fastens the base plate 302 so as to move relative to the striker S within a range defined by projecting an area A onto the base plate 302, as shown in FIG. 16. The area A has a radius centering at the striker S which is in engagement with the hook lever 304, and the radius is equal to a length to an outermost position of the hook lever 304 which is in engagement with the striker S.

The fastening member 309 is a stepped screw having a shank portion and is inserted through an elongated hole 322a formed in a bottom wall of the cylindrical hook shaft 322 to thereby fasten the base plate 302. By adopting this configuration, compared with a construction in which the fastening member 309 does not penetrate the hook shaft 322, the lock apparatus 301 can be made smaller in size.

Additionally, an elongated hole 323a is formed in a bottom wall of the cylindrical ratchet shaft 323, and a second fastening member 310 is inserted through this elongated hole 323a to thereby fasten the base plate 302. By adopting this configuration, compared with a construction in which the second fastening member 310 does not penetrate the ratchet shaft 323, the lock apparatus 301 can be made smaller in size.

The lock apparatus 301 which is fastened by the fastening member 309 and the second fastening member 310 is allowed to move relatively in the longitudinal direction of the vehicle. Even with the striker S mounted in a front position which lies further forwards than a reference position, the lock apparatus 301 moves to the front as the striker S enters the entrance groove 321, and therefore, the striker S enters the entrance groove 321 so that the striker S is brought into engagement with the hook lever 304.

Similarly, with the striker S mounted in a rear position which lies further rearwards than the reference position, the lock apparatus 301 moves to the rear as the striker S enters the entrance groove 321, and therefore, the striker S enters the entrance groove 321 so that the striker S is brought into engagement with the hook lever 304.

The lock apparatus 301 which configures Embodiment 4 of the invention described above includes the fastening member 309 which fastens the base plate 302 so as to move in the longitudinal direction of the vehicle main body relative to the striker S within the range defined by projecting the area A onto the base plate 302. The area A has a radius centering at the striker S which is in engagement with the hook lever 304, and the radius is equal to the length to the outermost position of the hook lever 304 which is in engagement with the striker S. Therefore, the lock apparatus 301 is made small in size as a whole, and even though a large force is applied to the hook lever 304, there occurs no such situation that the base plate 302 is turned up. In addition, even with the width of the entrance groove 321 set narrow, the lock apparatus 301 is allowed to move relatively in the longitudinal direction of the vehicle by the elongated holes 322a, 323a and the fastening members 309, 310, whereby the striker S is allowed to enter the entrance groove 321 to thereby be brought into engagement with the hook lever 304, thereby making it possible to make the lock apparatus 301 small in size. Additionally, while the second fastening member 310 is described as being inserted through the elongated hole 323a formed in the bottom wall of the ratchet shaft 323, the invention is not limited thereto. Any configuration may be adopted as long as the lock apparatus 301 is allowed to move relatively in the longitudinal direction.

Hereinafter, an embodiment of a lock apparatus according to the invention will be described in detail based on the drawings. Here, although the embodiment will be described as being applied to a lock apparatus which fixes a seat cushion by being attached to the seat cushion configuring the detachable seats or movable seats and being brought into engagement with a striker mounted on a vehicle main body or a floor surface, the invention is not limited by this embodiment.

Embodiment 5

Figure 18:
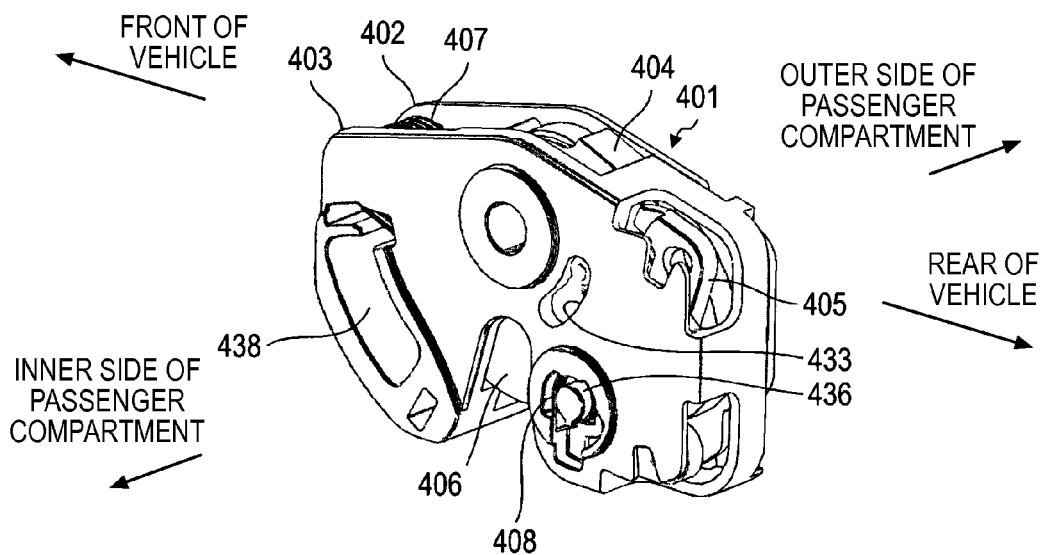
FIG. 18 is a perspective view which shows a lock apparatus which configures Embodiment 5 of the invention.
Figure 19:
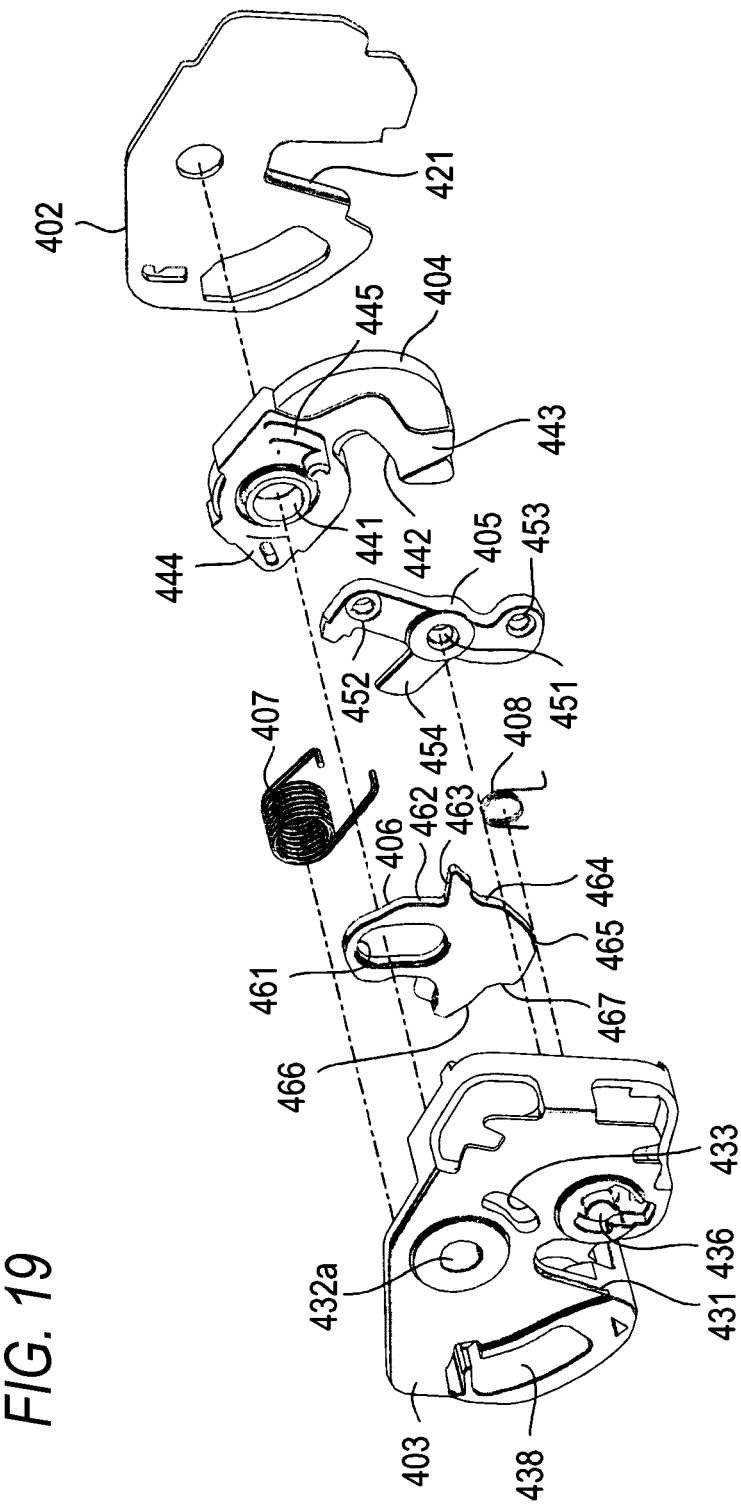
FIG. 19 is an exploded perspective view of the lock apparatus shown in FIG. 18.
Figure 20:
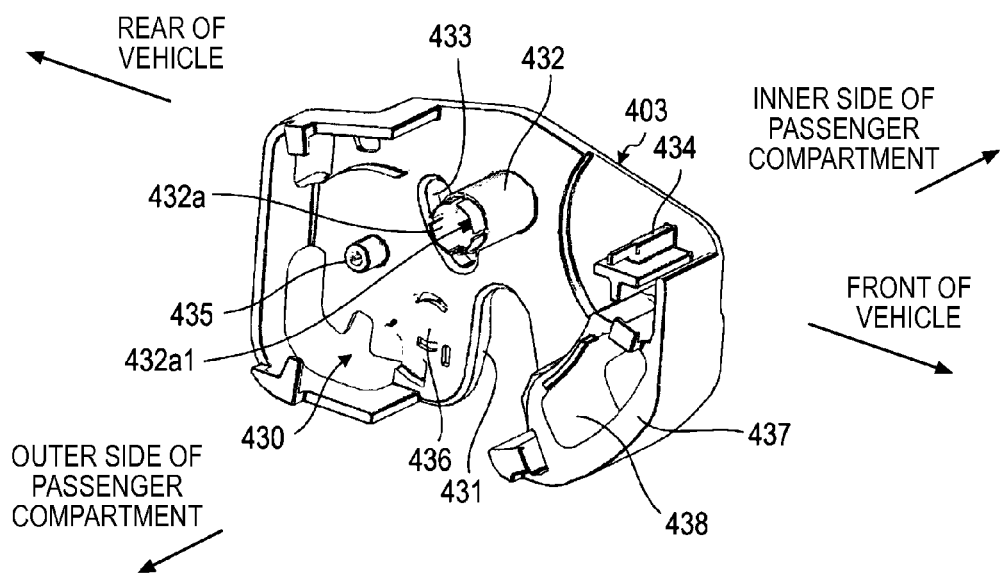
FIG. 20 is a perspective view of a body plate as seen from the side of a base plate shown in FIG. 19.
Figures 1, 21:
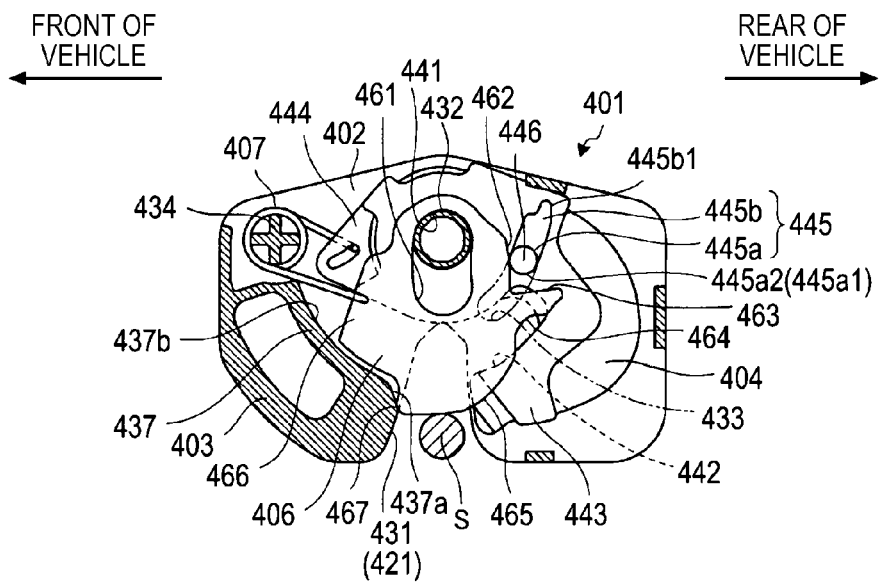
Figures 2, 21:
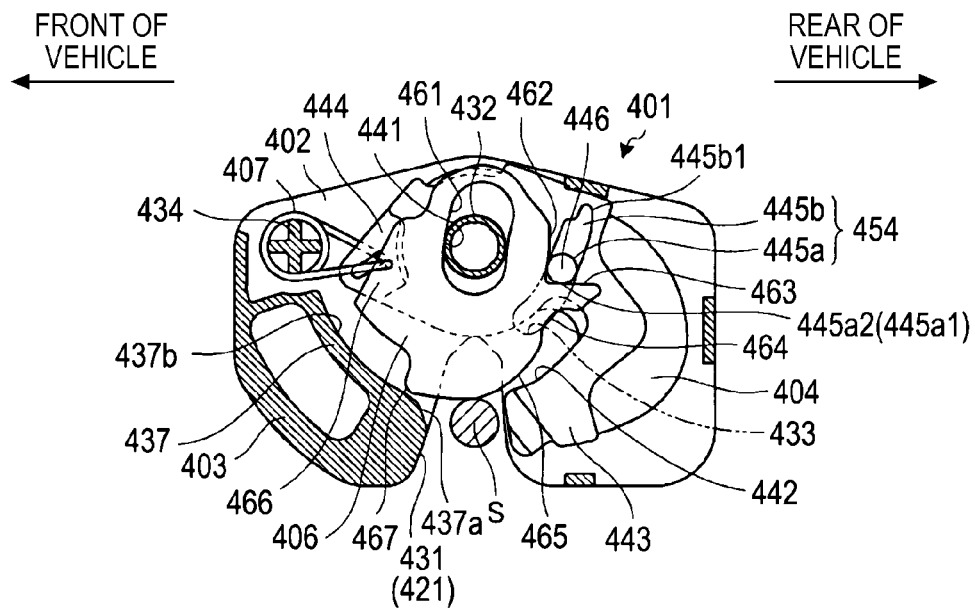
Figures 3, 21:
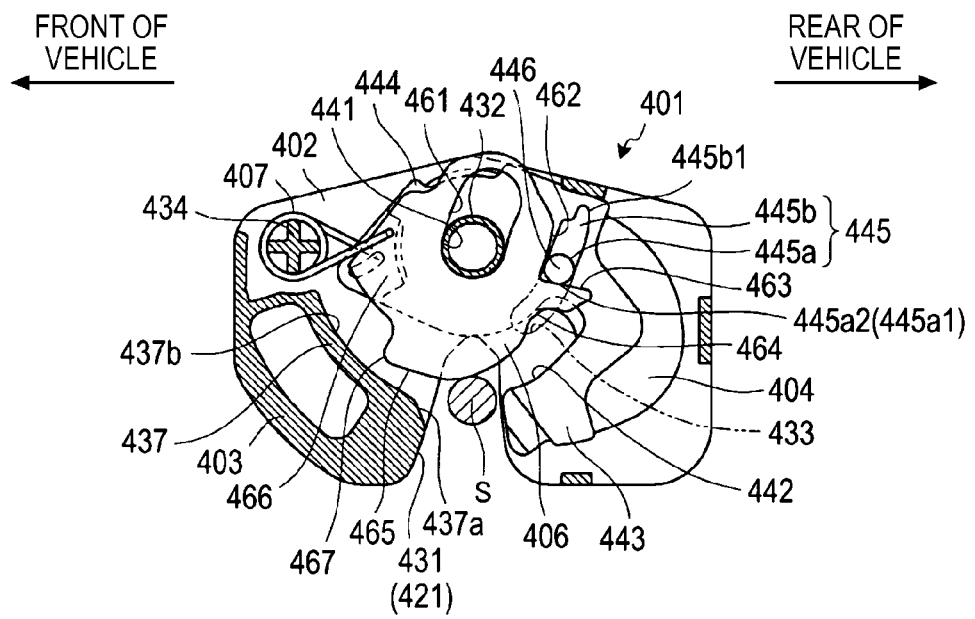
Figures 4, 21:
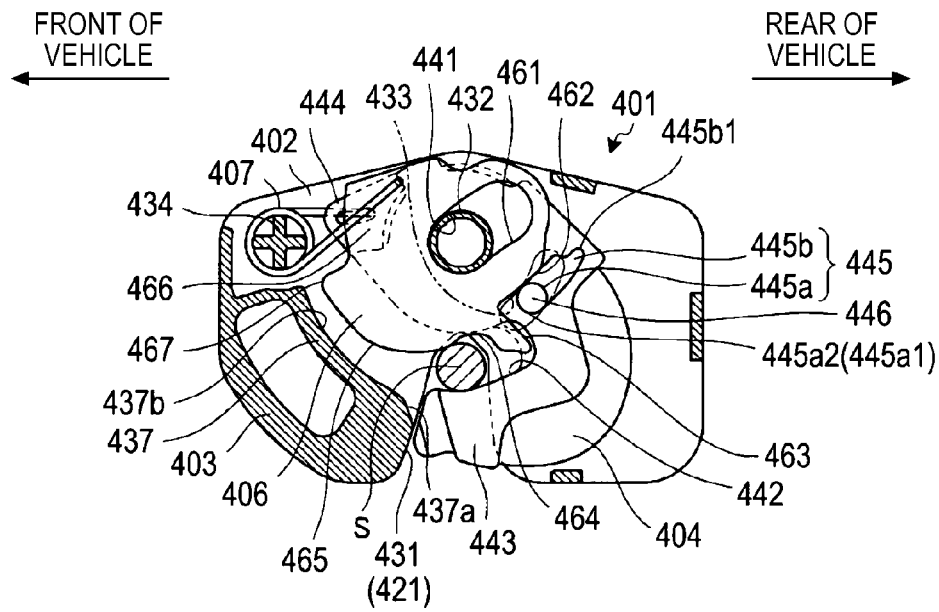
Figures 5, 21:
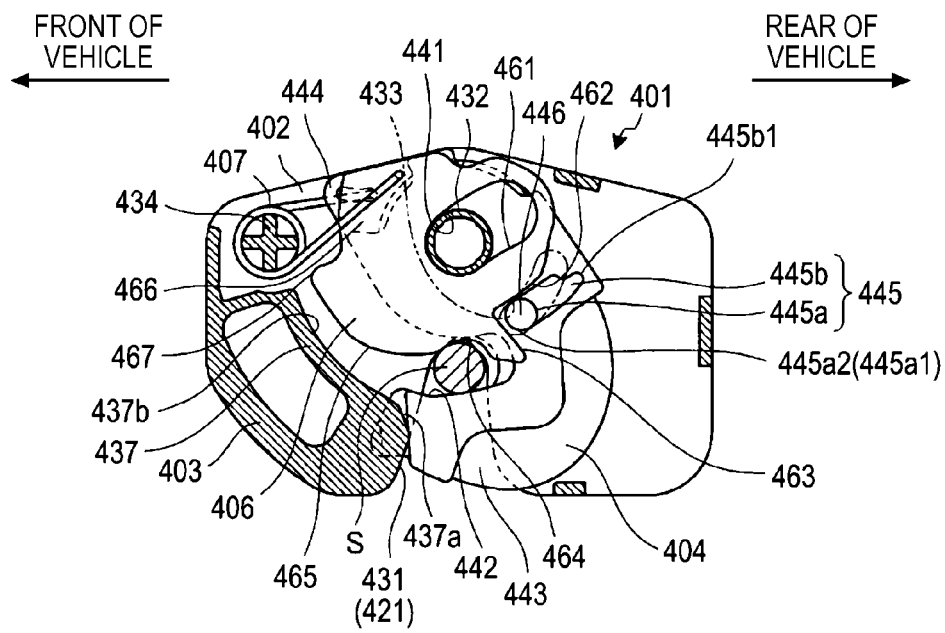
Figures 1, 22:
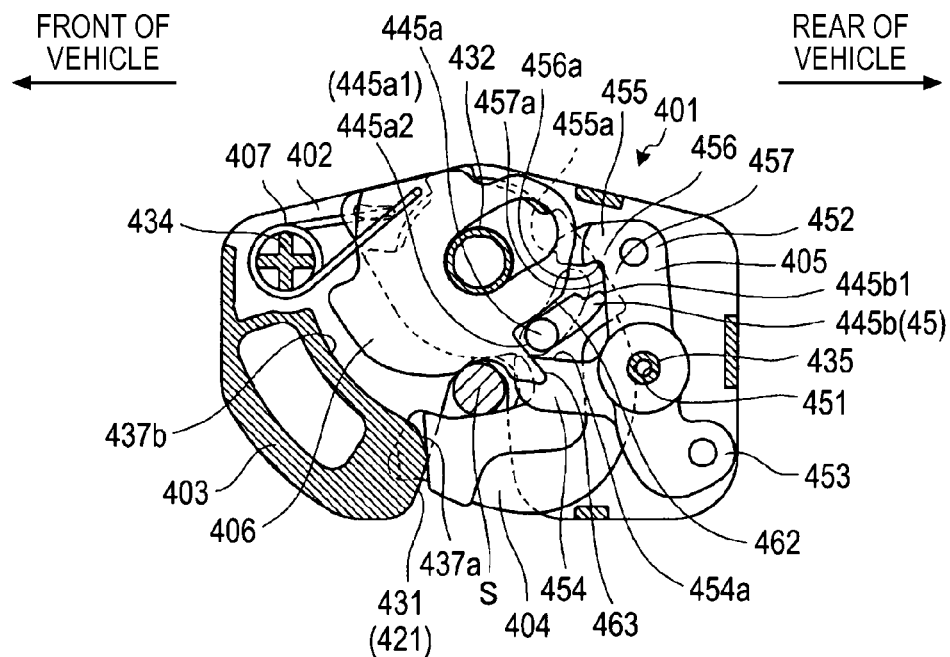
Figures 2, 22:
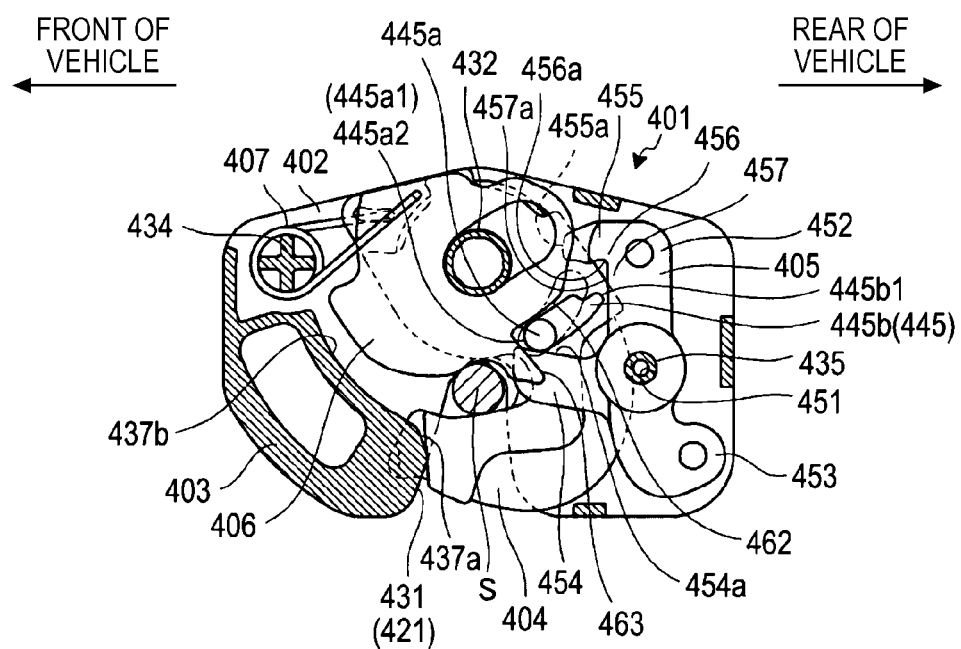
Figures 3, 22:
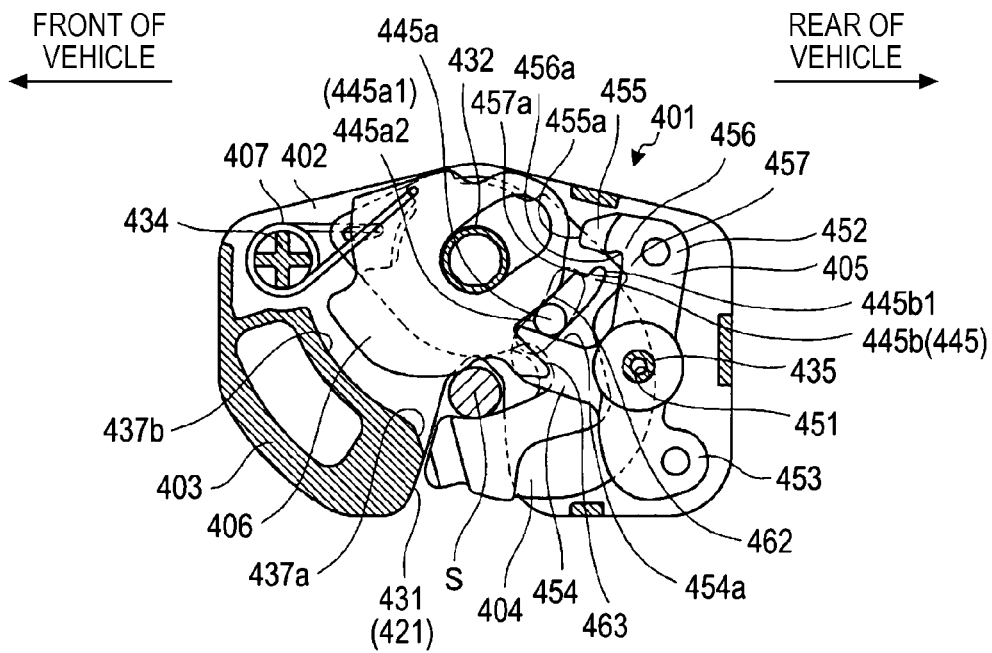
Figures 4, 22:
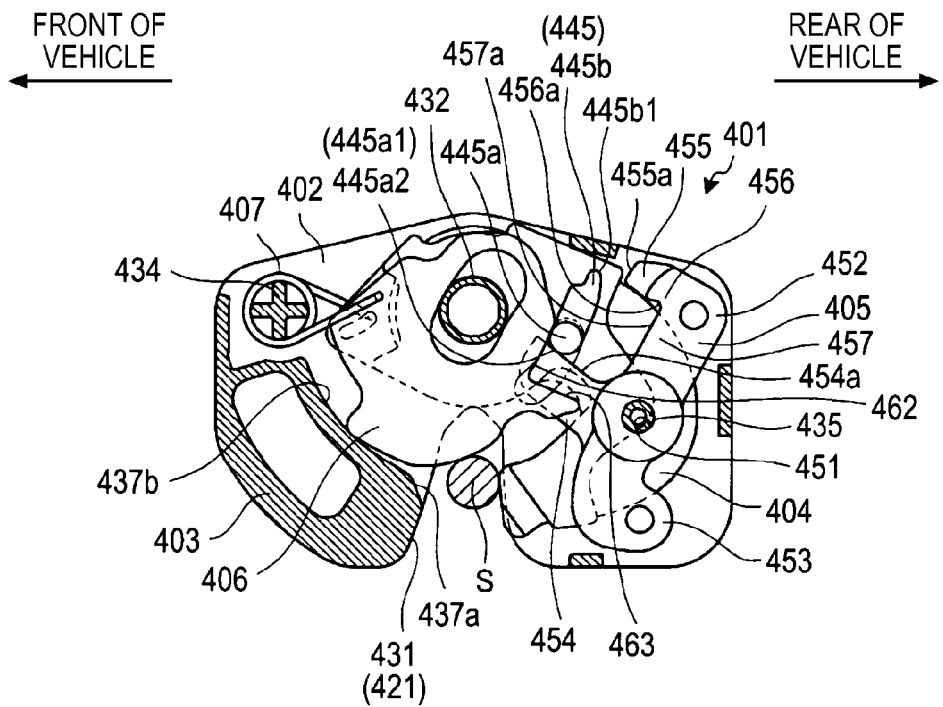
Figures 5, 22:
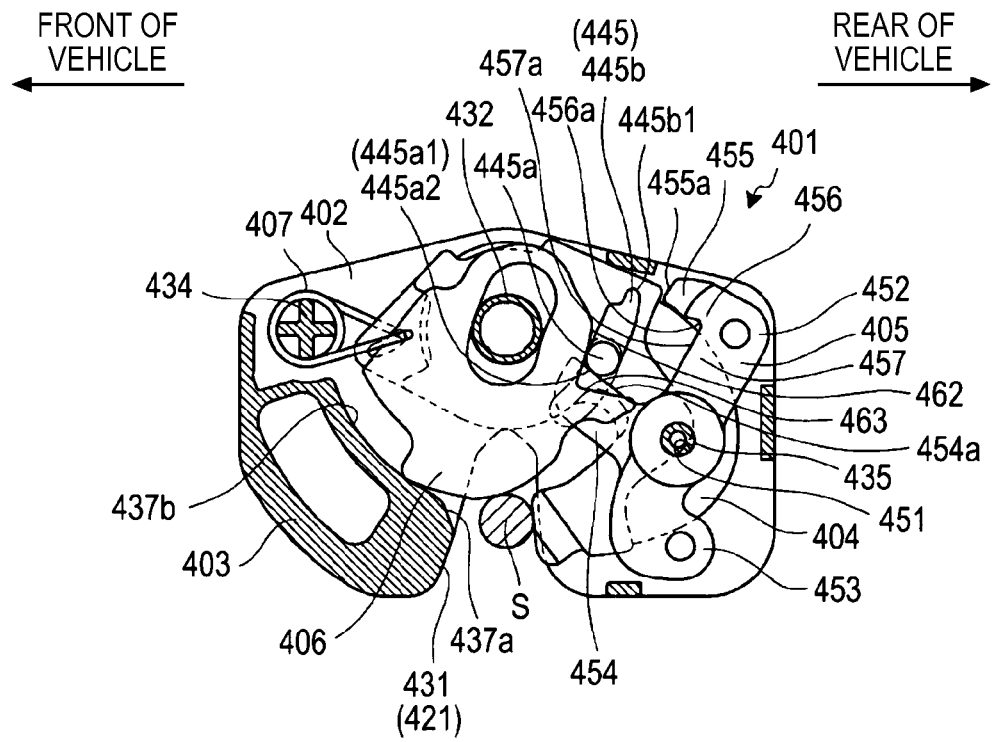
Figures 6, 22:
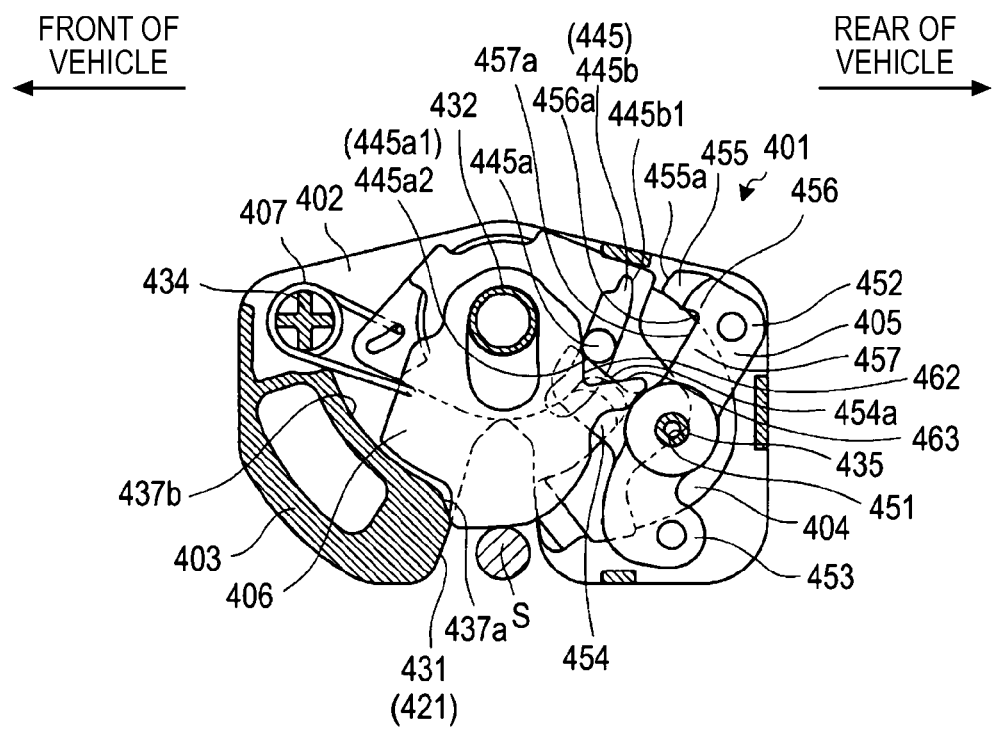
Figures 7, 22:
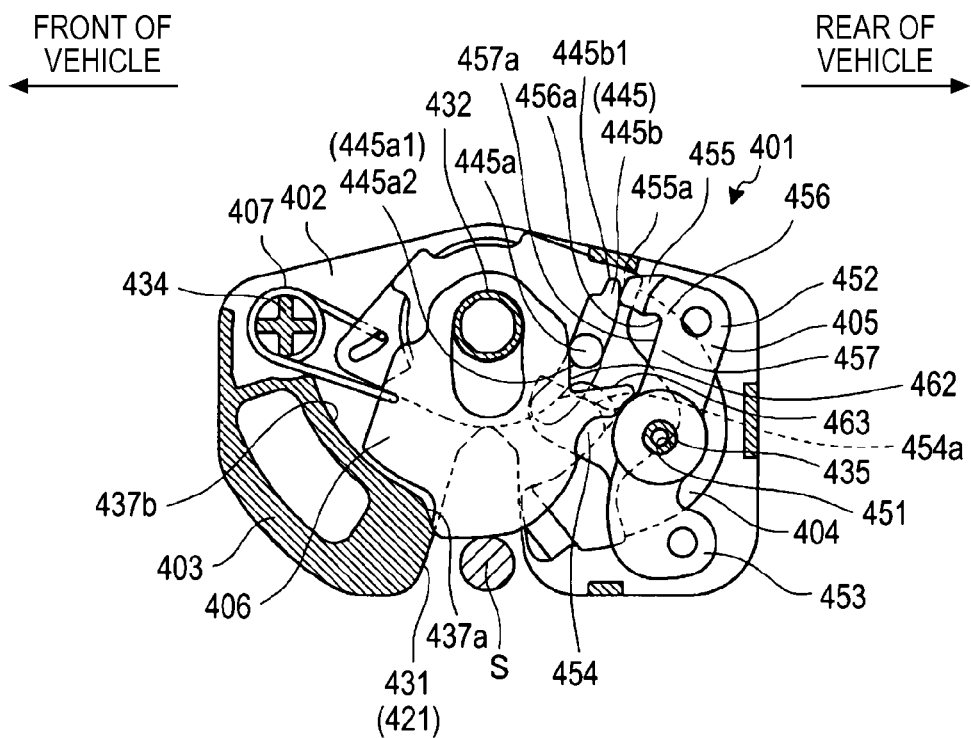

FIG. 18 is a conceptual drawing which shows the configuration of a lock apparatus which configures Embodiment 5 of the invention, and FIG. 19 is an exploded perspective view of the lock apparatus shown in FIG. 18. Additionally, FIG. 20 is a perspective view of a body plate shown in FIG. 19 which is seen from the side of a base plate. Further, FIG. 21 shows drawings depicting relationships between a hook lever and a guide lever, and FIG. 22 shows drawings depicting relationships among the hook lever, guide lever and an opening lever.

As shown in FIG. 18, a lock apparatus 401 described as an example includes a base plate 402 and a body plate 403 which is mounted on the base plate 402 so as to be combined therewith. The body plate 403 has a required thickness (a thickness which is thick enough to accommodate therein a hook lever 404, an opening lever 405 and a guide lever 406, which will be described later), and a mechanism accommodating portion 430 (refer to FIG. 20) is formed on a surface thereof which faces the base plate 402 (hereinafter, referred to as an "internal surface"). Additionally, as shown in FIG. 19, the hook lever 404, the opening lever 405 and the guide lever 406 are accommodated in an interior of the mechanism accommodating portion 430 sequentially in that order as seen from the side of the base plate 402 towards the side of the body plate 403.

In addition, entrance grooves 421, 431 are provided in the base plate 402 and the body plate 403, respectively, in substantially longitudinal central positions of the vehicle. The entrance grooves 421, 431 are provided along an entering direction of a striker S (refer to FIG. 21). The lock apparatus 401 of Embodiment 5 is brought into engagement with the striker S which is mounted on the vehicle main body, and therefore, the entering direction of the striker S is substantially vertical. The entrance grooves 421, 431 are formed so as to be substantially vertical from a floor side towards a ceiling side of the vehicle main body. The entrance grooves 421, 431 are formed to have a width which enables the striker S to be accommodated therein and are formed so as to be gradually narrowed from an entrance side to a deep side of the entrance grooves 421, 431. Then, deepest portions of the entrance grooves 421, 431 are formed into a triangular shape made up of two inclined surfaces so that the striker S which enters the deepest portions comes into contact therewith at two points.

As shown in FIG. 20, a hook shaft 432 is provided on the internal surface of the body plate 403 in a position which lies on a deep side in the entering direction of the striker S. The hook shaft 432 is intended to support the hook lever 404 rotationally and is formed into a cylindrical shape, extending substantially horizontally from an inner side to an outer side of a passenger compartment in a widthwise direction of the vehicle. Additionally, a hole 432a which passes through a center of the hook shaft 432 penetrates the hook shaft 432 from the inner side to the outer side of the passenger compartment in the widthwise direction of the vehicle. In addition, ribs (elongated projections) 432a1 are formed at equal intervals in a circumferential direction on an inner circumferential surface of the hole 432a, that is, a surface of an inner wall of the hook shaft 432. The ribs 432a1 generate sliding resistance with a shank portion of a fastening member 409 (refer to FIGS. 24 to 25) which is inserted through the hole 432a.

In addition, a hook restriction groove 433 is provided in the body plate 403 in a position which lies on a rear side of the hook shaft 432 in the longitudinal direction of the vehicle. The hook restriction groove 433 is intended to restrict a rotational area of the hook lever 404 and is formed into an arc-like shape which is centered at the hook shaft 432.

Additionally, a spring seat 434 is provided on the internal surface of the body plate 403 in a position which lies on a front side of the hook shaft 432 in the longitudinal direction of the vehicle. The spring seat 434 is a place where a hook spring (a torsional coil spring) 407 is mounted and is formed into a cross-like shape, extending substantially horizontally from the inner side to the outer side of the passenger compartment in the widthwise direction of the vehicle.

In addition, an opening shaft 435 is provided on the internal surface of the body plate 403 in a position which lies obliquely downwards to the hook shaft 432 on the rear side thereof in the longitudinal direction of the vehicle. The opening shaft 435 is intended to support the opening lever 405 rotationally and is formed into a cylindrical shape, extending substantially horizontally from the inner side to the outer side of the passenger compartment in the widthwise direction of the vehicle.

Additionally, as shown in FIG. 18, a lever spring seat 436 is provided on an opposite side (an external surface) to the internal surface of the body plate 403 in a position which lies on a rear side of the entrance groove 431 in the longitudinal direction of the vehicle. The lever spring seat 436 is a place where a lever spring (a torsional coil spring) 408 is mounted and is formed into a depression with a cylindrical portion where a coil portion of the lever spring 408 is mounted left as it is.

Additionally, as shown in FIG. 20, a fastening seat 437 is provided on the body plate 403 in a position which lies obliquely downwards to the hook shaft 432 on the front side thereof in the longitudinal direction of the vehicle. The fastening seat 437 is a place where the lock apparatus 403 is attached to a seat or the like (an example of a mount member) and is formed into an arc-like shape which is centered at the hook shaft 432. The fastening seat 437 is formed in a thickness which is the thickness of the body plate 403 without any change, and an arc-shaped fastening hole (an elongated hole) 438 is formed in a center thereof. The arc-shaped fastening hole 438 is formed so as to be centered at a rotation center of the hook lever 404, specifically, to be centered at an axis of the hook shaft 432, whereby there occurs no such situation that a second fastening member 410 interrupts a rotational movement of a case of the lock apparatus 401 which is made up of the base plate 2 and the body plate 3. Additionally, the arc-shaped fastening hole 438 limits a rotating range of the case of the lock apparatus 401 which is made up of the base plate 2 and the body plate 3. As with the lock apparatus of Embodiment 2 shown in FIG. 8, it is preferable to provide on an inner circumference of the fastening hole 438 a plurality of ribs (an example of a posture maintaining portion, a sliding portion) which protrude inwards from the inner circumference of the fastening hole 438 so as to generate sliding resistance with a shank portion of the second fastening member 410. Additionally, a locking surface 437*a* (refer to FIG. 21) which temporarily locks the guide lever 406 is formed on a surface of the fastening seat 437 which faces the entrance groove 431. An inner circumferential surface 437*b* (refer to FIG. 21) thereof which faces the hook shaft 432 configures a sliding surface when the guide lever 406 rotates counterclockwise.

As shown in FIG. 21, the hook lever 404 is supported rotatably on an outer circumference of the hook shaft 432. The hook lever 404 is intended to be brought into engagement with the striker S which enters the entrance grooves 421, 431 from an entrance side to a deep side thereof to hold the striker S and is formed into a hook-like shape. Additionally, the hook lever 404 has a shaft hole 441 (refer to FIG. 19) which is formed in the center thereof for the hook shaft 432 to fit therein, and an engagement groove 442, a hook portion 443 and a spring attaching portion 444 are formed on an outer circumference of the shaft hole 441.

The engagement hole 442 is formed from an outer circumferential surface of the hook lever 404 in a counterclockwise direction as seen in FIG. 21 about the shaft hole 441 and is formed to have a width which enables the striker S to be accommodated therein. Additionally, an inner circumferential surface of an opening side end portion (a distal end side end portion) of the engagement groove 442 is formed into an arc-like shape which is centered at the shaft hole 441. By adopting this configuration, even though a force is applied to the striker S which is in engagement with the engagement groove 442 to be held therein in a direction in which the striker S is disengaged therefrom, there occurs no such situation that the hook lever 404 rotates in the direction in which the striker S is disengaged from the engagement groove 442 (a counterclockwise direction as seen in FIG. 21). Further, an inner circumferential surface of the engagement groove 442 which extends from a middle portion to a deep side is formed into a tapered shape in such a manner that a distance to the shaft hole 441 gradually decreases. By adopting this configuration, when the hook lever 404 rotates in a direction in which the hook lever 404 is brought into engagement with the striker S (in a clockwise direction as seen in FIG. 21), the striker S is brought into contact with the engagement groove 442 at one point, whereby a wedge effect can be obtained. In addition, as this occurs, the striker S is supported at two points at deepest portions of the entrance grooves 421, 431 and the one point on the engagement groove 442 and is stabilized between the entrance grooves 421, 431 and the engagement groove 442 (no rattling looseness is generated). In this way, when the striker S is stabilized, the seat is also fixed in an ensured fashion.

As shown in FIG. 21-5, with the engagement groove 442 opened towards the front side in the longitudinal direction of the vehicle, the hook portion 443 is a portion which lies below the engagement groove 442. The hook portion 443 is configured so that when the hook lever 404 is rotationally moved clockwise as seen in FIG. 21, as shown in FIG. 21-5, the hook portion 443 stops in a position where the hook portion 443 cross the entrance grooves 421, 431 (an engagement position), while when the hook lever 404 is rotationally moved counterclockwise as seen in FIG. 21, as shown in FIG. 21-1, the hook portion 443 stops in a position where the hook portion 443 opens the entrance grooves 421, 431 (an opening position).

The spring attaching portion 444 is a portion which extends diametrically outwards of the shaft hole 441, and one end (a leg) of a hook spring (a torsional coil spring) 407 which is mounted on the spring seat 434 is attached thereto. By adopting this configuration, a clockwise elastic restoring force (a biasing force) is exerted to the hook lever 404 at all times as seen in FIG. 21.

Additionally, a lever abutment portion 445 is formed between the shaft hole 441 and the hook portion 443. The lever abutment portion 445 is a portion with which the opening lever 405 (refer to FIG. 22) and the guide lever 406 are brought into abutment and is provided so as to protrude from the outer side to the inner side in the widthwise direction of the vehicle. One end side (an entrance groove side) 445*a* of the lever abutment portion 445 configures a pressure bearing surface 445*a*1 which bears a pressure from the opening lever 405 (hereinafter, referred to as an "opening lever pressure bearing surface 445*a*1") and a pressed surface 445*a*2 which is pressed against by the guide lever 406 (hereinafter, referred to as a "guide lever pressed surface 445*a*2"), and the other end side (an outer circumferential side) 445*b* configures a pressed surface 445*b*1 which is pressed against by the opening lever 405 (hereinafter, referred to as an "opening lever pressed surface 445*b*1"). By adopting this configuration, as shown in FIG. 22, the lever abutment portion 445 is positioned between a pressing portion 454 and a detecting portion 455 of the opening lever 405, which will be described later. Further, the lever abutment portion 445 is positioned between a hook lever engagement portion 462 and a hook lever abutment portion 463 of the guide lever 406, which will be described later. In other words, the lever abutment portion 445 is surrounded by the pressing portion 454 and the detecting portion 455 of the opening lever 405 and the hook lever engagement portion 462 and the hook lever abutment portion 463 of the guide lever 406. By adopting this configuration, the hook lever 404, the opening lever 405 and the guide lever 406 can be disposed in proximity to one another, realizing a reduction in size of the lock apparatus 401.

In addition, a projection 446 is provided at the one end side (the entrance groove side) 445*a* of the lever abutment portion 445 (refer to FIG. 19). The projection 446 is a portion which fits in a hook restriction groove 433 which is formed in the body plate 403 so as to restrict a rotating area of the hook lever 404. The projection 446 is formed into a cylindrical shape and is provided so as to protrude from the inner side to the outer side of the passenger compartment in the widthwise direction of the vehicle. A position where the projection 446 is brought into abutment with the hook restriction groove 433 as a result of the hook lever 404 rotating counterclockwise configures the opening position of the hook lever 404 where the entrance grooves 421, 431 are opened (refer to FIG. 21-1). On the other hand, even though the hook lever 404 rotates clockwise after the striker S enters the entrance grooves 421, 431 and the hook lever 404 rotates to the engagement position, a gap remains between the projection 446 and a groove end of the hook restriction groove 433, whereby there occurs no such situation that the projection 446 is brought into abutment with the groove end of the hook restriction groove 433.

As shown in FIG. 22, the opening lever 405 is supported rotatably on an outer circumference of the opening shaft 435. The opening lever 405 is intended to disengage the striker S from the hook lever 404 with which the striker S is in engagement and is formed into a balance-like shape. In addition, the opening lever 405 has a shaft hole 451 which is formed in the center thereof for the opening shaft 435 to fit therein. A pull rod attaching portion 452 is formed at one end of the opening lever 405 which lies near the hook shaft 432, and a push rod attaching portion 453 is formed at the other end thereof which lies far away from the hook shaft 432. Additionally, the pressing portion 454 is formed on the opening lever 405 so as to extend from the center thereof to the front in the longitudinal direction of the vehicle.

The pull rod attaching portion 452 and the push rod attaching portion 453 are portions to which an operation force from an operating operation (not shown) which operates to open the lock apparatus 401 is transmitted, and depending upon the specification of the operating portion, a rod (not shown) which makes up a linkage means is attached to either of the rod attaching portions. Specifically, when the opening lever 405 is rotated by pulling the operating portion, a rod (a pull rod) is mounted between the pull rod attaching portion 452 and the operating portion. On the other hand, when the opening lever 405 is rotated by pushing the operating portion, a rod (a push rod) is mounted between the push rod attaching portion 453 and the operating portion.

The pressing portion 454 is intended to press against the lever abutment portion 445 which is formed on the hook lever 404 and is formed into a claw-like shape. A surface of the pressing portion 454 which faces the opening lever pressure bearing surface 445$a$1 of the lever abutment portion 445 configures a pressing surface 454$a$ and the pressing portion 454 is disposed so as to be superposed on the hook lever 404. Additionally, as shown in FIG. 22-2, with the hook lever 404 located in the engagement portion, when the opening lever 405 is rotated clockwise as seen in FIG. 22, the pressing surface 454$a$ presses against the opening lever pressure bearing surface 445$a$1, whereby the hook lever 404 is rotated counterclockwise as seen in FIG. 22.

Additionally, the detecting portion 455 is provided at an end of the opening lever 405 where the pull rod attaching portion 454 is formed and which lies near the hook shaft 432. The detecting portion 455 is intended to transmit information that the hook lever 404 is opening the entrance grooves to the opening lever 405 and is provided on a front side, in the longitudinal direction of the vehicle, of the end where the pull rod attaching portion 452 is formed so as to protrude in a beak-like fashion. A surface of the opening lever 405 which faces the opening lever pressed surface 445$b$1 of the lever abutment portion 445 makes up a pressure bearing surface 455$a$. Then, when the opening lever 405 is rotated clockwise as shown in FIG. 22-6, the hook lever 404 rotates counter- clockwise from the engagement position to move to the opening position. Thereafter, when the opening lever 405 rotates counterclockwise as a result of an elastic restoring force of the lever spring 408, which will be described later, being exerted thereto, the pressing surface 454$a$ presses against the opening lever pressure bearing surface 445$a$1 to thereby bring the pressure bearing surface 455$a$ into abutment with the opening lever pressed surface 445$b$1, whereby the opening lever 405 stops in a release detecting position which lies further counterclockwise than the engagement position of the hook lever 404. In this way, when the opening lever 405 is rotated clockwise, the rotational action thereof is transmitted to the pull rod attaching portion 452 or the push rod attaching portion 453, the rod, and the operating portion sequentially in that order. By the action being transmitted in that way, the opening lever 405 moves to the release detecting position which indicates a released state of the striker S, and the state of the hook lever 404 (the opening state) is transmitted to the operating portion.

Additionally, a stopper portion 457 is provided between the detecting portion 455 and the shaft hole 451 at a position facing the lever abutment portion 445. The stopper portion 457 is intended to transmit the engagement state of the hook lever 404 to the opening lever 405. A surface which faces the lever abutment portion 445 configures a pressure bearing surface 457$a$. As shown in FIG. 22-1, with the hook lever 404 in the engagement state, when the opening lever 405 to which the elastic restoring force of the lever spring 408, which will be described later, is exerted is rotated counterclockwise as seen in FIG. 22-1, the pressure bearing surface 457$a$ is brought into abutment with the lever abutment portion 445, whereby the opening lever 405 stops in an engagement detecting position. As a result of this, the hook lever 404 is allowed to be brought into abutment with the lever abutment portion 445 at the different portions between when the opening lever 405 stops in the engagement detecting position and when the opening lever 405 stops in the release detecting position. Thus, the state of the hook lever 404 can be indicated accurately to the operating portion which is linked with the opening lever 405. By adopting this configuration, the operating portion also functions as an indicator which indicates the state (the engagement state or the opening state) of the hook lever 404.

As this occurs, the hook lever 404 rotates counterclockwise towards the opening position from the engagement position as a result of the opening lever 405 rotating clockwise. When the pressing surface 454$a$ is pressing against the opening lever pressure bearing surface 445$a$1, there occurs no such situation that the opening lever pressed surface 445$b$1 presses against the pressure bearing surface 455$a$, and therefore, the opening function and the indicator function do not interfere with each other.

In the opening lever 405, a portion lying between the shaft hole 451 and the end where the pull rod attaching portion 452 is formed and which lies near the hook shaft 432 makes up a rotation preventing portion 456. The rotation preventing portion 456 is intended to prevent an unintentional rotation of the hook lever 404 which is located in the engagement position to the opening position even when the vehicle is involved in a collision. A surface of the rotation preventing portion 456 which faces the opening lever pressed surface 445$b$1 of the lever abutment portion 445 makes up a rotation preventing surface 456$a$ when the hook lever 404 is located in the engagement position. Then, as shown in FIG. 22-3, when the hook lever 404 is located in the engagement position, the opening lever pressed surface 445$b$1 faces the rotation preventing surface 456$a$. Then, even though the hook lever 404 rotates counterclockwise as seen in FIG. 22 from the engagement position as a reaction to the collision of the vehicle or the like, the opening lever pressed surface 445b1 is brought into abutment with the rotation preventing surface 456a, whereby the hook lever is prevented from rotating counterclockwise any further, there occurring no such situation that the hook lever 404 reaches the opening position.

As shown in FIG. 18, the lever spring 408 is mounted on the lever spring seat 436. The lever spring 408 is intended to exert its elastic restoring force (a biasing force) to the opening lever 405 at all times. The opening lever 405 to which the elastic restoring force of the lever spring 408 is exerted rotates counterclockwise as seen in FIG. 22, whereby the opening lever 405 is brought into abutment with the lever abutment portion 445 which is provided on the hook lever 404. In Embodiment 5, while the lever spring 408 is constructed to be mounted on the lever spring seat 436 to thereby rotate the opening lever 405 counterclockwise (refer to FIG. 22), a construction may be adopted in which the opening lever 405 is rotated counterclockwise by mounting the lever spring 408 on the side of the operating portion.

As shown in FIG. 21, the guide lever 406 is intended to move the hook lever 404 from the opening position to the engagement position by being pressed by the striker S which moves from the entrance side to the deep side in the entering direction of the striker S. The guide lever 406 is loosely fitted on a guide shaft (the hook shaft 432) which is provided on the deep side in the entering direction of the striker S in such a manner as to be partially overlapped on the hook lever 404 and is biased from the deep side towards the entrance side in the entering direction of the striker S. In Embodiment 5, while the guide shaft is the same shaft as the hook shaft 432 and the guide lever 406 is loosely fitted on the hook shaft 432, the guide shaft may be provided separately from the hook shaft 432.

The guide lever 406 is formed into a fan-like shape, and a guide hole 461 having an elongated hole shape and through which the guide shaft (the hook shaft 32) is inserted is formed at a portion which configures a pivot of the fan. Additionally, the guide lever 406 has a hook lever engagement portion 462 (an engagement portion) which is formed on an outer circumference thereof and a hook lever abutment portion 463 (an engagement portion) which is formed at a right-hand side edge portion. A striker engagement portion 464, a striker sliding contact portion 465 and a spring attaching portion 466 are formed on the outer circumference of the guide lever 406 in such a manner as to be centered at one end side of the guide hole 461, and a locking portion 467 is formed at a boundary between the striker sliding contact portion 465 and the spring attaching portion 466.

The hook lever engagement portion 462 is a portion which is brought into engagement with the lever abutment portion 445 which is provided on the hook lever 404 in the waiting state resulting before the striker S enters the entrance grooves 421, 431, as shown in FIG. 21-1.

The hook lever abutment portion 463 is a portion which is brought into abutment with the lever abutment portion 445 which is provided on the hook lever 404 and extends diametrically outwards from one end side of the guide hole 461, as shown in FIG. 21-3.

The striker engagement portion 464 is a portion which is brought into engagement with the striker S when the striker S enters the entrance grooves to deepest portions thereof in the entering direction of the striker S, as shown in FIG. 21-5, and an outer circumferential surface of the striker engagement portion 464 is formed into an arc-like shape so as to be brought into engagement with an outer circumference of the striker S.

As shown in FIG. 21, the striker sliding contact portion 465 is a portion which is formed so that a distance from the one end of the guide hole 461 gradually increases in a clockwise direction from the striker engagement portion 464 while being centered at the one end of the guide hole 461. By being brought into sliding contact with the striker S which enters the entrance grooves 421, 431 from the entrance side to the deep side, the guide lever 406 gradually rotates clockwise as seen in FIG. 21.

The spring attaching portion 466 is a portion which extends diametrically outwards from the one end side of the guide hole 461, and the other end (leg) of the hook spring (the torsional coil spring) 407 which is mounted on the spring seat 434 is attached thereto. This exerts an elastic restoring force (a biasing force) on the guide lever 406 at all times in a counterclockwise direction and towards the entrance side of the entrance grooves 421, 431, and the hook lever engagement portion 62 is brought into engagement with the lever abutment portion 445 which is provided on the hook lever 404.

As shown in FIG. 21-1, the locking portion 467 is a portion which is brought into engagement with the locking surface 437a formed on the fastening seat 437 in the waiting state resulting before the striker S enters the entrance grooves 421, 431. The locking portion 467 is disengaged from the locking surface 437a when the striker S enters the entrance grooves 421, 431.

In the lock apparatus 401 which is configured as described above, when the seat (not shown) is not yet fixed to the floor (not shown), as shown in FIG. 22-7, the hook lever 404 is disposed in the opening position. As this occurs, the other end (a deep side end) of the guide hole 461 in the guide lever 406 is brought into abutment with the hook shaft 432, and the locking portion 467 of the guide lever 406 is locked on the locking surface 437a of the fastening seat 437. As a result of this, in a waiting state resulting before the striker S enters the entrance grooves 421, 431, the guide lever 406 is locked on the body plate 403, and the lever abutment portion 445 of the hook lever 404 is brought into engagement with the hook engagement portion 462 of the guide lever 406. As a result of this, the hook lever 404 is restricted from moving from the opening position to the engagement portion. On the other hand, the elastic restoring force of the lever spring 408 is exerted on the opening lever 405, whereby a force is exerted which rotates the opening lever 405 counterclockwise. This brings the detecting portion 455 of the opening lever 405 into abutment with the lever abutment portion 445 of the hook lever 404, and the opening lever 405 moves to the release detecting position which indicates that the striker S is released. As this occurs, the hook lever 404 indicates that the hook lever 404 is in the opening state (the seat is in the unlocked state) to the operating portion.

When the seat is inclined from this state, the striker S which is mounted on the vehicle main body or an upper surface of the floor is brought into abutment with the striker sliding contact portion 465 of the guide lever 406 to press against the striker sliding contact portion 465. This moves the guide lever 406 to the deep sides of the entrance grooves 421, 431 against the elastic restoring force of the hook spring 407 while being guided by the hook shaft 432 and the guide hole 461, the locking surface 437a and the locking portion 467, as well as the lever abutment portion 445 and the hook lever engagement portion 462 and rotates the guide lever 406 clockwise. Then, as shown in FIG. 21-2, the locking portion 467 of the guide lever 406 is disengaged from the locking surface 437a of the fastening seat 437, and the lever abutment portion 445 of the hook lever 404 is disengaged from the hook lever engagement portion 462 of the guide lever 406, so as to be brought into abutment with the hook lever abutment portion 463 of the guide lever 406. By this abutment, the guide lever 406 on which the counterclockwise elastic restoring force is exerted by the hook spring 407 can be rotated clockwise in an ensured fashion. Thereafter, as shown in FIG. 21-3, when the striker S enters further towards the deep side in the entering direction of the striker S, the guide hole 461 of the guide lever 406 is guided by the hook shaft 432, and the striker S is brought into sliding contact with the striker sliding contact portion 46 of the guide lever 406, whereby the guide lever 406 rotates clockwise and moves to the deep side in the entering direction of the striker S. In Embodiment 5, while the guide lever 406 is constructed so as to move to the deep side in the entering direction of the striker S as shown in FIG. 21 in such a state that the locking portion 467 of the guide lever 406 is spaced away from the inner circumferential surface 437b of the fastening seat 437, a construction may be adopted in which the locking portion 467 is in abutment with the inner circumferential surface 437b at all times.

Then, as shown in FIG. 21-4, when the striker S reaches the deepest portion in the entering direction of the striker S, the striker S is brought into contact with the two points of the individual deepest portions of entrance grooves 421, 431. On the other hand, as the striker S moves to the deep side in the entering direction of the striker S by the clockwise rotation of the guide lever 406, the hook lever 404 is rotated clockwise by means of the elastic restoring force of the hook spring 407 which is increased more than at the opening position. This releases the abutment state between the lever abutment portion 445 of the hook lever 404 and the detecting portion 455 of the opening lever 405.

Then, as shown in FIG. 21-5, when the hook lever 404 rotates to such an extent that one point on the inner circumferential surface of the engagement groove 442 comes into contact with the striker S, the hook lever 404 is brought into engagement with the striker S to hold it. As this occurs, a wedge effect can be obtained between an inner circumferential surface of the hook lever 404 and the striker S, whereby the striker S is held stably. In addition, as shown in FIG. 21-5, since the hook portion 443 of the hook lever 404 is disposed to cross the entrance grooves 421, 431, the occurrence of a situation in which the striker S moves in a direction in which the striker S is dislocated from the entrance grooves 421, 431, that is, an erecting operation of the seat relative to the floor is prevented by the hook portion 443 (an engagement state).

In addition, the opening lever 405 rotates counterclockwise further than the release detecting position as seen in FIG. 22, and the pressure bearing surface 457a of the stopper portion 457 is brought into abutment with the lever abutment portion 445 of the hook lever 404, whereby the opening lever 405 moves to the engagement detecting position which indicates the engagement state of the striker S. This indicates that the hook lever 404 is in the engagement state (the seat is in the locked state) to the operating portion. In addition, as this occurs, as shown in FIG. 22-1, the lever abutment portion 445 of the hook lever 404 faces the rotation preventing portion 456 of the opening lever 405. This brings the opening lever pressed surface 445b1 of the lever abutment portion 445 into abutment with the rotation preventing surface 456a of the rotation preventing portion 456 even though the hook lever 404 rotates counterclockwise from the engagement position as seen in FIG. 22 as a reaction from the collision of the vehicle or the like, whereby the occurrence of a situation in which the hook lever 404 rotates counterclockwise any further is prevented, and hence, there occurs no such situation that the hook lever 404 reaches the opening position.

On the other hand, when the opening lever 405 is rotated clockwise as seen in FIG. 22-1 against the elastic restoring force of the lever spring 408 by pushing or pulling the operating portion, as shown in FIG. 22-2, the pressing portion 454 of the opening lever 405 is brought into abutment with the lever abutment portion 445 of the hook lever 404. When the opening lever 405 is rotated clockwise further as seen in FIG. 22, as shown in FIG. 22-3, the pressing portion 454 of the opening lever 405 presses against the lever abutment portion 445 of the hook lever 404, whereby the hook lever 404 is rotated counterclockwise as seen in FIG. 22.

In association with this, as shown in FIG. 22-4, the elastic restoring force of the hook spring 407 which is increased to a higher level than at the engagement position is exerted on the guide lever 406, whereby the guide lever 406 is rotated counterclockwise as seen in FIG. 22 and towards the entrance sides of the entrance grooves 421, 431. Consequently, a force which pushes out the striker S from the deep side to the entrance side in the entering direction is exerted on the guide lever 406.

Then, as shown in FIG. 22-5, when the hook lever 404 opens the entrance grooves 421, 431, the striker S is allowed to be dislocated from the entrance grooves 421, 431, and the guide lever 406 pushes out the striker S from the deep side to the entrance side in the entering direction.

Then, as shown in FIG. 22-6, when the hook lever 404 moves to the opening position and the guide lever 406 pushes out the striker S from the entrance grooves 421, 431, the seat can be erected relative to the floor.

Figures 1, 23:
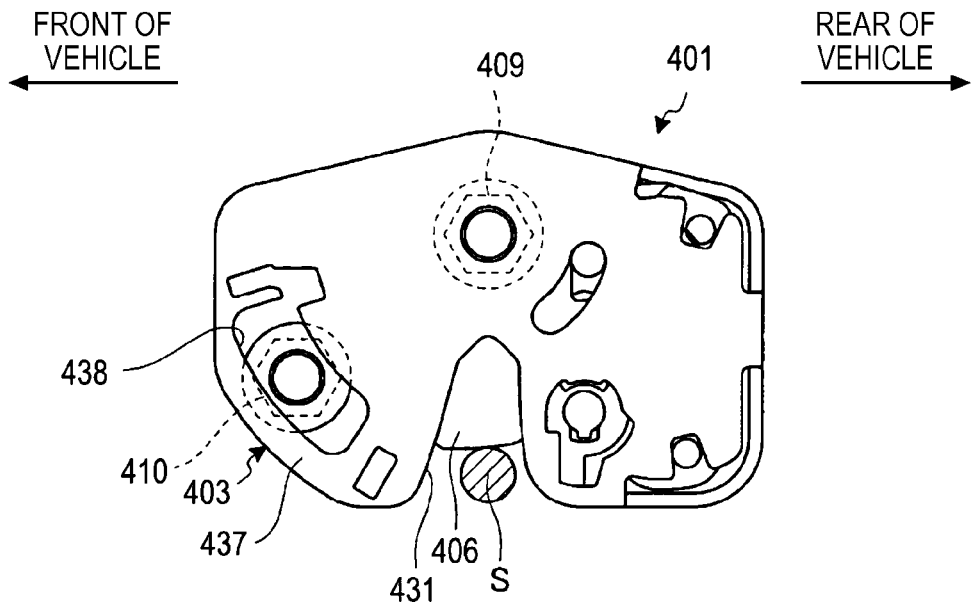
Figures 2, 23:
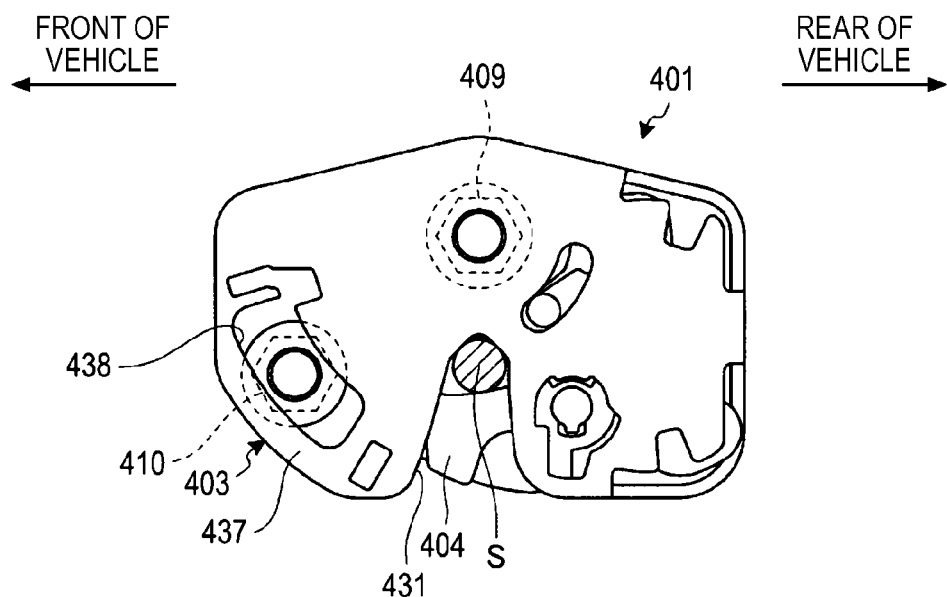

The lock apparatus 401 described above is mounted on the seat by the fastening member 409 which is inserted through the hole 432a which penetrate the hook shaft 432 and the second fastening member 410 which is inserted through the arc-shaped fastening hole (the elongated hole) 438 which is provided in the fastening seat 437, as shown in FIG. 23. This enables the lock apparatus 401 to rotate about the hook shaft 432. In addition, as shown in FIG. 23-1, with the striker S mounted in a reference position, the lock apparatus 401 is brought into engagement with the striker S to hold is without rotating (refer to FIG. 23-3).

Figures 1, 24:
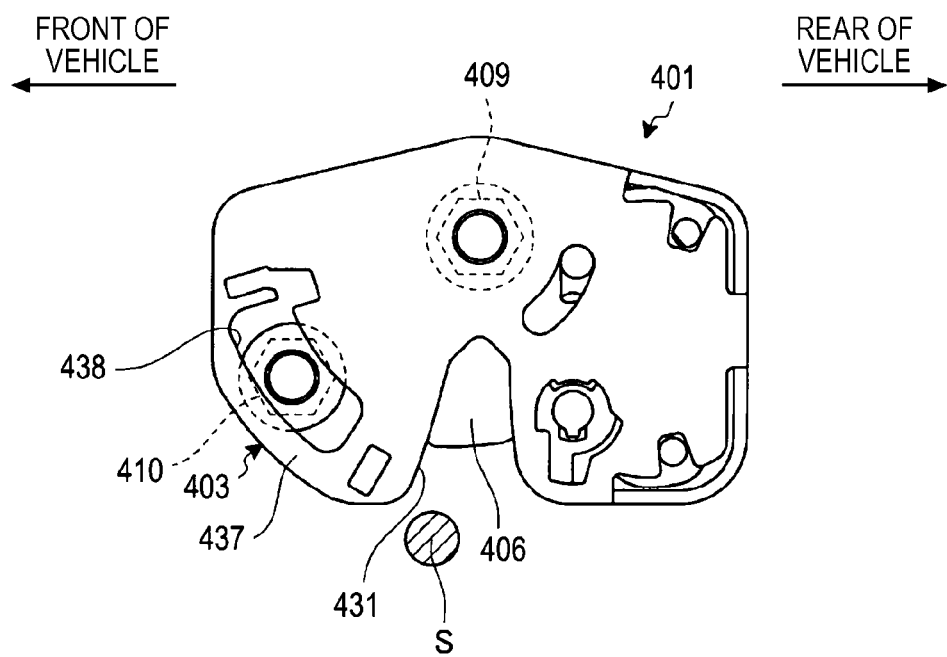
Figures 2, 24:
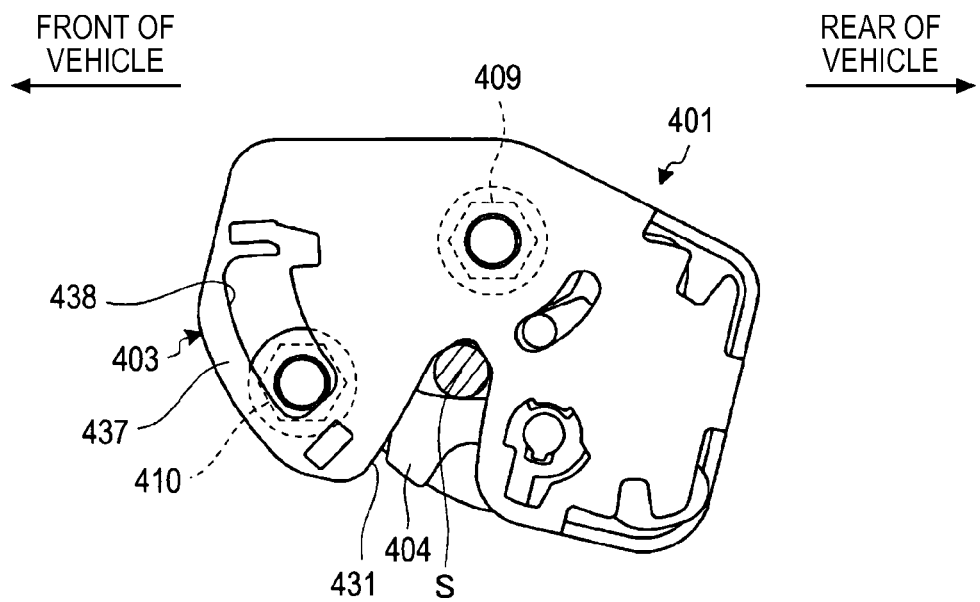

On the other hand, as shown in FIG. 24, with the striker S mounted further forwards to the front of the vehicle than the reference position, the lock apparatus 401 rotates clockwise as seen in FIG. 24 as a result of the striker S entering the entrance grooves 421, 431. This enables the striker S to enter the lock apparatus 401, whereby the lock apparatus 401 is brought into engagement with the striker S to hold it (refer to FIG. 24-2). As described above, the ribs 432a1 which generate the sliding resistance with the fastening member 409 are provided on the inner circumferential surface of the hole 432a (the surface of the inner wall of the hook shaft 432) through which the fastening member 409 is inserted, and the ribs which generate the sliding resistance with the second fastening member 410 are provided on the inner circumference of the fastening hole 438 through which the second fastening member 410 is inserted, and therefore, the posture of the rotated lock apparatus 401 can be maintained. Consequently, even with the striker S mounted further forwards to the front of the vehicle than the reference position, the seat is fixed.

Figures 1, 25:
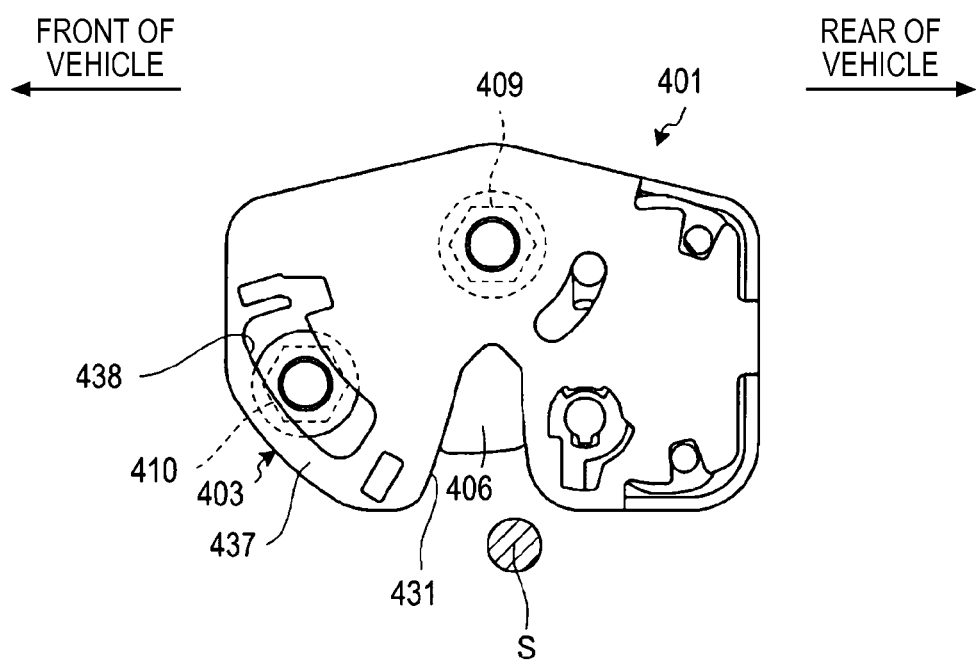
Figures 2, 25:
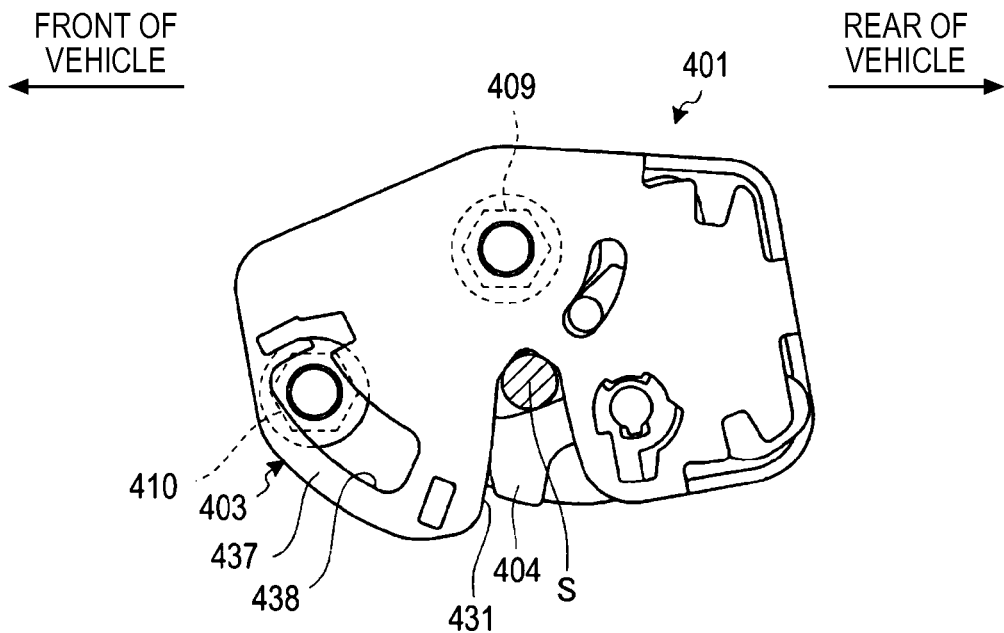

On the other hand, as shown in FIG. 25, with the striker S mounted further rearwards to the rear of the vehicle than the reference position, the lock apparatus 401 rotates counterclockwise as seen in FIG. 25 as a result of the striker S entering the entering grooves 421, 431. As a result of this, the striker S enters the lock apparatus 401, and the lock apparatus 401 is brought into engagement with the striker S to hold it (refer to FIG. 25-2). Consequently, even with the striker S mounted further rearwards to the rear of the vehicle than the reference position, the seat is fixed.

In the lock apparatus 401 which configures Embodiment 5 of the invention described above, the hook lever 404 moves from the opening position to the engagement position while being guided by the hook shaft 432 which is provided on the deep side in the entering direction of the striker S to thereby be brought into engagement with the striker S which enters to the deep side in the entering direction of the striker S to hold it. In addition, the guide lever 406 is guided by the hook shaft 432 in such a state that the guide lever 406 is partially overlapped on the hook lever 404 and is biased from the deep side to the entrance side in the entering direction of the striker S to thereby restrict the hook lever 404 from moving from the opening position to the engagement position. On the other hand, when the striker S enters to the deep side in the entering direction, the guide lever 406 is pressed against the striker S so as to move the hook lever 404 from the opening position to the engagement position, and therefore, the hook lever 404 and the guide lever 406 are allowed to be small in size, whereby the lock apparatus 401 can be made small in size.

In addition, when the hook lever 404 moves to the opening position, the lever abutment portion 445 provided on the hook lever 404 is brought into abutment with the opening lever 405, whereby the opening lever 405 moves to the release detecting position which indicates the released state of the striker S. On the other hand, when the hook lever 404 moves to the engagement position, the opening lever 405 is disengaged from the lever abutment portion 445, whereby the opening lever 405 is allowed to move to the engagement detecting position which indicates the engagement state of the striker S. Thus, when the hook lever 404 moves from the engagement position to the opening position, the opening lever 405 moves from the engagement detecting position to the release detecting position in an ensured fashion. By adopting this configuration, the state of the hook lever 404 is indicated to the operating portion which is linked with the opening lever 405 by the rod which makes up the linkage means, and the operating portion also functions as the indicator which indicates the state (the engagement state or the opening state) of the hook lever 404.

In addition, in the waiting state resulting before the striker S enters the entrance grooves 421, 431, the guide lever 406 is locked on the body plate 403 (the locking surface 437a), and the lever abutment portion 445 of the hook lever 404 is engaged with the hook lever engagement portion 462 of the guide lever 406. As a result of this, the movement of the hook lever 404 from the opening position to the engagement position is restricted, whereby the hook lever 404 is held.

Additionally, the hook spring 407 which is locked to the hook lever 404 at the one end and is locked to the guide lever 406 at the other end thereof biases the guide lever 406 from the deep side to the entrance side in the entering direction of the striker S, and therefore, when the hook lever 404 moves from the engagement position to the opening position, the force is exerted on the guide lever 406 which pushes out the striker S, this obviating the necessity of erecting the seat while keeping pushing or pulling the operating portion (the hand can be removed from the operating portion).

Figures 1, 26:
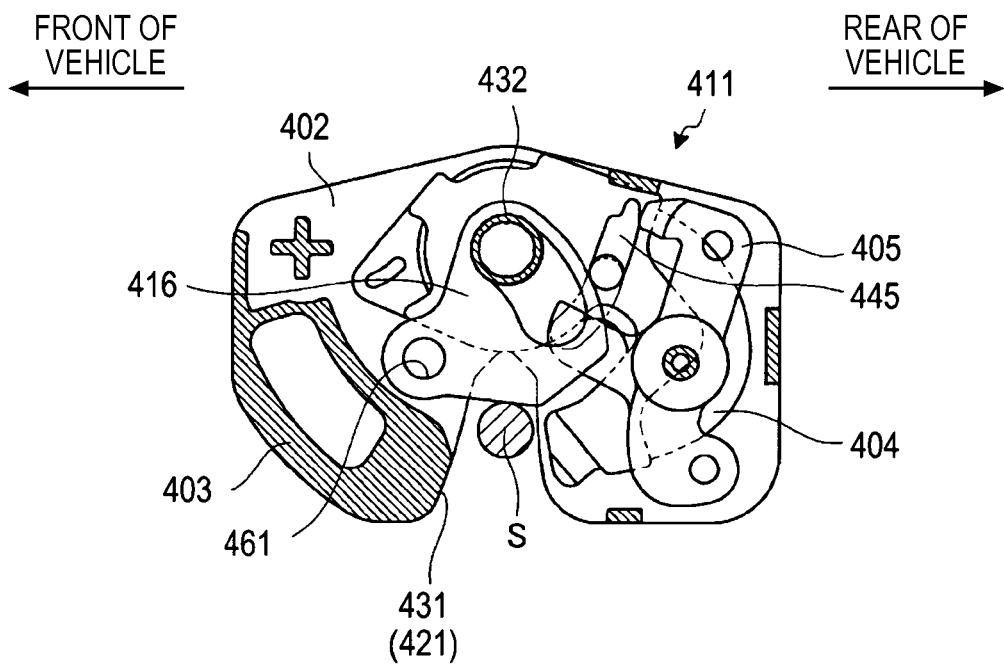
Figures 2, 26:
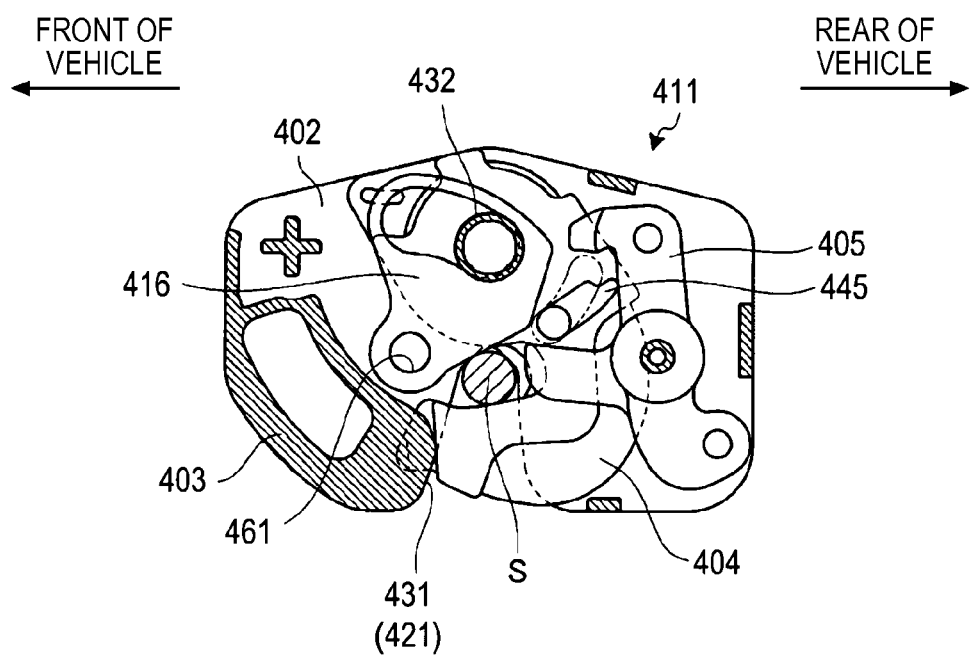

FIG. 26 shows drawings which show a lock apparatus in which a guide shaft is provided on a front side of the vehicle, wherein FIG. 26-1 is a drawing which shows a state resulting before a striker enters to a deep side in an entering direction of the striker, and FIG. 26-2 is a drawing which shows a state in which the striker enters to the deep side in an entering direction.

A lock apparatus 411 shown in FIG. 26 is constructed so that although a guide lever 416 is rotatably supported by a guide shaft 461 which is provided on a front side of the vehicle and is adapted to be guided by a hook shaft 432, the guide lever 416 is biased from the deep side to an entrance side in the entering direction of the striker S in such a state that the guide lever 416 is partially overlapped on a hook lever 404. As with the lock apparatus 401 described above, this lock apparatus 411 can also be given a function to restrict the movement of the hook lever 404 from an opening position to an engagement position while moving the hook lever 404 from the opening position to the engagement position by being pressed against by the striker S when the striker S enters to the deep side in the entering direction of the striker S, a function as an indicator which indicates the state (an engagement state or an opening state) of the hook lever 404, and a function to push out the striker S when the hook lever 404 moves from the engagement position to the opening position. In this lock apparatus 411, too, the hook lever 404 and the guide lever 416 are allowed to be small in size, whereby the lock apparatus 401 can be made small in size.

In the lock apparatuses 401, 411 which configure Embodiment 5 of the invention, as with Embodiment 1 shown in FIG. 1, the fastening member 409 which penetrates the hook shaft 432 to fasten a case made up of the base plate 402 and the body plate 403 to the mount member (a seat or the like) so as to move relative to the striker S is provided within a range defined by projecting an area A (not shown) onto the case. The area A has a radius centering at the striker S which is in engagement with the hook lever 404, and the radius is equal to a length to an outermost position of the hook lever 404 which is in engagement with the striker S. This can realize a reduction in size of the lock apparatus 401.

As with the lock apparatus of the modified example of Embodiment 2 shown in FIG. 10, a plurality of ribs (an example of a posture maintaining portion, a sliding portion) which protrude from an external surface of the base plate 402 to generate sliding resistance with a dish-shaped head portion of the fastening member 9 which is inserted through the hook shaft 432 may be provided on an edge portion of the opening in the hook shaft 432 which lies on the external surface of the base plate 402 so as to be aligned along the opening. The plurality of ribs may be provided on an edge portion of the hole 432a which lies on an external surface of the body plate 403 so as to be aligned along the hole 432a. This maintains the posture of the lock apparatus 401 which is brought into engagement with the striker S.

In addition to the ribs which protrude from the external surface of the base plate 402 and/or the body plate 403, the ribs 432a1 on the inner circumferential surface of the hole 432a (the inner circumferential surface of the hook shaft 432) shown in FIG. 20 and the ribs which protrude inwards from the inner circumference of the fastening hole 438 can also be provided according to the sliding resistance required to maintain the posture of the lock apparatus.

Thus, as has been described heretofore, the following matters are disclosed in this specification.

(1) A lock apparatus comprising: a hook lever configured to be brought into engagement with a striker which enters as far as a deep side in an entering direction of the striker to hold the striker by moving from an opening position to an engagement position while being guided by a hook shaft that is provided on the deep side in the entering direction of the striker; and a guide lever configured to be guided by a guide shaft, which is provided on the deep side in the entering direction of the striker, in a state where the guide lever is partially overlapped on the hook lever, and to be biased from the deep side to an entrance side in the entering direction of the striker so as to restrict the movement of the hook lever from the opening position to the engagement position, wherein the guide lever is configured to, upon being pressed against by the striker when the striker enters as far as the deep side in the entering direction thereof, move the hook lever from the opening position to the engagement position.

(2) The lock apparatus according to (1), wherein the guide shaft is the same shaft as the hook shaft.

(3) The lock apparatus according to (1) or (2), comprising a hook spring, one end of which is locked on the hook lever and the other end of which is locked on the guide lever, wherein the hook spring is configured to bias the guide lever from the deep side towards the entrance side in the entering direction of the striker and to bias the hook lever from the opening position towards the engagement position.

(4) The lock apparatus according to (1), wherein the hook lever comprises an abutment portion which protrudes towards the guide lever, and wherein the guide lever comprises an engagement portion, which is provided on a moving locus of the abutment portion, and which is configured to restrict the movement of the hook lever by being brought into abutment with the abutment portion.

(5) The lock apparatus according to claim 4, wherein to be parted on an entrance groove which the striker enters, the hook lever and the guide lever are disposed such that the abutment portion and the engagement portion are positioned on one side of the entrance groove, and a hook spring is provided on the other side of the entrance groove, wherein one end of the hook spring is locked on the hook lever and the other end of the hook spring is locked on the guide lever, and wherein the hook spring is configured to bias the guide lever from the deep side towards the entrance side in the entering direction of the striker and to bias the hook lever from the opening position towards the engagement position.

(6) The lock apparatus according to (4) or (5), wherein the guide lever comprises a guide hole, through which the guide shaft is inserted, and which is configured to guide the guide lever from the entrance side towards the deep side in the entering direction of the striker.

(7) The lock apparatus according to (6), wherein the guide lever comprises a striker sliding contact portion which is pressed against by the striker which enters as far as the deep side in the entering direction of the striker for rotating the guide lever.

(8) The lock apparatus according to (7), wherein the engagement portion is configured to be brought into abutment with the abutment portion so that the guide lever is rotated.

(9) The lock apparatus according to (1), wherein the guide lever comprises a striker engagement portion having a cylindrical shape and configured to be brought into engagement with the striker which enters as far as a deepest portion in the entering direction of the striker.

(10) The lock apparatus according to (1), wherein a body plate which accommodates the guide lever comprises a locking surface configured to lock the guide lever until the striker enters as far as the deep side in the entering direction thereof.

(11) The lock apparatus according to claim 1, further comprising: a case, which is configured to accommodate the hook lever and the guide lever which is configured to be mounted on a mount member, and which comprises an entrance groove which the striker enters; and a fastening member configured to fasten the case to the mount member such that the case is movable relative to the striker within a range defined by projecting an area, which has a radius centering at the striker being in engagement with the hook lever, onto the case, the radius being equal to a length to an outermost position of the hook lever being in engagement with the striker.

(12) The lock apparatus according to (11), wherein the case is rotationally movable around the fastening member.

(13) The lock apparatus according to (12), wherein the fastening member is inserted through a rotation center of the hook lever.

(14) The lock apparatus according to (12) or (13), comprising a second fastening member which is inserted through an elongated hole which is formed in the case to have an arc-like shape centering at the fastening member.

(15) The lock apparatus according to (12) or (13), comprising a posture maintaining portion configured to maintain a posture of the case around the fastening member.

(16) The lock apparatus according to (15), wherein the posture maintaining portion comprises a sliding portion configured to generate sliding resistance between the case and the fastening member.

(17) The lock apparatus according to (16), wherein the sliding portion is a rib which is provided on an inner circumference of a hole of the case through which the fastening member is inserted.

(18) The lock apparatus according to (16), wherein the sliding portion is a rib which is provided on an edge portion of an opening in a hole of the case through which the fastening member is inserted.

(19) The lock apparatus according to (14), comprising a posture maintaining portion configured to maintain a posture of the case around the fastening member.

(20) The lock apparatus according to (19), wherein the posture maintaining portion comprises a sliding portion configured to generate sliding resistance between the case and the fastening member.

(21) The lock apparatus according to (20), wherein the posture maintaining portion comprises a second sliding portion configured to generate sliding resistance between the case and the second fastening member.

(22) The lock apparatus according to (21), wherein the second sliding portion is a rib which is provided on an inner circumference of an elongated hole of the case through which the second fastening member is inserted.

(23) The lock apparatus according to any of (11) to (22), wherein the latch comprises an engagement groove which has an arc shape and which is centered at a rotation center thereof.

(24) The lock apparatus according to any of (1) to (23), wherein the hook lever comprises an engagement groove which has an arc shape and which is centered at a rotation center thereof.

(25) The lock apparatus according to (24), wherein the engagement groove is formed into a tapered shape which narrows gradually from an entrance of the opening towards a deep portion.

INDUSTRIAL APPLICABILITY

The invention can be used to fix the detachable seat or the movable seat of the vehicle.

While the invention has been described in detail or by the specific embodiments, it is obvious to those skilled in the art to which the invention pertains that various alterations or modifications can be made thereto without departing from the spirit and scope of the invention. This patent application is based on Japanese Patent Application (No. 2011-173385) filed on Aug. 8, 2011 and Japanese Patent Application (No. 2011-205887) filed on Sep. 21, 2011, the contents of which are incorporated herein by reference.

DESCRIPTION OF REFERENCE NUMERALS AND SIGNS

1 lock apparatus
2 base plate
21 entrance groove
22 hook shaft
22a surface of inner wall
22a1 rib
23 elongated hole
23a inner circumference 23a1 rib
3 body plate
31 entrance groove
33 elongated hole
4 hook lever
41 shaft hole
42 engagement groove
43 hook portion
44 spring attaching portion
45 rod attaching portion
5 hook spring
6 rod
9 fastening member
10 second fastening member
101 lock apparatus
102 base plate
121 entrance groove
122 hook shaft
103 body plate
131 entrance groove
104 hook lever
141 shaft hole
142 engagement groove
143 hook portion
144 spring attaching portion
145 rod attaching portion
105 hook spring
106 rod
109 fastening member
301 lock apparatus
302 base plate
321 entrance groove
322 hook shaft
322a elongated hole
323 ratchet shaft
323a elongated hole
304 hook lever
341 shaft hole
342 engagement groove
343 hook portion
344 locking portion
305 ratchet
351 shaft hole
352 meshing portion
353 portion of application
309 fastening member
310 second fastening member
S striker
A rotational movement locus of hook lever
F load to be borne
O reference position
$O_1$ front position
$O_2$ rear position
$O_3$ front position
$O_4$ rear position
401 lock apparatus
402 base plate
421 entrance groove
403 body plate
430 mechanism accommodating portion
431 entrance groove
432 hook shaft
432a hole
432a1 rib (elongated projection)
433 hook restriction groove
434 spring seat
435 opening shaft
436 lever spring seat
437 fastening seat
437a locking surface
437b inner circumferential surface
438 fastening hole
404 hook lever
441 shaft hole
442 engagement groove
443 hook portion
444 spring attaching portion
445 lever abutment portion
445a one end side (entrance groove side)
445a1 opening lever pressure bearing surface
445a2 guide lever pressed surface
445b the other end (outer circumferential side)
445b1 opening lever pressed surface
446 projection
405 opening lever
451 shaft hole
452 pull rod attaching portion
453 push rod attaching portion
454 pressing portion
454a pressing surface
455 detecting portion
455a pressure bearing surface
456 rotation preventing portion (preventing portion)
456a rotation preventing surface
457 stopper portion
457a pressure bearing surface
406 guide lever
461 guide hole
462 hook lever engagement portion (engagement portion)
463 hook lever abutment portion (engagement portion)
464 striker engagement portion
465 striker sliding contact portion
466 spring attaching portion
467 locking portion
407 hook spring
408 lever spring
409 fastening member
410 second fastening member
411 lock apparatus
416 guide lever
461 guide shaft.

The invention claimed is:

1. A lock apparatus comprising:
a hook lever configured to be brought into engagement with a striker which enters as far as a deep side in an entering direction of the striker to hold the striker by moving from an opening position to an engagement position while being guided by a hook shaft that is provided on the deep side in the entering direction of the striker; and
a guide lever configured to be guided by a guide shaft, which is provided on the deep side in the entering direction of the striker, in a state where the guide lever is partially overlapped on the hook lever, and to be biased from the deep side to an entrance side in the entering direction of the striker so as to restrict the movement of the hook lever from the opening position to the engagement position, wherein the guide lever is configured to, upon being pressed against by the striker when the striker enters as far as the deep side in the entering direction thereof, move the hook lever from the opening position to the engagement position;
wherein the guide shaft is the same shaft as the hook shaft.

2. The lock apparatus according to claim 1, comprising:
a hook spring, one end of which is locked on the hook lever and the other end of which is locked on the guide lever, wherein the hook spring is configured to bias the guide lever from the deep side towards the entrance side in the entering direction of the striker and to bias the hook lever from the opening position towards the engagement position.

3. The lock apparatus according to claim 1, wherein the hook lever comprises an abutment portion which protrudes towards the guide lever, and
wherein the guide lever comprises an engagement portion, which is provided on a moving locus of the abutment portion, and which is configured to restrict the movement of the hook lever by being brought into abutment with the abutment portion.

4. The lock apparatus according to claim 3,
wherein to be parted on an entrance groove which the striker enters, the hook lever and the guide lever are disposed such that the abutment portion and the engagement portion are positioned on one side of the entrance groove, and a hook spring is provided on the other side of the entrance groove, wherein one end of the hook spring is locked on the hook lever and the other end of the hook spring is locked on the guide lever, and wherein the hook spring is configured to bias the guide lever from the deep side towards the entrance side in the entering direction of the striker and to bias the hook lever from the opening position towards the engagement position.

5. The lock apparatus according to claim 3,
wherein the guide lever comprises a guide hole, through which the guide shaft is inserted, and which is configured to guide the guide lever from the entrance side towards the deep side in the entering direction of the striker.

6. The lock apparatus according to claim 5,
wherein the guide lever comprises a striker sliding contact portion which is pressed against by the striker which enters as far as the deep side in the entering direction of the striker for rotating the guide lever.

7. The lock apparatus according to claim 6,
wherein the engagement portion is configured to be brought into abutment with the abutment portion so that the guide lever is rotated.

8. The lock apparatus according to claim 1,
wherein the guide lever comprises a striker engagement portion having a semi-cylindrical shape and configured to be brought into engagement with the striker which enters as far as a deepest portion in the entering direction of the striker.

9. The lock apparatus according to claim 1, wherein a body plate which accommodates the guide lever comprises a locking surface configured to lock the guide lever until the striker enters as far as the deep side in the entering direction thereof.

10. A lock apparatus comprising:
a hook lever configured to be brought into engagement with a striker which enters as far as a deep side in an entering direction of the striker to hold the striker by moving from an opening position to an engagement position while being guided by a hook shaft that is provided on the deep side in the entering direction of the striker;
a guide lever configured to be guided by a guide shaft, which is provided on the deep side in the entering direction of the striker, in a state where the guide lever is partially overlapped on the hook lever, and to be biased from the deep side to an entrance side in the entering direction of the striker so as to restrict the movement of the hook lever from the opening position to the engagement position, wherein the guide lever is configured to, upon being pressed against by the striker when the striker enters as far as the deep side in the entering direction thereof, move the hook lever from the opening position to the engagement position;
a case, which is configured to accommodate the hook lever and the guide lever which is configured to be mounted on a mount member, and which comprises an entrance groove which the striker enters; and
a fastening member configured to fasten the case to the mount member such that the case is movable relative to the striker, the fastening member being provided within a range defined by projecting an area on the case, the area having a radius with centering at the striker being in engagement with the hook lever and extending to an outermost position of the hook lever being in engagement with the striker.

11. The lock apparatus according to claim 10,
wherein the case is rotationally movable around the fastening member.

12. The lock apparatus according to claim 11, comprising:
wherein the fastening member is inserted through a rotation center of the hook lever.

13. The lock apparatus according to claim 11, comprising:
a second fastening member which is inserted through an elongated hole which is formed in the case to have an arc shape centering at the fastening member.

14. The lock apparatus according to claim 11, comprising:
a posture maintaining portion configured to maintain a posture of the case around the fastening member.

15. The lock apparatus according to claim 10, further comprising:
a ratchet, which meshes with the hook lever, the ratchet comprising a shaft hole for a ratchet shaft to fit therein; and
a second fastening member, which is inserted through the ratchet shaft, wherein the second fastening member is provided within the range.

16. The lock apparatus according to claim 10,
wherein the fastening member is inserted through a rotation center of the hook lever.

17. A lock apparatus comprising:
a hook lever configured to be brought into engagement with a striker which enters as far as a deep side in an entering direction of the striker to hold the striker by moving from an opening position to an engagement position while being guided by a hook shaft that is provided on the deep side in the entering direction of the striker;
a guide lever configured to be guided by a guide shaft, which is provided on the deep side in the entering direction of the striker, in a state where the guide lever is partially overlapped on the hook lever, and to be biased from the deep side to an entrance side in the entering direction of the striker so as to restrict the movement of the hook lever from the opening position to the engagement position, wherein the guide lever is configured to, upon being pressed against by the striker when the striker enters as far as the deep side in the entering direction thereof, move the hook lever from the opening position to the engagement position; and
a hook spring, one end of which is locked on the hook lever and the other end of which is locked on the guide lever, wherein the hook spring is configured to bias the guide lever from the deep side towards the entrance side in the entering direction of the striker and to bias the hook lever from the opening position towards the engagement position.

* * * * *